(12) United States Patent
Maggiore

(10) Patent No.: US 8,749,396 B2
(45) Date of Patent: Jun. 10, 2014

(54) ASSEMBLING METHOD, MONITORING METHOD, COMMUNICATION METHOD, AUGMENTED REALITY SYSTEM AND COMPUTER PROGRAM PRODUCT

(71) Applicant: Sartorius Stedim Biotech GmbH, Goettingen (DE)

(72) Inventor: Frank Maggiore, Port Jefferson Station, NY (US)

(73) Assignee: Satorius Stedim Biotech GmbH (DE)

( * ) Notice: Subject to any disclaimer, the term of this patent is extended or adjusted under 35 U.S.C. 154(b) by 0 days.

(21) Appl. No.: 13/920,333

(22) Filed: Jun. 18, 2013

(65) Prior Publication Data

US 2013/0278635 A1    Oct. 24, 2013

Related U.S. Application Data

(63) Continuation-in-part of application No. 13/217,972, filed on Aug. 25, 2011, now Pat. No. 8,581,738.

(51) Int. Cl.
G08B 21/00        (2006.01)

(52) U.S. Cl.
USPC ......................................... 340/686.1; 340/540

(58) Field of Classification Search
USPC ...................... 340/686.1, 687, 540, 500, 999
See application file for complete search history.

(56) References Cited

U.S. PATENT DOCUMENTS

2012/0274474 A1   11/2012   Zhou

*Primary Examiner* — Jeffery Hofsass
(74) *Attorney, Agent, or Firm* — Gerald E. Hespos; Michael J. Porco; Matthew T. Hespos

(57) ABSTRACT

An augmented reality system, an assembling method for assembling a first set-up component to a second set-up component under the assistance of an augmented reality system, a method for monitoring a set-up component and a method for transmitting data from or to a set-up component are provided. The augmented realty system may capture a variable marker associated with the respective set-up component. The augmented reality system can recognize the location and/or status of the variable marker and thus decide whether the connection between the first and second set-up component is established correctly or not. Further, data can be transmitted by the variable marker monitored by the augmented reality system.

31 Claims, 31 Drawing Sheets (a)

(b)

ASSEMBLING METHOD, MONITORING METHOD, COMMUNICATION METHOD, AUGMENTED REALITY SYSTEM AND COMPUTER PROGRAM PRODUCT

CROSS REFERENCE TO RELATED APPLICATION

This application is a continuation-in-part of U.S. patent application Ser. No. 13/217,972 filed on Aug. 25, 2011.

BACKGROUND

1. Field of the Invention

The present invention relates to improvements for the assembling and monitoring of a measurement or production set-up and improvements in communication from or to elements of a measurement or production set-up.

2. Description of the Related Art

It is known in the art to assemble measurement or production set-ups manually from a plurality of components. For this purpose, the assembly and correct connection of different parts to be assembled are inspected visually and/or manually. Before putting the assembly of the components into operation, an operator has to check all connections and may consult technical data sheets and select feasible components in order to assemble the set-up according to predetermined specifications.

As the complexity and configurations of measurement or production set-ups increases, operators are looking for directed instruction for how to properly setup, connect, use, troubleshoot, service, and maintain the components. This issue is particularly important within the biopharmaceutical industry where strict industry regulations, documentation requirements, the high value of product, and the customization of components and equipment, particularly in single-use disposable systems, leads to an ever increasing complexity for operators. The process components itself and associated devices should be intelligent and intuitive to use. Further, the operator should be guided through process operations without having to navigate several manuals containing sections that may not apply to the customer's individualized measurement or production set-up.

Thus, an object of the present invention is to propose a method, a computer program product and an augmented reality system that permit an efficient assembly and monitoring of a measurement or production setup.

SUMMARY OF THE INVENTION

One aspect of the invention is related to an assembling method for assembling a first set-up component to a second set-up component comprising the steps:

capturing sensing data belonging to a working space by means of at least one sensing device of an augmented reality, wherein the captured sensing data includes at least a part of the first set-up component and at least a part of the second set-up component and a marker associated with the first set-up component and/or the second set-up component and wherein the second set-up component is arrangeable to the first set-up component in a positional and/or functional relationship;

identifying the marker;

deciding on a status of the positional and/or functional relationship of the first set-up component and the second set-up component with respect to each other;

outputting an augmented representation of at least part of the captured sensing data and the decision of the status of the relationship.

The assembling method can be computer aided. The positional and/or functional relationship can be an alignment or a connection, such as a mechanical and/or electrical connection. The step of identifying the marker may be performed by means of a processing device of the augmented reality system. The deciding step marker may also be performed by means of the processing device.

Particularly, the marker can be a variable marker having at least two states. Thereby, a first state of the marker can be a divided state, wherein the marker is divided into at least two parts. A second state can be an assembled state, wherein the at least two parts of the marker are aligned to each other in a predetermined way. The first set-up component may comprise a first part of a marker and the second set-up component may comprise a second part of the marker. Since the second set-up component is arrangeable in a positional and/or functional relationship, such as connectable, to the first set-up component both parts of the marker are divided in case the first and second set-up components are not arranged according to the relationship, such as not connected, and the marker is completed in case the first and second set-up component are arranged according to the relationship, such as aligned or connected, with respect to each other. The marker is, therefore, a variable marker having a first state of non-aligned parts of the marker and a second state of aligned part of the marker. The marker may be identified by the processing device when the first part of the marker and the second part of the marker are aligned with each other, while the marker may not be identified when the parts of the marker are not assembled to each other, that is when the first and second set-up component are disconnected from each other. Based thereon, the processing device can make a decision on a status of the alignment or connection of the first set-up component and the second set-up component.

Alternatively, the marker can be associated with only the first or second set-up component. Assuming that the second set-up component comprises the marker, which is a variable marker. The term variable marker means in this context, that the variable marker is in a first marker state when the first set-up component and the second set-up component are disconnected and in a second marker state when the first set-up component and the second set-up component are connected and wherein the variable marker turns from the first marker state to the second marker state, when the first set-up component is connected to the second set-up component. By identifying the state of the marker, the status of the connection of the first and second set-up component can be determined.

Alternatively, the first set-up component may comprise a first marker and the second set-up component may comprise a second marker. Both markers can be captured by the at least one sensing device and identified by the processing device. The decision whether the first set-up component and the second set-up component are arranged in a positional and/or functional relationship, such as connected, to each other can be based on the captured position of the first marker and the second marker, that is the relative geometrical position of both markers to each other.

In other words one embodiment provides an assembling method for assembling a first set-up component to a second set-up component comprising the steps:

providing an augmented reality system with a processing device, an output device and at least one sensing device, whereby the at least one sensing device is capable of capturing sensing data belonging to a working space;

providing a first set-up component comprising a first part of a marker at the working space;

providing a second set-up component comprising a second part of the marker at the working space, wherein the second set-up component is connectable to the first set-up component;

capturing at least a part of the first set-up component and at least a part of the second set-up component by means of the at least one sensing device, wherein the marker is identified by the processing device when the first part of the marker and the second part of the marker are aligned with each other and wherein the processing device makes a decision on a status of the alignment of the first set-up component and the second set-up component;

outputting an augmented representation of at least part of the captured sensing data and the decision of the status of alignment.

Set-ups for measurement or production may comprise various laboratory set-ups or industrial set-ups such as set-ups for testing the integrity and/or filter capacity and/or filterability of a filter device, set-ups for testing the leak-tightness of container and/or disposable bags, set-ups for charging, controlling and/or discharging bioreactors, and so on. Within any one of these set-ups at least one first set-up component has to be connected to a second set-up component in order to operate the set-up. The computer-aided assembling method using the augmented reality system can reduce the probability of erroneous assemblies by an operator by automatically checking the alignment and/or the compatibility of the connected components.

The processing device can comprise a microcontroller, a microprocessor, and/or an integrated circuit configured to receive data from the at least one sensing device and transmit data to the output device. The processing device can be part of a computing system such as a PC.

The output device can comprise any one of a display device such as a monitor, a visual touch screen, a projector, a mobile device screen, a notebook or a tablet computer screen, a heads up display, a head mounted display (e.g. glasses having an incorporated display), a wearable display, a printer, or a haptic device, or a wired or wireless audio/visual/sensory device, or a combination of such devices. The display device can be configured for displaying the augmented image to an operator as a merged or new display with the first part and/or second part of the marker and/or the respective first and/or second set-up component. The output device can comprise a haptic device for outputting the augmented image as a merged display or output for physically sensing the marker. The augmented image can be adjusted and/or displayed in accordance with the selective positioning of the parts of the marker or the marker by the user. The display of the augmenting image can be altered to show the merged display in real-time in accordance with the position and orientation of the marker.

The at least one sensing device can comprise any of the following: a camera device, a video camera, an RFID scanner device, a near field communication device (NFC), a Global Positioning System device, a 3-axis gyroscope, an accelerometer, a bar-code scanner device, a microphone, a laser reader device, a detector of electronic signals, a medical scanner, an electronic or visual input from industrial and/or laboratory and/or pharmaceutical equipment, a motion detection system, a visual detection system, an audio detection system, a sensory detection system, or any electronic input devices, or a combination of such devices, for the real-time detection of a position of the marker. The at least one sensing device can provide information to a processor device and/or an output device through a wired or wireless communication system. Any one of the at least one sensing devices can be powered by a powercord, a powered data cable (USB), a battery, and/or wireless power sources.

Any one of the at least one sensing devices can be located in an area of industrial manufacturing and/or a laboratory in the field of processing, mining, petrochemistry, energy, automotive, aerospace, construction, water purification, water treatment, pharmaceutics and bio-pharmaceutics near or within a working space, where the testing is carried out.

The at least one sensing device can be setup as a singular, as multiple, as remote, or as networked devices. A singular sensing device can be placed in a fixed or movable position, inside or outside of the working space and can connect directly to the processor device and/or the display device through wired or wireless connections. Multiple sensing devices can be placed in fixed and/or movable positions, inside and/or outside of the working space and may connect directly to the processor device and/or to the display device or to other sensing devices through wired or wireless connections. A remote sensing device can be placed away from the working space unit but within a remote working space connected by hosing, tubing and/or piping lines. Networked sensing devices can be located in fixed and/or movable positions, inside and/or outside of the working space and may be connected to other sensing devices or through connection hubs that can encompass multiple locations and multiple systems. These networked hubs can connect to a single processing device and/or to multiple processing devices and a single display device and/or to multiple display devices through wired or wireless connections.

According to the sensing device the sensing data can comprise image data captured at the working space by a camera, data read out from barcodes and/or RFID tags and/or NFC tags, audio data, video data, etc.

The first part and/or the second part of the marker can be of a type that is embedded and/or mounted on devices, products, parts, items or consumables or combinations thereof in order to read a unique identification from the marker in case the first part and the second part are aligned in a predetermined way. Alternatively or additionally, the aligned marker can be used to localize the respective marker. The marker can also be the shape of the components itself. Any one of the first part and second part of the marker can comprise optical markers, such as bar codes, color codes, pictograph, audio markers, the shape of items, alphanumeric characters, or electromagnetic markers, such as RFID/NFC tags, metal stripes, and so on. Any one of the first part and second part of the marker can also comprise a simulated virtual marker that comprises a virtual geospatial location and shape that are displayed on the display device. These simulated virtual markers can be linked to a physical marker, object, or location and can use a physical occluder to activate the simulated marker.

The working space may be a certain area on a working floor. The working space can be further delimited by a ceiling and/or at least one vertical wall. The vertical wall, the ceiling and/or the working floor may comprise a transparent material, which is transparent to visible light, to infrared radiation and/or ultraviolet radiation. The transparent material may be a glass, an acrylic glass, a transparent polymer, lead silicate, calcite and/or gypsum. In particular the working space may be enclosed by working floor, ceiling and at least one vertical wall, whereby the working space may be separated air-tight from the outside of the working space. The working floor, the ceiling and/or the at least one vertical wall can also comprise optical intransparent material as wood, plywood, metal plate, intransparent polymer, stone, brick, etc.

Components of the set-ups may be pumps, valves, filter devices, hose connections, flasks, reactors, containers, coolers, heaters, supply terminals, control devices, sensor devices such as temperature sensors, pressure sensors, optical sensors, and so on or combinations thereof. The components are connectable to each other, which may comprise a fluid connection, an electrical connection and/or a mechanical connection.

The correct connection of two components of the set-up can be identified by means of a recognition of the marker as such, wherein the first part of the marker is associated to a first of the two components to be connected and the second part of the marker is associated to a second of the two components. The first part of the marker and/or the second part of the marker may be captured by the at least one sensing device. The data captured by the at least one sensing device may be transmitted to the processing device, wherein the marker can be identified by the processing device when the first part of the marker and the second part of the marker are aligned with each other, thereby forming the marker as such. In case the first part and the second part of the marker are not aligned correctly, the marker is not identified by the processing device. Thus, the processing device can generate a decision on a status of the alignment of the first set-up component and the second set-up component based on the identification of the marker, since the marker is only identified in case the first and second part of the marker are aligned correctly and, consequently, the first set-up component and the second set-up component are aligned and connected correctly. The decision may be identical to the identification of the marker after the correct alignment of the first part and the second part of the marker.

The step of outputting may comprise displaying on the display device at least a part of the captured sensing data and a representation of the decision of the status of alignment. The representation of the status of alignment can comprise a text, a pictogram, a picture, or the like. The status information can be overlayed to the display of the captured sensing data or can be shown separate from it.

Another embodiment provides an assembling method for assembling a first set-up component to a second set-up component comprising the steps:
  providing an augmented reality system with a processing device, an output device and at least one sensing device, whereby the at least one sensing device is capable of capturing sensing data belonging to a working space;
  providing a first set-up component at the working space;
  providing a second set-up component comprising a variable marker at the working space, wherein the second set-up component is connectable to the first set-up component, wherein the variable marker is in a first marker state when the first set-up component and the second set-up component are disconnected and in a second marker state when the first set-up component and the second set-up component are connected and wherein the variable marker turns form the first marker state to the second marker state, when the first set-up component is connected to the second set-up component;
  capturing at least the variable marker by means of the at least one sensing device, wherein the variable marker is identified by the processing device;
  outputting an augmented representation of at least part of the captured sensing data and the decision whether the variable marker is in first marker state or in the second marker state.

The method is similar to the above described method for assembling a first set-up component to a second set-up component and, therefore, the above described features are generally applicable to this aspect of the invention. However, this aspect differs from the above described aspect by the variable marker of the second set-up component. The variable marker can be identified by the processing device regardless whether the second set-up component is connected to the first set-up component or not. Since the variable marker is in the first marker state when the first set-up component and the second set-up component are disconnected and in the second marker state when the first set-up component and the second set-up component are connected, the processing device can perform a step of deciding whether the first set-up component and the second set-up component are connected to each other or not based on the state of the variable marker. Therefore, the outputting can also comprise the outputting or displaying of the decision of the status of connection of the first and second set-up component.

Another embodiment provides a assembling method for assembling a first set-up component to a second set-up component comprising the steps:
  providing an augmented reality system with a processing device, an output device and at least one sensing device, whereby the at least one sensing device is capable of capturing sensing data belonging to a working space;
  providing a first set-up component comprising a first marker at the working space;
  providing a second set-up component comprising a second marker at the working space, wherein the second set-up component is connectable to the first set-up component;
  capturing at least a part of the first set-up component with the first marker and at least a part of the second set-up component with the second marker by means of the at least one sensing device, wherein the first and second markers are identified by the processing device
  deciding whether the first set-up component and the second set-up component are connected to each other based on the captured position of the first marker and the second marker;
  outputting an augmented representation of at least part of the captured sensing data and the decision of the status of connection of the first and second set-up component.

The method is similar to the above described methods and, therefore, the above described features are generally applicable to this aspect of the invention. However, this aspect differs from the above described aspects by the provision of two markers, wherein the first marker is associated with the first set-up component and the second marker is associated with the second set-up component. Both markers can be identified by the processing device independently from each other and regardless whether the second set-up component is connected to the first set-up component or not. Since the first marker and the second marker are geometrically arranged in a predetermined way in case the first set-up component and the second set-up component are connected to each other, the processing device can perform a step of deciding whether the first set-up component and the second set-up component are connected to each other or not based on the alignment and/or the geometrical position of the captured first and second markers. Therefore, the outputting can also comprise the outputting or displaying of the decision of the status of connection of the first and second set-up component.

Further, the processing device may retrieve respective digital information assigned to the identified marker or identified variable marker from a database. Particularly, the method can comprise an assignment or association of the identified marker or variable marker to a unique component and/or item and/or to a type of identical components and/or items. The assignment between the marker or the variable marker and the component or type of component can be performed according to an assignment list, which can be stored in a database. Additional digital information can be assigned to the identified marker or variable marker within the database.

The additional digital information can include, but is not limited to, data sheets, instructions, certifications, directions for use, validation guides, replacement part lists, assembly diagrams, comparison data from previous tests, integrity test parameters or specifications; serial, model, and lot/batch numbers; reorder information, pricing information, or any other useful information to provide to the operator and/or feed the parameters into further control devices for automatically operating the set-up.

For example, data sheets and/or testing parameters can be contained in the database, which can be a local database or a remote database. The database may be divided into a plurality of local and/or remote databases each of which can contain a different type of information. Information concerning the component can also be stored in the marker itself. For example two dimensional barcodes or RFID/NFC tags comprise an amount of information storage capacity, e.g. several hundreds or thousands of bytes, in order to store specific data about the component, at which the respective marker is mounted. Most recent data sheets and updated testing parameters for recent items or products can be provided by the manufacturer or sales representative of the respective items or products via a remote database. The remote database can be made available via an internet connection, a serial connection or a telephone line.

Depending on the information retrieved from the local and/or remote database(s) the processing unit can decide upon the compatibility of the identified components. The database(s) can comprise predefined or predefinable data fields of compatible second components for the first component and vice versa. Thus, the deciding step can comprise a checking of whether the entries in each of the data fields are mutually compatible, i.e., by retrieving or calling datasets that correspond to the entries and that are stored in the database.

The step of deciding comprises a step of automatically generating a compatibility status message or error message, if the identified components are not mutually compatible. The compatibility status message and/or error message is superposed or enriched with at least part of the captured sensing data in order to obtain an augmented representation, which can be outputted to an operator. The representation regarding the compatibility status can be located near to the respective compatible or incompatible components, thus enhancing the intelligibility of the output to the operator. Incompatible components can be faster recognized and further information such as data sheets of the respective components can be outputted for further explanation of the grounds of incompatibility. Furthermore, advice can be outputted to the operator which component to replace in order to solve the compatibility problem. Additionally an encrypted code can be embedded into the marker on the setup components and read by the augmented reality system to identify the components as a manufacturer's original device. This will prevent counterfeit components from being assembled onto a system where the quality was not controlled by the manufacturer of the original device. This data can be transmitted to the augmented reality system which can prevent further setup instructions or the operation of the device until a verified component is used in place of the counterfeit component.

Furthermore, the first set-up component and/or the second set-up component can be one of an integrity testing device, a container controlling unit, an integrity testable product, a container, a disposable container, a disposable bag, a bioreactor, a disposable bioreactor, a spinner flask, a filter device, a pump, a valve, a hose, and a supply terminal.

According to a particular embodiment of the present invention the first set-up component is an integrity testing device. The second set-up component can be any one of an integrity testable product such as filter membranes and containers containing filtration substrates such as cartridges, capsules, columns, cassettes, tanks, and vessels; containers, disposable containers and/or multiple linked containers such as bottles, vials, bags, tubes, packaging, sterilization packaging, blister packaging, vessels, drums, tubing, piping, disposable bags, bioreactors, disposable bioreactors, spinner flasks, filter devices; or pumps, valves, hoses, and supply terminals or combinations thereof. Listed below are examples of integrity and filterability tests, which can be performed by the method according to the invention.

Integrity testing of filter membranes: Non-destructive integrity testing of filter membranes and containers containing filtration substrates such as cartridges, capsules, columns, cassettes, tanks, and/or vessels are used to confirm the retentive properties of a filter and determine if the filter contains any quality defects that are out of specification. Automated and/or manual integrity testing units perform a variety of integrity tests for pre-wetted filter membranes and filters including, but not limited to, Bubble Point, Diffusion, Bubble Point and Diffusion (combination test), Pressure Drop Test, Water Intrusion Test (WIT), Water Flow Test (WFT), Multipoint Diffusion Test, and Volume measurement tests.

Filterability testing of filters: An automated and/or manual integrity testing device can be used as a platform and/or pressure source for conducting filterability testing. Filterability testing comprises multiple trials to determine the optimal filter to use in the filtration of a particular solution, media, chemical and/or gas. Filterability testing is used to determine the optimal filter properties such as filtration area, pore size, filter geometry or the combinations of filters and pre-filters to use for a solution, media, chemical and/or gas as well as the optimal conditions for filtering including temperature, pH, pressure, and flow rate. Trials are usually run initially at the small scale and then scaled up to a process level either by larger scale filterability testing or through scale-up calculations.

Filterability challenge testing of filters: Filterability challenge testing is a destructive integrity test that is used to validate a filter's retentive performance using a challenge solution and/or aerosol containing a standard of organisms including but not limited to bacterial standard (*Brevundimonas diminuta* ATCC 19146 or equivalent), a mycoplasma standard (*Acholeplasma laidlawii* or equivalent), a viral standard (bacteriaphage PP7 or equivalent), and/or some other challenge organism. The destructive filterability challenge testing is used to establish parameters that can be correlated to nondestructive physical integrity testing results using an automated and/or manual integrity testing unit.

Integrity testing of containers: Integrity testing of containers comprises non-destructive and destructive testing to determine if there are any quality defects, gaps, holes, tears, or permeation through the container material that is outside of the specifications of the container parameters. Common containers that are integrity tested include bottles, vials, bags, tubes, packaging, sterilization packaging, blister packaging, vessels, drums, tubing, piping, and other containers that are enclosed structures or combinations thereof. Integrity testing of containers utilizes pressure hold tests, vacuum hold tests, the bubble test method, other positive or negative pressure tests, dynamic flow tests, liquid immersion tests, dye indicator tests, thermal conductivity tests, acoustic tests, or trace material detection tests (including helium leak detection, helium tracer mass spectrometry, hand probe mass spectrometry, carbon dioxide leak detection, and argon trace gas electron capture). All of these tests are used to determine if the container is properly sealed, can maintain its barrier at a specified pressure, and is able to pass the integrity testing within specifications.

Integrity testing of bags: Integrity testing of bags and bag systems (which include 2 dimensional and 3 dimensional bags) are used to determine if there are any quality defects, gaps, holes, tears, or permeation through the bag material that is outside of the specifications of the container. Integrity testing of bags and bag systems utilizes pressure hold tests, inflation testing, vacuum hold tests, positive or negative pressure tests, liquid immersion tests, dye indicator tests, or trace material detection tests. All of these tests are used to determine if the bags or bag systems are properly sealed with particular attention that the bags are able to maintain its barrier at a specified pressure without deformity; that the bag welds, seams, and seals are intact; that bag ports, valves, and integrated equipment such as mixers, probes, and filters are properly sealed; that the permeability of the bag material does not exceed specification; and that the bags are able to pass the integrity testing within specified parameters. Bag and bag systems can be used as primary or secondary packaging of materials and can be used as a barrier before and after sterilization.

Integrity testing of closed systems: Integrity testing of a closed system includes performing testing on multiple linked containers simultaneously. Integrity testing of these closed systems comprises nondestructive and destructive testing to determine if there are any quality defects, gaps, holes, tears, cracks, misaligned connections, or permeation throughout the closed system that is outside of the specifications of the system parameters. Closed systems include any linked system of integrity testable products including but are not limited to isolators, barrier systems, rooms, aseptic facilities, aseptic connections, sterilization systems (clean-in-place, steam-in-place, autoclaves, gamma irradiation, ethylene oxide sterilization, vaporized hydrogen peroxide, or clean steam systems), commercial manufacturing and packaging lines, as well as any combination of linked tanks, vessels, containers, filters, bottles, tubing, piping, and bag systems. Integrity testing of closed systems utilizes pressure hold tests, vacuum hold tests, other positive or negative pressure tests, liquid immersion tests, dye indicator tests, or trace material detection tests. All of these tests are used to determine if the closed system is properly sealed, can maintain its barrier at a specified pressure, and is able to pass the integrity testing within specifications.

Integrity testing of seals: Integrity testing of seals comprises non-destructive and destructive testing to determine if there are any quality defects, gaps, holes, tears, or permeation through the seal that is outside of the specifications of the seal parameters. Seals that are commonly integrity tested include caps, stoppers, plugs, syringes, safety packaging, connections, gaskets, O-rings, ports, bonding, sealants, or adhesives that seal an integrity testable product. Integrity testing of seals utilizes visual inspection, internal pressure testing, pressure hold tests, vacuum hold tests, the bubble test method, other positive or negative pressure tests, dynamic flow tests, liquid immersion tests, dye indicator tests, thermal conductivity tests, corona beam tests, acoustic tests, or trace material detection tests (including helium leak detection, helium tracer mass spectrometry, hand probe mass spectrometry, carbon dioxide leak detection, and argon trace gas electron capture). All of these tests are used to determine if the seal is properly seated, can maintain its barrier at a specified pressure, and is able to pass the integrity testing within specifications.

Further, the assembling method may comprising the step: generating an enabling instruction in case the first set-up component is compatible to the second set-up component.

The enabling instruction may be used to prevent the set-up to be used when the first set-up component is not properly connected to the second set-up component. For example, the set-up may be controlled by the augmented reality system, which does not proceed with further steps of an experiment in case the enabling instruction was not generated. As a further example the set-up may be controlled by the integrity testing device, which will further proceed with an integrity test on an integrity testable product or with a filterability testing of a filter when the integrity testing device has received the enabling instruction from the augmented reality system.

Further, the assembling method may comprise the steps:
  determining the spatial distance between the first marker and the second marker based on the sensing data captured by the at least one sensing device, wherein the processing device makes a decision on a correct connection of the first set-up component with the second set-up component based on the determined spatial distance;
  output an augmented representation comprising a representation of the decision on the correct connection.

Furthermore, the marker and/or variable marker can be any one of a visual marker, an electromagnetic marker, a geospatial location marker, and an audio marker.

In one of the above assembling methods the alignment and/or the connection of the first set-up component and the second set-up component may include any one of connecting a hose, closing a clamp, connecting a wire, assembly of an item, inserting a bag into a container, and running a fluid through a pump, hose, or filter. Further, the completion of said process event can be manually registered by an operator. The operator may manually note the completion of a process event by a plurality of actions including but not limited to pushing a button, turning a knob, moving a lever, typing a command, or giving an audio cue.

In other words the assembling method for assembling a first set-up component to a second set-up component can comprise the steps:
  capturing sensing data belonging to a working space by means of at least one sensing device of an augmented reality system, wherein
  the captured sensing data includes at least a part of the first set-up component and at least a part of the second set-up component and a variable marker associated with the first set-up component and/or the second set-up component, wherein variable marker is in a first marker state displaying a first presentation and wherein the second set-up component is arrangeable to the first set-up component in an positional and/or functional relationship;
  identifying the first presentation of the variable marker;
  deciding on a status of the positional and/or functional relationship of the first set-up component and the second set-up component with respect to each other;
  outputting an augmented representation of at least part of the captured sensing data and the decision of the status of the relationship.

The second set-up component can comprise a variable marker, wherein the second set-up component is connectable to the first set-up component, wherein the variable marker is in the first marker state when the first set-up component and the second set-up component are disconnected and in a second marker state when the first set-up component and the second set-up component are connected and wherein the variable marker turns from the first marker state to the second marker state, when the first set-up component is connected to the second set-up component.

The assembling method may comprise the additional iterative steps for all counting numbers from n equal to three as long as n is lower than N, wherein N is a natural number greater than two:
(a) displaying a n-th presentation on the variable marker;
(b) identifying the n-th presentation of the variable marker;
(c) processing the data contained in the n-th presentation of the variable marker,
(d) adding one to the counting index n.

The additional information regarding at least one of the first set-up component and the second set-up component can be transmitted by means of the variable marker. For example the variable marker can be recognized by the sensing device of the augmented reality system alone or in collaboration with at least one static marker, at least one variable marker, at least one virtual augmented reality marker, or a collection of variable, virtual, and static markers which are recognized collectively or serially by at least one augmented reality system. The variable marker can alter the information presented to the operator and/or the augmented reality system based on an operators input, a computer product input, and/or at a programmed interval. The augmented reality system can recognize the variable markers associated with paper documents, electronic devices, process systems, and/or digital documentation. The variable markers can be utilized to provide configurable content that can feature product customization where made-to-order, configured-to-order, customized-to-order, and engineered products or instructions, personalized training, multi-language support, and/or user-interactive content for marketing materials (catalogues, brochures, advertisements), technical documentation (Validation Guides, Datasheets, Directions for Use), process data, training materials, user manuals (Operator manual, Service Manuals, IQ/OQ Documentation), spare parts, test reports/results, real-time measurements, and/or batch records. The variable marker can be provided by an variable marker display device, such as a display. The variable marker display device can be integrated in, attached to, or communicate with process devices that can transmit process data or links to content with an augmented reality system. The variable marker display device can also communicate with an external device through the use of variable markers. This form of visual communication can transmit and/or receive data through variable markers, with at least one device, between at least two devices, between multiple devices, or between networks of devices.

Monitoring Method

Another aspect of the invention provides a monitoring method for monitoring a physical property comprising the steps:
providing an augmented reality system with a processing device, an output device and at least one sensing device, whereby the at least one sensing device is capable of capturing sensing data belonging to a working space;
providing a set-up component comprising a variable marker at the working space, wherein the variable marker is in a first marker state when the physical property of the set-up component is in a first property state and wherein the variable marker is in a second marker state when the physical property is in a second property state and wherein the variable marker turns from the first marker state to the second marker state, when the physical property changes from the first property state to the second property state;
capturing at least the variable marker with the sensing device, wherein the variable marker is identified by the processing device;
outputting an augmented representation of at least part of the captured sensing data and the decision whether the variable marker is in first marker state or in the second marker state.

The variable marker may have exactly two property states defining a threshold value, wherein it can be determined from the variable marker by means of the augmented reality system whether the physical property is below or above the threshold value. The variable marker may also have a plurality of property states defining a plurality of threshold values so that the physical property can be quantified depended on the number and the distance of the threshold values or marker states. The number of marker states can be 2 power N, wherein N may be a number of 1, 2, 3, 4, 5, 6, 7, 8, 9, 10, 11, 12, 13, 14, 15, 16, 17, 18, 19, 20 and so on.

The monitoring of the physical property can be performed automatically. For example the augmented reality system can be automatically or semi-automatically controlled by a computer or by the processing device, which allows a periodically capturing of the variable marker and, thus, a periodically capturing of a measurement value related to the physical property. The period of capturing, i.e. the inverse frequency of measuring the physically property, can be within periods of one millisecond to one day. Therefore, time series of the physical parameter can be recorded by the augmented reality system and may be stored in a database. The augmented reality system may also be capable to capture more than one variable marker in the working space, wherein each of the variable markers represent at least one physical parameter. Thus, a plurality of physical parameters may be monitored and a plurality of time series of physical parameters may be stored in the database.

Physical parameters may comprise but are not limited to a temperature, a pressure, an electrical conductivity, a color, an oxygen content of a fluid contained in a set-up component such as a hose, a pump, a valve, a tank, a piping, a pipette, an integrity testable product, a container, and an incubated container, such as a bioreactor, a disposable bioreactor, a fermentation tank, a fermentation equipment, a three-dimensional printer, an incubator, a medical incubator, an animal/livestock incubator, an incubated shaker, a cell/virus culture vessel, a tissue culture vessel, a disposable incubated vessel, or a disposable bag. The physical parameter may also be related to the temperature and/or the status of the set-up component itself.

The variable marker may be part of an augmented reality assembly, which may also comprise an associated sensor such as a temperature sensor, a weight sensor, a pressure sensor, a pH value sensor, a dissolved oxygen sensor, etc., which can capture the respective physical properties of a set-up component or a fluid or any other matter contained in the set-up component.

The monitoring method can comprise the additional steps:
identifying the variable marker, whereby the processing device retrieves digital information assigned to the identified variable marker from a database; and
outputting an augmented representation comprising at least part of the retrieved digital information.

The retrieved digital information assigned to the identified variable marker may contain information regarding the limits of the physical property which is acceptable for running an experiment using the experimental set-up in the working space captured by the augmented reality system. The information regarding the variable marker can be hardwired in the processing device or may be provided by a manual input of an operator or by a storage medium. In case of an physical property being out of the limits for safe handling of the set-up and for successful running the experiment, an instruction to halt the operation or not to start the operation as well as an instruction to the operator to perform an appropriate action can be generated by the augmented reality system, for example by the processing device.

One aspect of the invention provides an augmented reality system for monitoring or operating a measurement or production set-up, the augmented reality system comprising:
  at least one sensing device capable of capturing sensing data belonging to a working space;
  a processing device, which is communicatively connected to the at least one sensing device, and which is capable of
    capturing sensing data belonging to a working space by means of at least one sensing device of an augmented reality system further comprising a processing device and an output device, wherein
    the captured sensing data includes at least a part of the first set-up component and at least a part of the second set-up component and a marker associated with the first set-up component and/or the second set-up component and wherein the second set-up component is connectable to the first set-up component;
    identifying the marker by means of the processing device;
    deciding on a status of the alignment or connection of the first set-up component and the second set-up component;
  an output device configured for outputting an augmented representation of at least part of the captured sensing data as well as the decision on the status of alignment or connection.

The invention may be more particularly embodied as an augmented reality system for operating a measurement or production set-up, the augmented reality system comprising:
  at least one sensing device capable of capturing sensing data belonging to a working space;
  a processing device, which is communicatively connected to the at least one sensing device, and which is capable of
    capturing at least a part of the first set-up component and at least a part of the second set-up component, wherein the marker is identified by the processing device when the first part of the marker and the second part of the marker are aligned with each other and wherein the processing device makes a decision on a status of the alignment of the first set-up component and the second set-up component;
    making a decision on the alignment of the first set-up component with the second set-up component based on the captured information;
  an output device for outputting an augmented representation of at least part of the captured sensing data as well as the decision on the alignment of the first and second set-up component.

An embodiment may comprise an augmented reality system for operating a measurement or production set-up, the augmented reality system comprising:
  at least one sensing device capable of capturing sensing data belonging to a working space;
  a processing device, which is in communicatively connected to the at least one sensing device, and which is capable of
    capturing at least one variable marker;
    making a decision whether the variable marker is in a first marker state or in a second marker state based on the captured information;
  an output device for outputting an augmented representation of at least part of the captured sensing data as well as the decision on the marker state.

Another embodiment may comprise an augmented reality system for operating a measurement or production set-up, the augmented reality system comprising:
  at least one sensing device capable of capturing sensing data belonging to a working space;
  a processing device, which is communicatively connected to the at least one sensing device, and which is capable of
    capturing at least a part of the first set-up component with the first marker and at least a part of the second set-up component with the second marker, wherein the first and second markers are identified by the processing device;
    deciding whether the first set-up component and the second set-up component are connected to each other based on the captured position of the first marker and the second marker;
  an output device for outputting an augmented representation of at least part of the captured sensing data as well as the decision on the connection of the first and second set-up component.

The augmented reality system can be configured to automatically control or operate the measurement or production set-up, for example the set-up can be controlled by a computer or by the processing device. The respective control parameters for operating can be provided by means of a database, for example a remote database. Thus, the input of the parameters to the system, i.e. to the database, can be located apart from the location the set-up. The additional information regarding the compatibility of the first set-up component can be stored in a remote database, for example a database hosted by the manufacturer of the first set-up component. Thus, the compatibility information can be updated frequently.

The at least one sensing device can be any one of a camera, a still camera, a video camera, an RFID reader, a Global Positioning System device, a bar-code scanner, a microphone, a laser reader, a detector of electronic signals, a medical scanner, an electronic or visual input from industrial/laboratory/pharmaceutical equipment, a visual detection system, an audio detection system, a sensory detection system, inductive or capacitive sensor, a magnetic field sensor or any electronic input devices, or a combination of such devices.

The output device can be any one of a monitor, a touch screen, a mobile device screen, a notebook or tablet computer screen, a projector, a heads up display, a head mounted display, a wearable display, a haptic device, a braille reader, a loudspeaker, a wired or wireless audio/visual/sensory device, or a combination of such devices.

The at least one sensing device can be a camera, for example a digital video camera capable for continuously tracking the spatial position of a marker within its field of view. The camera can be a mobile camera, which can be wired or wireless connected to the processing device. With a mobile camera the operator is able to bring the camera into arbitrary positions in order to be able to bring components or marker into the field of view of the mobile camera, which may be occluded otherwise. For example a plurality of components may be arranged close together, so that a fixed camera is not able to capture the respective markers of the components. By using the mobile camera, these markers can be captured and recognized.

The output device can be a projector projecting the augmented representation onto the working space or onto a set-up component, whereby the augmented representation is adjusted and displayed in accordance with the spatial distribution of the component. The spatial distribution of the component as well as the spatial distribution of the floor, ceiling or a wall of the working space can be determined by a recognition of markers attached to or near to the desired projection surface. This surface can be inclined with respect to a projection beam of the projector or the surface can be irregularly shaped. The augmented representation can be adjusted respectively, for examples by a keystone correction, by the output device or by the processing device.

In other words a monitoring method for monitoring a physical property can comprising the steps:

- providing an augmented reality system with a processing device, an output device and at least one sensing device, whereby the at least one sensing device is capable of capturing sensing data belonging to a working space;
- providing a set-up component comprising a variable marker at the working space, wherein the variable marker transmits information regarding the set-up component;
- capturing at least one variable marker with the sensing device, wherein the variable marker is identified by the processing device;
- outputting an augmented representation of at least part of the captured sensing data and the decision whether the variable marker is in first marker state or in the second marker state.

On a networked level the variable marker device can provide information to an augmented reality system which can aggregate the information and present it in a meaningful way to the operator. An embodiment of this would be a variable marker device attached to the RS-232, serial, or USB slot on an electronic balance. The variable marker device converts the electronic signal from the device in the connected format and presents the information as a coded variable marker. When the operator adds a weight to the balance the weight is displayed to the operator via the visual display on the electronic balance and the augmented reality system reads the same data as a variable marker displayed on the display of the variable marker device. In other words the information regarding the set-up component transmitted by means of the variable marker is in this case a physical property measured by the set-up component. It has to be understood that the variable markers can also transmit information regarding physical properties of the set-up component itself.

Back to the exemplary electronic balance, a camera array above the laboratory bench top visually might recognize the change in the variable marker, the data from the variable marker is read by the augmented reality system, the result is stored in the systems memory, and the information is presented to the operator on a display device as an augmented display. As the operator tares the electronic balance the variable marker presents this information to the augmented reality system and as the operator completes the weighing of the sample this information is also presented to the augmented reality system.

The augmented reality system is able to aggregate this information provided from the electronic balance and to use software to examine the data, trend the data, look for statistical patterns, and provide a comprehensive augmented display to the operator. The purpose is to provide real-time information to support the operator in the completion of their task, to provide documentation of the work performed with this singular and all other devices within the operating space, to provide how this device interacts with other devices used within the operating space, to provide an optimized workflow of all of the devices required to complete a task, to provide a walk through and confirmation on the setup of equipment, to provide step-by-step instructions for following standard operating procedures, and to provide for training for the operator to perform a specified task.

The variable marker can be in a first marker state when the physical property of the set-up component is in a first property state and the variable marker can be in a second marker state when the physical property is in a second property state and wherein the variable marker turns from the first marker state to the second marker state, when the physical property changes from the first property state to the second property state.

The variable marker may transmit additional information regarding the set-up component beneath the physical property of the set-up component. The additional information may include technical documentation (Validation Guides, Datasheets, Directions for Use), process data, training materials, user manuals (Operator manual, Service Manuals, IQ/OQ Documentation), spare parts, test reports/results, real-time measurements, and/or batch records. The variable marker can be provided by an variable marker display device, such as a display.

The monitoring method can comprise the step:

- outputting an augmented representation comprising at least part of the retrieved digital information.

Communication

One aspect refers to a communication method for transferring data via a variable marker to an augmented reality system comprising the steps:

- capturing sensing data belonging to a working space by means of at least one sensing device of the augmented reality system, wherein the captured sensing data includes at least the variable marker displaying a first presentation;
- identifying the first presentation of the variable marker;
- displaying an n-th presentation on the variable marker;
- identifying the n-th presentation of the variable marker;
- processing the data contained in the first and second presentation of the variable marker,
- wherein n is equal to two.

The assembling method disclosed above can include the use of static and variable markers. Static markers, particularly visual static markers, can also be used for marketing, advertising, or location based augmented reality displays. E.g. static markers when attached to documentation can provide a link to augmented content or to additional information.

The communication method takes advantage of changeable, dynamic, or variable markers displayed on an virtual marker display device, which are capable to present multiple sets of information to an augmented reality system that could be utilized to alter the content provided to a user and/or a computer program. One particular use is disclosed with respect to the assembling method and the monitoring method described above. It has to be understood that all features and advantages described with respect to the assembling method and the variable markers used therein also apply correspondingly to the communication method.

The variable marker displayed on the variable marker display device can be recognized by the augmented reality system alone or in collaboration with at least one static augmented reality marker, at least one variable marker, at least one virtual augmented reality marker, or a collection of variable, virtual, and static markers which are recognized collectively or serially by the at least one sensing device of the augmented reality system.

The variable marker can alter or change the markers appearance, shape, design, or information displayed to an augmented reality system by the variable marker display device and/or a computer program product. In a simple embodiment a button could be pushed to mechanically shift a static marker to the next frame (as in a slide show), it can push or move a shutter containing an augmented reality display to uncover another augmented reality display, or it can send an electronic signal to change the augmented reality display on an electronic display system such as an electronic ink, LED, LCD, touchscreen, projection, or other visual display.

The variable markers used can be visual (light spectrum source) markers, virtual markers, electromagnetic markers, geospatial location markers, or audio markers. Currently visual augmented reality markers are primarily used in augmented reality systems due to the low cost of visual markers, the camera detection equipment, and the available software. The embodiments of variable visual augmented reality markers could easily be translated to rewritable RFID or other electromagnetic tag markers, Infrared light emitting diodes (IR-LED's) or other non-visible wavelength markers, global positioning markers that can consist of changeable coordinates which can be calculated by a tracking system, audio markers, pressure based markers, or electronic markers to present a completed function. The variable marker can comprise optical markers, such as bar codes, two-dimensional bar code, QR-codes color codes, pictograph, audio markers, the shape of items, alphanumeric characters, or electromagnetic markers, such as RFID/NFC tags, metal stripes, and so on.

The step of identifying the variable marker may be performed by means of a processing device of the augmented reality system. The processing may also be performed by means of the processing device.

The variable marker may be identified by the processing device when the variable marker is captured by the at least one sensing device, while the variable marker may not be identified when the parts of the variable marker are captured by the at least sensing device. Particularly, the variable marker is a visual variable marker and, thus, the variable marker may be identified by the processing device when variable marker is captured optically by the at least one sensing device (e.g. by a camera), while the variable marker may not be identified when the parts of the marker cannot be seen by anyone of the at least one sensing device.

Based thereon, the processing device can process the information displayed by the variable marker. The processing device can comprise a microcontroller, a microprocessor, and/or an integrated circuit configured to receive data from the at least one sensing device and transmit data to the output device. The processing device can be part of a computing system such as a PC.

The at least one sensing device can comprise any of the following: a camera device, a video camera, an RFID scanner device, a near field communication device (NFC), a Global Positioning System device, a bar-code scanner device, a QR-code scanner device, a microphone, a laser reader device, a detector of electronic signals, a medical scanner, an electronic or visual input from industrial and/or laboratory and/or pharmaceutical equipment, a motion detection system, a visual detection system, an audio detection system, a sensory detection system, a high speed camera, a CCD device, a photodiode, an infrared sensing device, a motion tracking device, an eye tracking device, a light sensing device, a light spectrum sensing device, or any electronic input devices, or a combination of such devices, for the real-time detection of a position of the marker. The at least one sensing device can provide information to the processing device and/or an output device through a wired or wireless communication system. Any one of the at least one sensing devices can be powered by a powercord, a powered data cable (USB), a battery, a solar cell and/or wireless power sources.

The working space which is captured by the at least one sensing device may be a certain area on a working floor. The working space can be further delimited by a ceiling and/or at least one vertical wall. The vertical wall, the ceiling and/or the working floor may comprise a transparent material, which is transparent to visible light, to infrared radiation and/or ultraviolet radiation. The transparent material may be a glass, an acrylic glass, a transparent polymer, lead silicate, calcite and/or gypsum. In particular the working space may be enclosed by working floor, ceiling and at least one vertical wall, whereby the working space may be separated air-tight from the outside of the working space. The working floor, the ceiling and/or the at least one vertical wall can also comprise optical intransparent material as wood, plywood, metal plate, intransparent polymer, stone, brick, etc.

The communication method according may comprising the additional iterative steps for all counting numbers from n equal to three as long as n is lower than N, wherein N is a natural number greater than two:
(a) displaying a n-th presentation on the variable marker;
(b) identifying the n-th presentation of the variable marker;
(c) processing the data contained in the n-th presentation of the variable marker,
(d) adding one to the counting index n.

In other word steps (a) to (d) can be iteratively carried out for n=3, 4, 5, 6, and so on until a predetermined natural number N, wherein N may be a number greater than 10, greater than 100, greater than 1000 or more. N can be chosen in advance in order to transmit a predetermined amount of data via the variable marker. Alternatively, the variable marker can present another presentation in predetermined time steps wherein N is indefinite and limited to the actual number of the presentation when stopping the data transmission.

A single presentation of the variable marker containing a specified amount of information can be presented by the variable marker display device as a single frame. This single frame is detected by the at least one sensing device, preferably a camera, and is provided to the augmented reality system for processing, storage, reading, and presentation as an augmented display. A second augmented reality marker containing a specified amount of information can be presented by the variable marker display device as the second frame in a sequence which is detected by the augmented reality system sensing device and is provided to the augmented reality system. Each successive variable marker frame is displayed by the variable marker display device and is read by the augmented reality system. The amount of data and the speed of the data that is visually communicated from a visual variable marker display device to an augmented reality system via a camera sensing device is dependent on numerous factors. The equation for determining the amount of data transferred within a defined time period is:

$$D_{transfer}/D_t = M_{data} \times (1/M_{resolution} \times 1/M_{display} \times 1/M_{buffer} \times 1/M_{repeat}) \times [\min(f(u_{imaging}), f(v_{resolution}), f(w_{buffer}), f(x_{processing}), f(y_{storage}), f(z_{read}))] \times T, \qquad (1)$$

wherein the used variables are:
$D_{transfer}$=Data transferred
$D_t$=Data time units
$M_{data}$=Marker data contained in one frame of an Augmented Reality Marker
$M_{resolution}$=Display resolution
$M_{display}$=Marker frames displayed per unit time on display device [e.g. in frames per second]

$M_{buffer}$=Marker buffer frames per unit time (blank marker presentation between frames) [e.g. in frames per second]

$M_{repeat}$=Marker frames repeat per unit time (the same marker repeats or holds for x number of frames) [e.g. in frames per second]

min=minimum of the following values to determine the limiting factor $f(u_{imaging})$=Camera imaging of marker $f(v_{resolution})$=Camera imaging resolution $f(w_{buffer})$=Buffering between images awaiting processing $f(x_{processing})$=Processing of marker image $f(y_{storage})$=Storage of processed marker image $f(z_{read})$=Marker data read by augmented reality software T=Time.

Equation (1) can be further derived to the following equation:

$$D_{trans}=M_{data} \times F_{read} \times T \qquad (2)$$

wherein $D_{trans}$ is the Data transferred per time t (e.g. in kB/s, MB/s, GB/s, TB/s), $M_{data}$ denotes the amount of data contained in one frame or presentation of a variable reality marker, $F_{read}$ is the number of frames read by the augmented reality system per time t, and T is the time required to transfer the data set.

With equation (2) the amount of data that can be transferred from a variable marker to the augmented reality system can be calculated. For most system setups the limiting factor would typically be the frames per second provided by the augmented reality marker display device. At higher frame rates high speed digital cameras could be utilized which can image thousands of frames per second. At these higher frame rates other variables from the equation may become the limiting factors. Below is a table with the data transfer rates for commonly available display devices. There is a correction factor when converting bytes to larger units (1 kilobyte=1,024 bytes) for data storage.

Theoretical data transmission rate limits to variable visual augmented reality markers are compiled in Table 1:

| Type | $M_{data}$ [kB] | $F_{read}$ [FPS] | T [s] | $D_{trans}$ [min] |
|---|---|---|---|---|
| E-Ink | Datamatrix 1.556 | 8 | 60 | 747 KB (DM) |
| | QR code 2.953 | | | 1.38 MB (QR) |
| TV | Datamatrix 1.556 | 24 | 60 | 2.19 MB (DM) |
| | QR code 2.953 | | | 4.15 MB (QR) |
| LCD | Datamatrix 1.556 | 30 | 60 | 2.74 MB (DM) |
| | QR code 2.953 | | | 5.19 MB (QR) |
| Movie Projection | Datamatrix 1.556 | 48 | 60 | 4.38 MB (DM) |
| | QR code 2.953 | | | 8.31 MB (QR) |
| HDTV | Datamatrix 1.556 | 60 | 60 | 5.47 MB (DM) |
| | QR code 2.953 | | | 10.38 MB (QR) |
| High FPS HDTV (sports) | Datamatrix 1.556 | 300 | 60 | 27.35 MB (DM) |
| | QR code 2.953 | | | 51.91 MB (QR) |
| | Datamatrix 1.556 | 3,000 | 60 | 273.52 MB (DM) |
| DMD projection systems | QR code 2.953 | | | 519.08 MB (QR) |
| | Datamatrix 1.556 | 6,000 | 60 | 547.03 MB (DM) |
| | QR code 2.953 | | | 1.01 GB (QR) |
| | Datamatrix 1.556 | 10,000 | 60 | 911.72 MB (DM) |
| | QR code 2.953 | | | 1.69 GB (QR) |
| | Datamatrix 1.556 | 20,000 | 60 | 1.78 GB (DM) |
| | QR code 2.953 | | | 3.37 GB (QR) |
| Fastest CCD imaging | Datamatrix 1.556 | 25 million | 60 | 2.17 TB (DM) |
| | QR code 2.953 | | | 4.13 TB (QR) |

The data speeds provided in table 1 are raw data speeds and do not include checksum or other handshake communication functions that would be performed.

To ensure that the augmented reality system is properly reading the visual data from the variable marker device there could be a visual connection handshake prior to initiating transmission and periodic checksums of the transmitted data performed. This would be to ensure the integrity of the transmitted and received data during the visual data communication between the display and the sensing device as well as ensuring that the visual communication was not blocked or obstructed during the time period of the data transfer. If the complete data set has not been received properly the data can be retransmitted until the complete data package has been received by the augmented reality system.

Additionally a device such as an infrared LED and phototransistor between the variable marker display device and the augmented reality system sensing device could be utilized to determine the moment that the visual signal was disrupted and when the obstruction is no longer blocking the signal. The variable augmented reality system can stop data transmission at the time of the obstruction or to retransmit the data that was provided during the duration of the obstruction.

Although not included in the table ultra-high speed detection devices can use interpolated data over a segment of time to allow for the storage and interpolation of data that occurs at speeds faster than the imaging system can detect. In this case a display device can project at millions of frames per second and the detection device can only read so many of those frames upon the first pass. The display pattern of the markers can be repeated with the detection device able to record more data on each successive pass until the complete data set is available. From here software can piece together the segments and place in the proper order allowing for the entire data set to be read. Currently interpolated imaging recording systems can measure up to 1 trillion frames per second.

For visual communication over significantly higher display frame rates an ultra-high speed projection system can be utilized. The projector can project an image onto a space which is provided to the sensing device as an augmented reality marker. This projected augmented reality marker can change confirmation at a high frame rate which is detected and read by a high speed camera. For augmented reality markers featuring a structured light pattern of coded patterns or colors a 3 dimensional model can be constructed of an object placed within the augmented reality marker space. As the structured patterns of bars, lines, or colors move across a 3 dimensional object placed within the augmented reality marker space the patterns from the high speed projector are detected as different from what would be expected of the same pattern projected on the augmented reality marker space without the 3 dimensional object present within the augmented reality marker space. The augmented reality system can process with a processing device the differences between the expected pattern and the detected pattern and build a 3 dimensional model of the object. This functionality could be utilized for scanning objects into the augmented reality system, having the system recognize the completed assembly of a properly assembled component from sub-pieces, a new item to be placed into the system for future use, such as a spare part, or for being able to further manipulate the 3 dimensional representation of the object within an augmented display.

The change from the (n−1) presentation to the n-th presentation on the variable marker can be trigged based on an input by an operator, a computer product input, and/or at a programmed interval. The input by an operator may include at least one of pushing a button, operating a lever, press a latch, turning a page, a hand gesture, a brain-computer interface, an interaction with a virtual augmented reality marker, the assembly of components, the insertion of a component, and a physical connection between components. The input by a computer product may include at least one of a software input, a hardware input, a sensing device input, a measuring device input, a processing device input, a computer program product input, an external device input, an input from an external marker or augmented reality system, and a combination of multiple inputs from multiple sources or multiple inputs from the same source. This will allow for changes to the variable markers to be made during the operation of a device from external or internal changes to the equipment, the software, or by measured changes within set parameters that occur during the operation of the device. The programmed interval can be at least one of pre-determined unit of time, sequences of events, a randomized interval of time or sequences, an operator changeable interval, and an interval determined by a programmed product based on the data received from a measured system.

The communication method may include the step of outputting the information from the variable marker to an operator through an output device of the augmented reality system.

The output device can comprise any one of a display device such as a monitor, a visual touch screen, a projector, a mobile device screen, a notebook or a table computer screen, a heads up display, a head mounted display (e.g. glasses having an incorporated display), a wearable display, a printer, or a haptic device, or a wired or wireless audio/visual/sensory device, or a combination of such devices. The display device can be configured for displaying the augmented image to an operator as a merged or new display with the first part and/or second part of the marker and/or the respective first and/or second set-up component. The output device can comprise a haptic device for outputting the augmented image as a merged display or output for physically sensing the marker. The augmented image can be adjusted and/or displayed in accordance with the selective positioning of the parts of the marker or the marker by the user. The display of the augmenting image can be altered to show the merged display in real-time in accordance with the position and orientation of the marker.

The communication method may include the steps of
deciding on a status of the positional and/or functional relationship of the first augmented reality marker presentation and the second augmented reality marker presentation with respect to each other;
outputting an augmented representation of at least part of the captured sensing data and the decision of the status of the relationship.

The step of outputting may comprise displaying on the display device at least a part of the captured sensing data and a representation of the decision of the status of alignment. The representation of the status of alignment can comprise a text, a pictogram, a picture, or the like. The status information can be overlayed to the display of the captured sensing data or can be shown separate from it.

The communication may include the steps of outputting the information from the variable marker to an operator through an output device of the augmented reality system.

By the communication method data transmitted from the variable marker to the sensing device can represent at least text, audio, symbols, charts, graphs, slides, images, drawings, arrows, annotations, videos, animations, coordinates, measurement data, results, geospatial coordinates and local coordinates.

As an example a geospatial coordinate in the augmented reality system may be viewed as an augmented display through the display device. As a further example a local coordinate system in which the virtual marker exists in relation to another static or variable marker or other landmark might be viewed as an augmented display through the display device (e.g. position 8 cm to the left and 3 cm up from the center of the static marker).

The embodiments described are capable to use variable or changeable displays of a marker for recognition by an augmented reality system. The variable marker display device can transmit information to an augmented reality system for the display of configurable content within the augmented display and/or provide information to and/or from a process device. Variable visible markers can alter or change the markers appearance, shape, design, or information presented to the operator and/or the augmented reality system based on an operators input, a computer product input, and/or at a programmed interval.

In the simplest embodiment a button is pressed on a variable marker display device that resides on a marketing advertisement. The button changes the appearance of the marker presented on the display device. When the marker is visualized by an augmented reality system the user can view different content linked to products on a display device. When the user selects a product on the display device they are provided additional information on that item. Another simplistic embodiment is where an operator presses a button on a variable marker that resides on a technical document. This changes the appearance of the augmented reality marker and changes the language displayed on the display device to match the preferred language set by the operator.

In a more complex embodiment a visual marker on the page of a product catalogue can be used to represent a product type such as a single round stainless steel filter housing. This marker can be detected by a sensing device such as a camera and displayed as an augmented image on the display screen of an augmented reality system such as a mobile device. A second changeable or variable marker, which is within the same detection area of the sensing device as the first marker, can provide the configuration of the single round filter housing, including valve configurations, pipe diameters, surface finish, adaption type, and accessories. This configuration can be provided as an available part, a non-standard part, a configured-to-order part, or a customized engineered-to-order part. The customer can set the configuration and view the part as a 3D model on the visual display.

Once the customer is satisfied with their configured part, a part number could be provided, a quote request can be sent for pricing and delivery time, the customer can be linked to the online store for purchase, or technical service could be requested to provide further assistance.

This augmented reality system can utilize documentation provided on printed materials (such as a product catalogue, magazine advertisement, or directions for use), on an electronic device (such as an e-book, tablet, or mobile device), or on a digital document file (such as a Word® document or PDF® file). The variable marker can exist as a physical marker, an electronic marker, and digital marker, or a virtual marker. The selection of the marker selected can be changed by the operator or by the operator entering in data to the variable marker or to the augmented reality system (such as scanning or presenting the barcode with the serial number of the product in use).

The variable marker device can also serve as a method for visual communication with another device. Variable markers can be used to display visual information that changes every few frames on the display device. A sensing device, preferably a camera device, can recognize the augmented reality markers as they change from one frame to the next, process the images within a processing device, and translate the symbology of those markers into data or character sets. The augmented reality system can recognize the data received and display the contents of that data to a user on a display device or it can be provided to a computer program product which can store the data and/or utilize the data to effect changes within a process system.

In the communication method the variable marker display device can comprise of a plurality of devices, including but not limited to, a sensing device, preferably a camera, a high speed camera, a CCD device, a radio frequency identification device (RFID), a near field communication device (NFC), a microphone, a photodiode, an infrared sensing device, a motion tracking device, an eye tracking device, a light sensing device, a light spectrum sensing device, and other specialized sensor devices for completing a specific work task; a display device, preferably a digital display, an electronic ink display, liquid crystal display (LCD), light emitting diode (LED) display, an organic light emitting diode (OLED) display, a plasma display, a heads-up display (HUD), a wearable display, a projection display, an ultra-high speed projection display, a fluorescence display, a mechanical display, a haptic display, an audio display, an ultrasound display, or other specialized display devices for completing a specific work task; a communication device, preferably a wired connection such as a universal serial bus (USB) connection, a serial connection, an RS-232 connection, an Ethernet connection, a telephone connection, a DSL connection, a fiber optic connection, a cable connection, a BNC connection, or other wired connection ports, a wireless communication device, preferably a WiFi connection, a cellular connection, an active RFID connection, an NFC connection, a radio connection, a visual connection or other wireless sources; and a power device, preferably a rechargeable battery, a battery, a powercord or other wired connection, a powered communication port (USB), a solar cell, a mechanical power source, an electromechanical power source (such as a hand crank), or a wireless power source.

In the communication method the variable marker display device can present a plurality of text, audio, symbols, charts, graphs, slides, images, drawings, arrows, annotations, videos, animations, coordinates, measurement data, results, or other data on the display device to the augmented reality system and/or operator.

In the communication method the variable marker can be provided as a plurality of a physical marker, an electronic marker, and digital marker, or a virtual marker.

In the communication method the variable virtual marker can comprise at least one of (1) a geospatial coordinate in the augmented reality system which can be viewed as an augmented display through a display device, (2) a coordinate determined by a local coordinate system in which the virtual marker exists in relation to another static or variable marker or other landmark, (3) a multidimensional coordinate where the marker can occupy several coordinates simultaneously or on a rotational basis within a sequence, wherein preferably a multidimensional virtual marker provides for the augmented content to be viewed by the augmented reality system and the operator within the same angle and frame of reference as the sensing device and/or operator is viewing the workspace, and (4) a marker that exists within a computer program product.

The variable marker display device can be a visual display and presents a sequence of markers to a camera sensing device where they are imaged, buffered, processed, stored, and read by the augmented reality system.

Further, the variable marker can provide the augmented reality system with confirmation of the completion of a work task that occurred within the workspace. The confirmation from the variable marker can be recorded onto an electronic batch record and/or other validated record storage/retrieval method. The operator can provide a digital signature through the augmented reality system. The confirmation and digital signature can conform to CFR 21 requirements.

The data transfer rate from the variable marker is determined by the data in the primary marker presentation of the variable marker, added to the data in the secondary marker presentation of the variable marker, and so on over a specified time period or until the data transfer is completed. The variable marker might be a high speed projected display which is projected onto a surface as a sequence of markers and read by a high speed camera sensing device. As the data display rates become very high and exceed the rates of the camera sensing device to detect the changes in the variable markers sequence over a defined time period the projected sequence can be cycled multiple times until all the data is recorded. The stored data can be processed and interpolated by a computer system to order the captured data into the correct sequence.

The variable marker can be a high speed projected display which is projected onto a surface as a sequence of structured light pattern markers and read by a high speed camera sensing device. A three dimensional object placed within the projected marker viewing field can have a structured patterns of bars, lines, or colors move across an three dimensional object. The patterns detected by the sensing device are different from what is expected if the three dimensional object was not placed within the projected augmented reality marker viewing field and a digital three dimensional model of the object can be constructed by a computer program product from the differences of the expected and observed data sets.

The augmented reality system can comprise a plurality of sensing devices operating within a workspace. The augmented reality system can recognize, image, process, store, read, and present data communicated from a plurality of variable augmented reality marker devices operating within a workspace. Further, the augmented reality system might collect measured data from the variable marker devices and their associated equipment, store the information in a local, networked, external, or cloud based database, process the information for statistical and trend analysis, and provide the information to the operator.

The variable marker display devices can provide enhanced links to documentation when provided in conjunction with documentation on printed materials (such as a product catalogue, magazine advertisement, or directions for use), on an electronic device (such as an e-book, tablet, or mobile device), or on a digital document file.

Particularly in an assembly method, the variable marker display device can provide a platform to view and customize products within an augmented display. The products can be customized as made to order, configured to order, or engineered to order. The variable marker display device can provide a link to an online store, shopping network, customer service, technical support, service technician, or to a sales representative. The variable marker display device can also provide links to spare part information on a product, equipment, device, and/or consumable.

The variable marker display device can display a sequence of augmented reality markers which can be utilized by the augmented reality system, a computer system, a network, or equipment as a password entry. The variable marker display device can further provide an encrypted code to an augmented reality system to validate that a part or component is a manufacturer's original product to prevent counterfeiting of products. If a component is not validated as an original component then the augmented reality system may or may not allow the process to continue depending on the criticality of the component.

Accordingly, a marketing method can be provided, wherein a variable marker display device can serve as an integrated device, a cooperative device, or a mobile device to catalogues, brochures, marketing literature, magazine/print advertisements, trade show literature, product literature (Validation guides, datasheets, directions for use, etc.), or integrated into other marketing items (such as calendars, clocks, or other promotional items).

Accordingly, a storage method can be provided, wherein the data from a plurality of variable marker display devices can be stored by an augmented reality marker system as a mesh network, an ordered network, a circular network, or a matrix network.

Computer Program Product

One aspect of the invention provides a computer program product, such as a computer-readable storage medium, for a computer-aided assembly of a measurement or production set-up and/or for automatically operating a measurement or production set-up, wherein the computer program product comprises coding segments that when loaded and executed on a suitable system can execute an assembly and/or monitoring method according to the invention. The storage medium according to the invention can be a volatile or permanent storage medium, such as a DVD, a CD, a floppy disk, an EEPROM, a memory card, a data stream and so on. The suitable system may comprise a general purpose computer like a PC, a workstation, a microcontroller, an embedded PC, a smartphone and the like.

Computer Program Product

One aspect of the invention provides a computer program product, such as a computer-readable storage medium, for a computer-aided communication, wherein the computer program product comprises coding segments that when loaded and executed on a suitable system can execute a communication method according to the invention. The storage medium according to the invention can be a volatile or permanent storage medium, such as a DVD, a CD, a floppy disk, an EEPROM, a memory card, a data stream and so on. The suitable system may comprise a general purpose computer like a PC, a workstation, a microcontroller, an embedded PC, a smartphone and the like.

Monitoring Method

One aspect of the invention is to provide a monitoring method for monitoring at least one set-up component of a measurement or production set-up comprising the steps:
  providing a secondary augmented reality system with a secondary processing device, a secondary output device and at least one secondary sensing device, whereby the at least one secondary sensing device is capable of capturing sensing data belonging to a working space;
  providing a primary augmented reality system with a primary processing device, a primary output device and at least one primary sensing device, whereby the at least one primary sensing device is capable of capturing sensing data belonging to the secondary output device;
  providing at least one set-up component at the working space;
  capturing the at least one set-up component or a marker associated to the at least one set-up component by means of the secondary sensing device;
  processing sensing data captured by the secondary sensing device by means of the secondary processing device;
  displaying a variable marker at the secondary display working space depending on the sensing data processed by the secondary processing device;
  capturing the variable marker by means of the primary sensing device, wherein the variable marker is identified by the primary processing device;
  outputting an augmented representation of at least part of the captured variable marker.

Large set-ups for measurement or production may comprise various laboratory set-ups or industrial set-ups as discussed above, which may be arranged in a way that the set-up in a working space cannot be captured by the sensing devices of a (primary) augmented reality system in total. Using a secondary augmented reality system capturing one or more set-up component(s) and/or (variable) markers associated with these set-up components the monitoring and controlling of such a set-up may be simplified. The secondary augmented reality system can act as a relay for capturing sensing data in a part of working space that cannot be captured by the sensing device of the primary augmented reality system. For example, the working space may comprise an external space which is spaced apart from the remaining working space.

The monitoring method may include that the at least one variable marker is attached to an operator and/or to a device and is monitored and tracked by the at least one sensing device for the purposes of the qualification of a work task within a workspace. During the measurement of the monitored workspace the processing device may determine the variations of the movements and/or the first, second, third, or n-th presentation of the variable marker to the augmented reality system where the monitoring data is compared to the expected data and/or the tolerable variation from a database.

Augmented Reality System

Accordingly, one aspect of the invention is to provide an augmented reality system for monitoring a measurement or production set-up, the augmented reality system comprising:
  a secondary augmented reality system with a secondary processing device, a secondary output device and at least one secondary sensing device, whereby the at least one secondary sensing device is capable of capturing sensing data belonging to a working space;
  a primary augmented reality system with a primary processing device, a primary output device and at least one primary sensing device, whereby the at least one primary sensing device is capable of capturing sensing data belonging to the secondary output device,
wherein the at least one the secondary sensing device is capable to capture a set-up component or a marker associated to the at least one set-up component located in the working space;
wherein the secondary processing device is capable of processing sensing data captured by the secondary sensing device and configured to generate a marker or variable marker based on the processing;
wherein the secondary output device is configured to display the generated marker or variable marker and
wherein the primary output device is configured to display an augmented representation of at least part of the captured marker or variable marker.

Further, the primary augmented reality system can be a mobile device, so that the secondary display can be used to transmit information regarding the actual state of the set-up in the working space captured by the secondary augmented reality system to the mobile primary augmented reality system to inform a user holding or wearing the mobile device. The mobile device may be a handheld computer, a smartphone, a laptop, wearable device or the like.

The secondary processing unit can also perform a recognition of the captured marker or variable marker of the set-up component captured by the at least one secondary sensing device. As discussed above the markers or variable marker may indicate the connection or alignment status of two set-up components or may indicate the quantity of a physical property associated in one of the set-up components. The secondary processing device may process the captured marker or variable markers and may decide on the connection or alignment status and/or the quantity of the physical property. Optionally, the secondary processing device may retrieve additional data related to the recognized (variable) markers from a local or remote database. Furthermore, the secondary processing device may carry out further data processing or computing of further parameters based on the captured data in order to display the result via the secondary display device, for example by generating a marker or variable marker and display this marker on the secondary display. Optionally, the secondary display may also display parts of the captured data, that is the data sensed by the at least one secondary sensing device. The marker or variable marker may be overlayed in part or totally to the displayed captured data.

In other words, the invention is directed to an augmented reality system and an assembling method for assembling a first set-up component to a second set-up component under the assistance of an augmented reality system. The augmented realty system may capture a first part of a marker and a second part of the marker associated with the respective component. The augmented realty system may capture a variable marker associated with one of the components. The augmented realty system may capture a first marker and a second marker associated with the respective component. The augmented reality system can recognize the location and/or status of the markers and thus decide whether the connection between the first and second set-up component is established correctly or not. It has to be understood, that the above described invention is also capable of monitoring and/or deciding whether a connection of a first and second component is disrupted, for example by cutting a component into two pieces forming the first and second component. Further details of the structure and functions of an augmented reality system can be found in U.S. provisional application 61/353,377, which disclosure is incorporated herewith in its entirety.

The augmented reality system for transmitting data can comprise:
    at least one sensing device capable of capturing sensing data belonging to a working space;
    a processing device, which is in communicatively connected to the at least one sensing device, and which is capable of
    capturing sensing data belonging to a working space by means of at least one sensing device of an augmented reality system further comprising a processing device and an output device, wherein
the captured sensing data includes at least a part a variable marker
    identifying the first presentation of the variable marker;
    displaying an n-th presentation on the variable marker;
    identifying the n-th presentation of the variable marker;
    processing the data contained in the first and second presentation of the variable marker,
wherein n is equal to two.
    an output device configured for outputting an augmented representation of at least part of the captured sensing data as well as a representation of the processed data.

The at least one sensing device may be a camera, preferably a mobile camera and/or a high speed camera.

The output device can be a projector projecting the augmented representation onto the working space or onto a set-up component, whereby the augmented representation is adjusted and displayed in accordance with the spatial distribution of the component.

The variable marker can be provided by a variable marker display device as a plurality of a physical markers, as an electronic marker, as a digital marker, as a virtual marker or as a display. The display device can be part of a mobile device containing at least one sensing device, at least one a display device, at least one processing device, at least one storage device, and at least one power device. Alternatively, an integrated device might contain at least one sensing device and at least one a display device which is incorporated into a device or piece of equipment. Further, a cooperative device might contain at least one sensing device, at least one a display device, at least one processing device, and at least one storage device which is cooperatively attached or wirelessly connected to a device or piece of equipment.

The variable marker display device can comprise a sensing device, a display device, a communication device, and a power device. The sensing device can comprise at least one of a camera, a high speed camera, a CCD device, a radio frequency identification device (RFID), a near field communication device (NFC), a microphone, a photodiode, an infrared sensing device, a motion tracking device, an eye tracking device, a light sensing device, and a light spectrum sensing device. The display device can comprise at least one of a digital display, an electronic ink display, liquid crystal display (LCD), light emitting diode (LED) display, an organic light emitting diode (OLED) display, a plasma display, a heads-up display (HUD), a wearable display, a projection display, an ultra-high speed projection display, a fluorescence display, a mechanical display, a haptic display, an audio display, and an ultrasound display. The communication device can comprise at least one of a wired connection, a universal serial bus (USB) connection, a serial connection, an RS-232 connection, an Ethernet connection, a telephone connection, a DSL connection, a fiber optic connection, a cable connection, a BNC connection, wired connection ports, a wireless communication device, a WiFi connection, a cellular connection, an active RFID connection, an NFC connection, a radio connection, and a visual connection. The power device can comprise at least one of a rechargeable battery, a battery, a powercord, a powered communication port (USB), a solar cell, a mechanical power source, an electromechanical power source, and a wireless power source.

The augmented reality system's display device may be operable to display an augmented superimposed video of a template operator performing a work task within the workspace. The superimposed video can instruct the operator on the correct performance of a work task within a workspace using a bioprocess device. The superimposed video can speed up or slow down to mimic the operator's speed based on the movements of the variable markers attached to the operator and/or device detected from the tracking system.

The augmented reality system may be operable to monitor the at least one variable marker attached to an operator and/or attached to a device, to track the at least one variable marker by the at least one sensing device, to display at least one variable marker on the display device, and interact with as a game program by an operator during the completion of a work task within the workspace. During the measurement of the monitored workspace the processing device may determine the movements and/or the first, second, or n-th presentation of the variable marker to the augmented reality system where a game program is expertly constructed to overlay the workspace during a work task, incorporate the steps required to complete the task, allow adjustments to best fit the operator's workspace and operating procedures, add movements to ergonomically prevent repetitive stress by the operator, alter the operator's behavior, and to provide the assignment of scoring and/or points based on parameters including, speed, accuracy, quantity or other measured parameters which can be compared to additional operators utilizing the augmented reality system or stored in a database.

When integrating augmented reality systems into documentation and/or other work processes the data can be stored and/or presented using different system architectures. The augmented reality system can present linked documents as a mesh network in which files are linked by common nodes, an ordered network in which the files are ordered by a common date, and a circular network in which the documents are arranged in a circle where the operator can scroll through a series of linked documents and at the end return to the first document. The links to the documents or the related file systems and structures can be viewed by the operator on an augmented display and the operator can access the documents by occluding a real or virtual marker. In these embodiments a static augmented reality marker on a paper page or object when viewed together with a variable marker (real or virtual) can provide an augmented image of a network of documents linked to a series of related documents, such as the linked batch record.

For industrial processes, batch records are critical for maintaining records on all activities that were performed during the processing of a batch of material. The augmented reality system can also record data onto an electronic batch record. The data to be recorded into an electronic batch record can include assembly confirmation for a completed setup, the confirmation of completed tasks based on the presentation of the markers, a measured value based on a presented marker on a variable marker display device, and the confirmation of training of an operator for the completion of a task using the augmented reality system. The information can be tied directly into an electronic batch record system and be signed off with an electronic signature by the operator or the linked documents of the completed tasks can be linked to the electronic batch records, which can be printed out and the operator signs the hard copy of the reviewed documents. The information entered into the electronic batch records by the augmented reality system, including electronic signatures, can be validated into a work process and comply with all standards for electronic documentation including CFR21 compliance.

Static augmented reality markers can be displayed on the result printouts from equipment or measuring devices. These markers can link the operator of the augmented reality marker system to related documentation of the test performed, the related batch records, or other documents from the related network architectures. Through the use of virtual variable markers the operator can select to visualize related historical data in an augmented display on an augmented reality display device. This data can be presented in an augmented reality display as trended data, historical data overlaying the current results, or as utilizing virtual variable markers and/or a motion tracking system the operator can use body movements to view individual data sets within a volume of data or graphical trend lines. This will allow the operator to compare the results within the context of historical results from the same equipment, process, batch, or disposable items tested.

The data can be provided from internal sources within a company's internal network, through an external network managed by an outside company, or through a network managed by the seller of the products/equipment which can provide anonymous data from a host of other customers using similar products, processes, part numbers, lot numbers, or equipment. The availability to trend this data would be able to solve problems in real-time before major excursions are introduced. An example would be an integrity test failure of a sterilizing grade filter using a particular media containing soy hydrolysates, which could be trended among other customers (with anonymous data reporting) where other similar failures were seen using similar products, processes, and materials. The observed historical failures under similar conditions can be overlayed one over the other to view which historic observed failing test results are most similar to the current failed test result.

Recommendations of a solution (integrity testing the sterilizing grade filters with Isopropyl alcohol) could be made by an applications specialist reviewing the specific case or recommended by the augmented reality system as solutions to commonly encountered issues.

As the complexity of biopharmaceutical products increases and the available customization of those products increases, particularly with single-use systems, the methods to provide a customer with information about all the possible configurations to meet their needs is difficult to present with print media alone. An embodiment of a variable marker display device attached to a product catalogue, magazine display, tradeshow display, or integrated into other marketing items for the purposes of providing a customer with linked information or allows the viewing of customized configurations through an augmented display. The variable marker display device can work cooperatively with static augmented reality markers on a printed page or object to provide expanded information about the item(s) on a particular page. The item itself can have a static augmented reality marker, the specific page can have a static augmented reality marker, or the design of the page itself can serve as a static augmented reality marker.

A variable marker display device incorporated into a console with buttons can be permanently or removably attached to a marketing item such as a product catalogue. A variable marker display device removably attached to a product catalogue could be removed and added to a new catalogue when it is available. The software for the variable markers can be updated to reflect changes and new products within the catalogue. The buttons can serve as a method to select information on the viewed item or to provide a customized design to meet the specifics of the customer's needs. This customization can include made to order, configured to order, or engineered to order items. The customized product can be built using configuration software integrated into the augmented reality software and displayed as an augmented display on the display device which could be a mobile device held up by the customer or a heads up display device worn by the customer such as augmented reality glasses.

The customer can configure the desired setup using the buttons on the variable marker display device console or by operating virtual markers in augmented space over the 3 dimensional augmented display of the product as viewed on the augmented reality display device. In a simplistic embodiment this can include lengthening a piece of tubing on a single use bag assembly to the required length and attaching a gamma irradiated filter to the assembly with the proper aseptic connector types according to the customer's specifications. The specifications for the customized product design can be sent to the sales representative or the inside applications support for approval, while the customer can be supplied with the pricing, minimum order quantities, and lead times to receive the customized products. The augmented display could also direct the customer to the online store where they can order the product directly from the company. The variable marker display devices can be simplistic cheap devices for addition to in-page magazine print media or other marketing items. An embodiment of a minimal setup could include an electronic ink display, a mini board with a small memory device (to store the augmented reality markers to be presented), a setup of buttons, and a battery power source. The setup could alternatively include a small solar cell since electronic ink displays are not power intensive and can maintain the image of a selected marker state without any additional power consumption. This variable marker display device can lay flat which would allow it to be inserted and sealed between two pages for the marketing literature, magazine ads, trade show literature, or integrated into other marketing items (such as calendars, clocks, or other promotional items). More complex embodiments can include wireless communication between the variable marker display device and a network to receive updates on new products and links to provide to the customer. In even more complex embodiments the customer's mobile device can communicate to the variable marker console through the use of variable marker communication or through another method such as near field communication (NFC). In complex embodiments the variable marker display device and console can serve as an augmented reality system and provide the operator with linked data, step-by-step instructions, video/audio commands, assembly confirmation, and augmented displays directly on the display device.

The variable marker display device can be particularly useful in the identification of spare parts, replacement parts, or related consumable products for an equipment setup. The variable marker display device which is integrated into a product or piece of equipment can contain an augmented reality marker that instructs the augmented reality system to display spare parts as an augmented display on a display device. A static and/or variable marker can be utilized for the positioning of variable virtual markers using a coordinate system and can provide keystoning of the viewing of the virtual markers to the operator's perspective as the operator moves the sensing device, the display device, or a mobile device containing both the sensing and display devices. A variable virtual marker could be utilized where variable virtual markers can exist in the augmented space over a particular part on a unit within the field of view in the augmented reality system. When the operator occludes the variable virtual marker with an occluder (a finger, hand, or occlusion device) the component of the unit is selected and information about the part including linked documentation, the proper assembly information for those parts, and re-ordering information with links to the online store can be provided. Alternatively a motion tracking device can be utilized to determine the location of the operator's appendages (fingers, hand, etc) over the device. The information can be provided as the operator covers the part or section of the unit or by placing virtual augmented reality markers over the locations of the unit and having the operator occlude those virtual markers which would provide linked information on that particular part or assembly of parts.

In a room or facility-wide augmented reality systems, variable marker display devices can be directly connected to, integrated in, or cooperatively communicate with equipment, measuring devices, products, and other devices located within the room. These variable marker display devices can communicate data from the associates devices and present them through a display device to a sensor array, preferably a camera array, located within the room which is associated with a central augmented reality system. This augmented reality system can collect visual data securely from multiple equipment types which can come from different manufacturers, different ages, and different communication outputs.

The use of variable markers to communicate with a centralized augmented reality system allows for the system integration and communication unification of a variety of equipment and products using an inexpensive, reliable, and secure method. The augmented reality system is capable to resolve the spatial position of identified static and/or variable markers and marker display devices based on the data captured by the at least one sensing device, such as the images captured by a camera sensing device. The spatial position of the augmented reality markers and the correlated spatial position of the respective item containing the variable marker display device includes the orientation of the augmented reality marker as well as the distance and/or relationship of the marker to another marker. The augmented reality marker system can record the movement of the variable markers as a 3 dimensional wireframe diagram and compare the movements of the markers with a reference diagram. As the variable marker changes the presentation to the augmented reality system the changes can be recorded on the wireframe diagram stored by the augmented reality system. The spatial location of the variable markers within the working space can be used to track and record the movements of the augmented reality markers and/or physical movements of the operator to determine if proper technique of a predetermined task is being followed within some set margin of error. The tracking of the variable markers for performing or following proper technique of a predetermined task can be used in conjunction with a step-by-step training program in which the operator is instructed, shown, and then evaluated for performance of a set task. The operator can be evaluated and graded within an operator defined system for performing or following the proper technique for a predetermined task within the margin of error by the software which tracks the movements of the markers and/or physical movements of the operator.

The variable markers and the presentation of a pre-programmed series of augmented reality markers to a computer system can serve as a secure visual password to a computer or electronic system. The operator can present the variable marker display device to an augmented reality system, to a computer with a camera running software to recognize the augmented reality markers as a password input, or equipment with an intermediate computer system that can recognize the augmented reality markers and input the password into the equipment's system. This would allow for a secure visual password system that must have a local input for access to the system. The password input can be performed using a mobile device, preferably a smartphone, to present the variable markers from the display device as a sequence which is recognized by the computer system and inputted as a password. The sequence of the visual augmented reality markers can remain the same each time, the sequence could change each time but input the same password, or the sequence of the visual augmented reality markers can change with the password within a pre-determined set of passwords each time the system is accessed.

Additionally, an encrypted code can be installed into the variable marker display device which is read by the augmented reality system. The encrypted code can identify the variable marker and/or the linked component, equipment, product, or part is a manufacturer's original device. This will prevent counterfeit components and/or associated products from being assembled and used within a process where the quality was not controlled by the manufacturer of the original device. This data can be transmitted through the variable marker display device. The augmented reality system can prevent the system from providing further instructions for the process setup until a verified component is used in place of the counterfeit component or the block has been over-ridden by an operator containing the rights to override. Any deviation in the components used will be recorded in the batch record.

The augmented reality systems described here comprises of at least one variable marker, at least one detection device for the marker(s), at least one processor system, at least one local and/or networked database, at least one augmented reality software platform, and at least one display system. The variable marker can be as simple as an embodiment of a basic manually turned scrolling banner that contains multiple augmented reality displays. The variable marker could also be a complex embodiment consisting of a variable marker device that can feature at least one or more of the following components in combination, at least one display device, at least one processor device, at least one sensing device, at least one input device, at least one storage device, at least one networking device, and at least one power device.

The display device for a variable marker device can consist of an electronic display system such as an electronic ink, LED, OLED, LCD, plasma, touchscreen, projection, or other visual display. The variable markers can comprise of variable optical markers, such as bar codes, datamatrix codes, QR codes, text, numbers, alphanumeric characters, symbology, images, pictographs, color codes, video, the shape of the objects, waveforms, signaling or moving displays, visual or nonvisual displays, such as infrared LED's, and visual displays that are altered by physical events (physical, chemical, biological, mechanical) such as a dark fluid passing through a tube under the visual marker or bacteria growing at a certain rate in a marker containing nutrient rich media; audio markers can consist of variable audible and/or inaudible frequencies as well as ultrasound; electromagnetic markers, such as Radio Frequency Identification (RFID) and/or Near field Communication (NFC) tags, metal stripes, and so on; a pressure display which can consist of a pressure source exerting force against an object, such as two connected parts or a pressure source against a diaphragm, and/or a pressure measurement from a pressure measuring device; or an electrical display in which a gated electrical circuit is powered and the outgoing signal is measured based on the multiple pathways of a circuit. The variable marker can also comprise of a simulated virtual marker that comprises a virtual geospatial location and shape that are displayed on the display device. These simulated virtual markers can be linked to a physical marker, object, or location and can use a physical occluder and/or a motion sensing device to activate the simulated marker.

A virtual variable marker exists as a computer program product that is overlayed onto a digital display from a sensor device which can be recognized by an augmented reality system. A virtual variable marker can occupy space in a physical location based on a coordinate system. This coordinate system can be composed of a 3 dimensional space, a GPS coordinate, a coordinate based off an originating location, or a coordinate based off the distance from a marker, a physical object, or a plurality of physical objects. A virtual variable marker can exist in multiple dimensions or angles simultaneously where the dimension or angle recognized by the augmented reality system is displayed and the other variants of the augmented reality marker can be discarded or ignored by the augmented reality software. This is applicable to determining the exact angle of content to display within a workspace area. This can determine the motion parallax and keystone correction based on the angle of the operator and the angle of the item in the workspace area in which to display the overlayed content. A virtual variable marker can also utilize time as a dimension to display different variants of the virtual augmented reality marker over several time points or the virtual marker can exist in a single or multiple coordinates serially or simultaneously within a specified period of time.

The processing device on the variable marker device can comprise of a microcontroller, a microprocessor, and/or an integrated circuit configured to receive data from the at least one sensing device and transmit data to the output device. The processing device can be part of a computing system such as a PC. The processing device can also be a part of a network of devices. The processing device can be internally or externally configured on the variable marker device.

The at least one sensing device on the variable marker device can be setup as a singular, as multiple, as remote, or as networked devices. A singular sensing device can be placed in a fixed or movable position, on the augmented reality marker device and can connect directly to the processor device and/or the variable marker display device through wired or wireless connections. Multiple sensing devices can be placed in fixed and/or movable positions, on the augmented reality marker device and can connect directly to the processor device and/or to the display device or to other sensing devices through wired or wireless connections. A remote sensing device can be external to the variable marker device but is connected to the device with a physical, such as a cable, and/or a remote connection, such as an infrared LED to photodiode data link. Networked sensing devices can be located external to the augmented reality marker device and can be connected to other sensing devices or through connection hubs that can encompass multiple locations and multiple systems. These networked hubs can connect to a single processing device and/or to multiple processing devices and a single display device and/or to multiple display devices through wired or wireless connections.

The at least one sensing device for the variable augmented reality display device can comprise any of the following: a camera device, a video camera, an RFID scanner device, a near field communication device (NFC), a Global Positioning System device, a barcode scanner device, a microphone, a laser reader device, a detector of electronic signals, a medical scanner, an electronic or visual input from industrial and/or laboratory and/or pharmaceutical equipment, a motion detection system, a visual detection system, an audio detection system, a sensory detection system, a pressure detecting device, or any electronic input devices, or a combination of such devices, for the real-time detection of a position of the marker. The at least one sensing device can provide information to a processor device and/or an output device through a wired or wireless communication system. Any one of the at least one sensing devices can be powered by a power cord, a powered data cable (USB), a battery, and/or wireless power sources. The sensing device on the variable marker device is preferably a camera device.

The output device can comprise any one of a display device such as a monitor, a visual touch screen, a projector, a mobile device screen, a notebook or a table computer screen, a heads up display, a head mounted display (e.g. glasses having an incorporated display), a wearable display, a printer, or a haptic device, or a wired or wireless audio/visual/sensory device, or a combination of such devices. The display device can be configured for displaying the augmented image to an operator as a merged or new display with the first part and/or second part of the marker and/or the respective first and/or second set-up component. The output device can comprise a haptic device for outputting the augmented image as a merged display or output for physically sensing the marker. The augmented image can be adjusted and/or displayed in accordance with the selective positioning of the parts of the marker or the marker by the user. The display of the augmenting image can be altered to show the merged display in real-time in accordance with the position and orientation of the marker. The augmented reality content displayed on the display device can include text, audio, symbols, charts, graphs, slides, images, drawings, arrows, annotations, videos, animations, coordinates, or other data to assist the operator in completing a work task.

The variable marker can change its presentation to an augmented reality system based on an input by an operator, a computer product input, and/or at a programmed interval. An input by an operator can include the pushing a button, a lever, a latch, or other physical actions such as the turning a page, a simulated action such as a hand gesture with a motion sensing device, or a virtual action such as through a brain-computer interface. The input by the operator can also include an action such as the assembly of components, the insertion of a component, or a physical connection between components. The operator action can occur with the variable augmented reality device or with a remote device that is linked to the augmented reality device. An input by a computer product can include a software input, a hardware input, a sensing device input, a measuring device input, a processing device input, a computer program product input, an external device input, an input from an external marker or augmented reality system, or a combination of multiple inputs from multiple sources or multiple inputs from the same source. This will allow for changes to the variable markers to be made during the operation of a device from external or internal changes to the equipment, the software, or by measured changes within set parameters that occur during the operation of the device. The variable markers can also change based on a programmed interval which can be a pre-determined unit of time or sequences of events, a randomized interval of time or sequences, an operator changeable interval, or an interval determined by a programmed product based on the data received from a measured system.

One aspect of the invention provides a computer program product, such as a computer readable storage medium, for a computer-aided assembly of a measurement or production set-up and/or for automatically operating a measurement or production set-up, wherein the computer program product comprises coding segments that when loaded and executed on a suitable system can execute an assembly and/or monitoring method according to the invention. The storage medium according to the invention can be a volatile or permanent storage medium, such as a DVD, a CD, a floppy disk, an EEPROM, a memory card, a data stream and so on. The suitable system may comprise a general purpose computer like a PC, a workstation, a microcontroller, an embedded PC, a smartphone and the like.

The variable marker devices, the sensing devices, the monitoring devices, the display devices, the storage devices, and the processing devices can communicate with one another, an internal processing and/or storage system, or an external processing and/or storage system (cloud) through the use of networking devices. These devices within the augmented reality system can transmit information to a network device via a contactless communication system consisting of a visual variable marker, an audio signal, or a radio communication such as radio-frequency identification (RFID) or near-field communication (NFC) or by means of a wired/wireless connection. The networking device can transmit this information to an internal network (intranet) or an external network (internet, cloud) via a wireless (WiFi, cellular, satellite, microwave) or wired (Ethernet, cable, fiber-optic, DSL, dial-up) methods. The networking devices can be located in fixed and/or movable positions, inside and/or outside of the working space and may be connected to other networking devices or through connection hubs that can encompass multiple locations and multiple systems. These networked hubs can connect to a single processing device and/or to multiple processing devices through wired or wireless connections.

The variable marker device and associated devices can be powered by a battery, preferably a rechargeable battery. This battery can be recharged by a powercord, an inductive charger, a solar charger, wireless power or other charging device. The variable marker device can also be powered by a powercord, a powered data cable (USB), an external battery, and/or wireless power sources.

The variable marker device can be utilized to present information to an operator through an augmented reality display and/or to communicate data directly to an augmented reality system. The data communication through a variable marker can serve as a low cost, secure data communication method to aggregate data from a large number of disparate devices from a variety of manufacturers to a centralized system. This is particularly the case for low bandwidth devices or devices that can spread non-critical data over an extended time period.

External measurement or testing devices can provide data to a variable marker device using a variety of methods but they can be read by the augmented reality system through a unified communication method. On a local level the variable marker device can provide real-time information to an operator which can be read on an augmented reality display device.

In this case the augmented reality display device is likely to be a mobile device carried by the operator. The mobile device containing a sensing device, preferably a camera, a display device, a processing device, a memory device, and augmented reality software can detect and read the information from the variable marker and provide the information to the operator. The information can be presented to the operator as an augmented display or can be combined with additional data from sources as a blended display. An embodiment of a mobile device viewing a variable marker can be provided as an operator using a pair of wearable augmented reality glasses containing a display device, camera, and a communication device, along with a cooperative processing, storage, and communication device (such as a smartphone), where the operator views an integrated variable marker on a single-use bioreactor system. The operator can bring the variable marker into the viewable field of the camera and receive augmented information about the single-use bioreactor through the display device on the augmented reality glasses. This data can include measurement information from the unit itself, upcoming events that need to performed on the unit, a listing of connections made to the equipment (even in the back or sides of the unit which are not within the viewable field), linked documentation for the unit and accessories, instructions for the setup of equipment and confirmation of completed tasks, step-by-step instructions for following standard operating procedures, and to provide for training for the operator to operate the equipment.

The communication between the variable marker system and the augmented reality system can be a two-way communication where the augmented reality system can communicate data back to the products or equipment containing the variable marker device. The data from the augmented reality system can include result data, test program parameters, form data, images, videos, or other content, diagnostics, system updates, and software updates or upgrades. A mobile device can also be used to communicate through variable markers to the equipment containing the variable marker device. As an example a service technician from the equipment company can use a mobile device to communicate to an integrated variable marker device utilizing visual augmented reality markers to save and distribute the test program parameters, test results, and software upgrades onto several of the same measuring equipment devices such as automated integrity testing units. This would allow the service technician to upgrade the systems and update them all with the same test parameter programs by simply holding up a mobile device containing a camera and a display screen to the camera and screen of the integrated variable marker device and running a software application on the mobile device to perform the instructed tasks.

Additional objects, advantages and features of the present invention will now be described in greater detail, by way of example, with reference to preferred embodiments depicted in the drawings.

DETAILED DESCRIPTION OF THE PREFERRED EMBODIMENT

Figure 1:
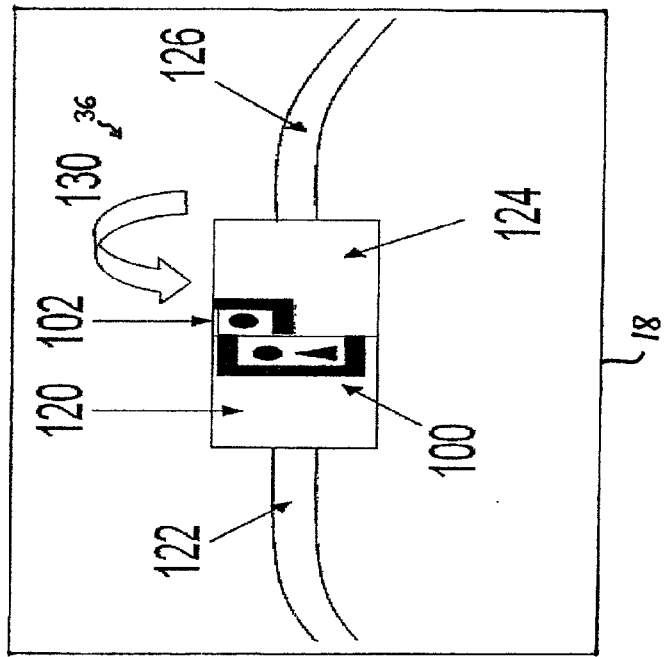
FIG. 1 illustrates a preferred embodiment of an augmented reality system.
Figure 1:
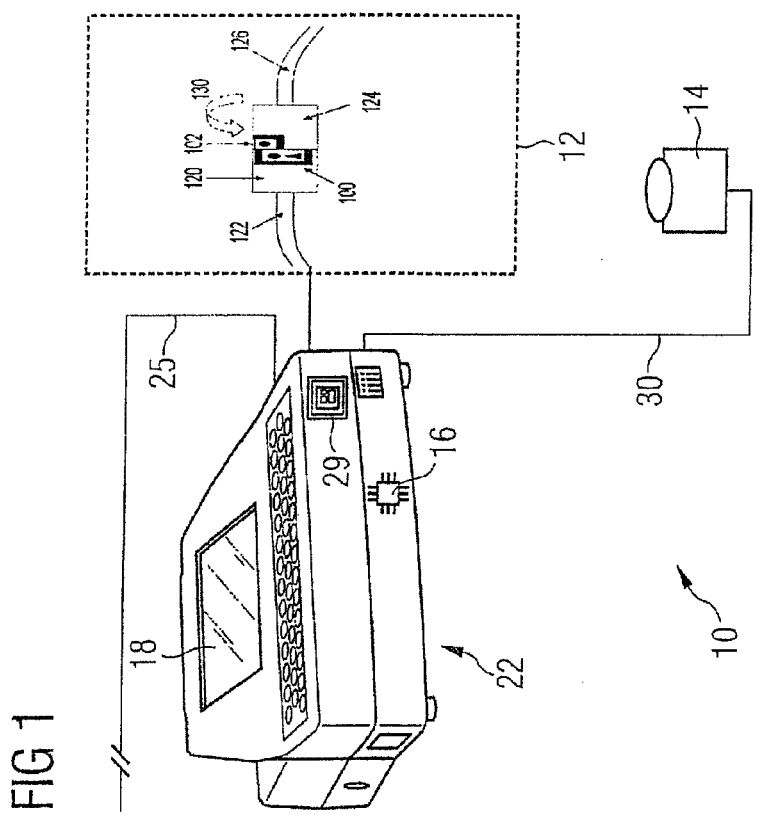
Figure 2:
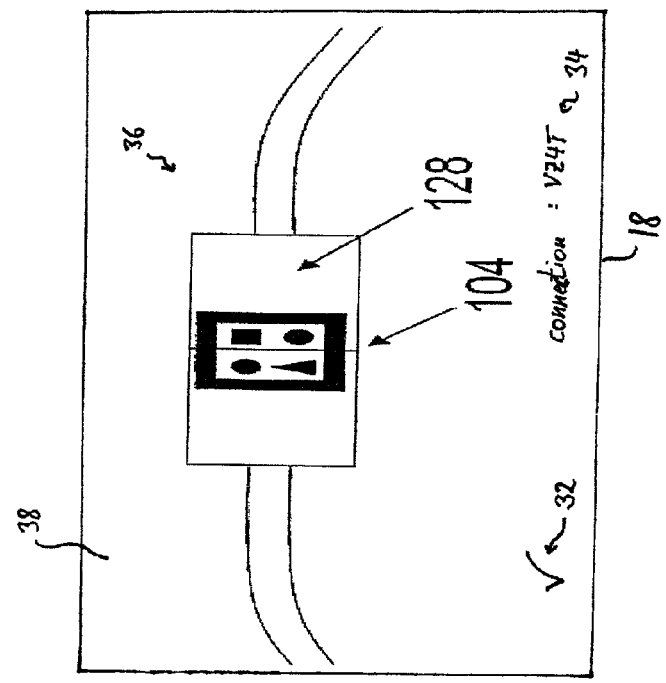
FIG. 2 shows the system of FIG. 1 at a later stage.
Figure 2:
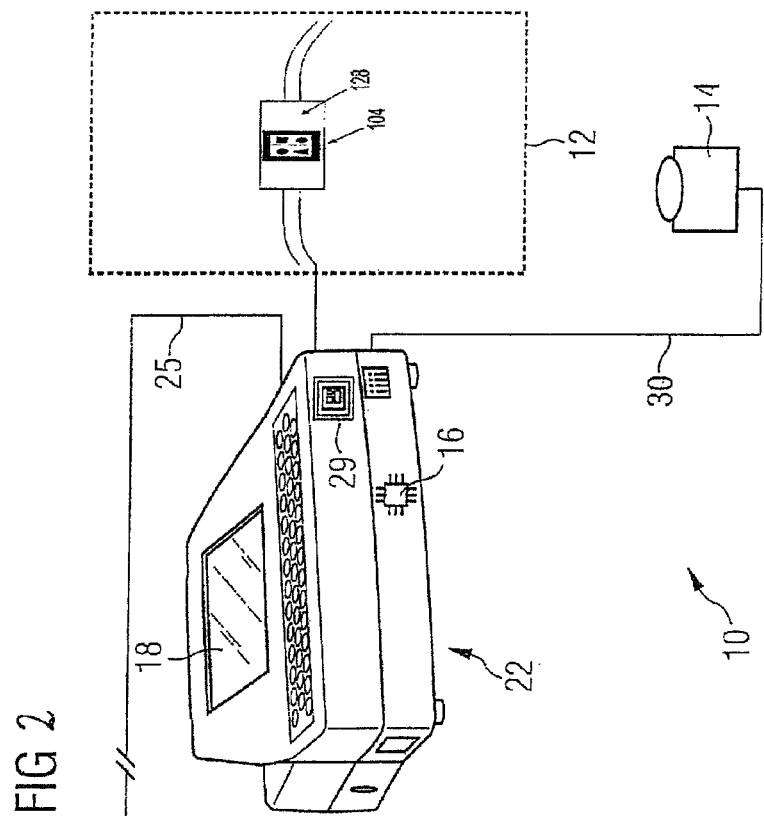

FIGS. 1 and 2 show an augmented reality system 10, which can be used for monitoring the connection of a hose comprising a left hose part 122 and a right hose part 126 located in a working space 12. The augmented reality system comprises at least one sensing device 14, a processing device 16, an augmented reality software, and at least one display system 18. One or more of the comprises at least one sensing device 14, the processing device 16, and at least one display system 18 can be part of a testing device 22.

The working space 12 may be delimited by a working floor, a ceiling and/or at least one vertical wall. The vertical wall, the ceiling and/or the working floor may comprise a transparent material, which is transparent to visible light, to infrared radiation and/or ultraviolet radiation. The transparent material may be a glass, an acrylic glass, a transparent polymer, lead silicate, calcite and/or gypsum. In particular the working space may be enclosed by working floor, ceiling and at least one vertical wall, whereby the working space may be separated air-tight from the outside of the working space 12.

The at least one sensing device 14 is configured to detect at least one type of marker that is embedded and/or mounted on devices, products, parts, items or consumables in order to read a unique identification from the marker and/or localize the marker. As shown in FIGS. 1 and 2 the at least one sensing device 14 may comprise a camera device 14, which is adapted to capture images of a predetermined working space 12 and to provide the captured image data to the processing device 16. As shown in FIGS. 1 and 2, a testing setup including the hose 122, 126 can be located within the working space 12 and the assembling procedure may include fluidly connecting the left hose part 122 with the right hose part 126, for example by turning the right hose part 126 relative to the left hose part 122, as this is required e.g. for screw connectors.

The testing device 22 comprising the processing device can be located at least partly within the working space 12 or outside the working space 12. A fluid connection can be established between the testing device 22 and another set-up component by the hose 122, 126. The testing device 22 can be configured to provide a fluid, i.e. a gas or a liquid, in order to provide the fluid via the hose 122, 126 to one or more further set-up components.

The camera device 14 is configured to capture optical markers, e.g. bar codes, color codes, pictograph, the shape of items, alphanumeric characters etc., which may be located on the items located in the working space. As an example a first part of a connector marker 100 in form of a pictograph is attached to the left connector 120 attached to the left hose part 122 and a second part of a connector marker 102 connection hose marker is attached to the right connector 124 attached to the right hose part 126. In order to fluidly connect both connectors 120, 124 correctly, the right connector 124 may be twisted counter clockwise along the turning direction 130.

With reference to FIG. 1, the second part of the connector marker 102 is incomplete and, therefore, the connector marker is not recognized by the processing device 16 of the augmented reality system. A representation of the image data 36 of the working space 12 captured by the camera 14 can be presented to an operator on the display device 18. The display device 18 can comprise a monitor, e.g. a liquid crystal display (LCD), a cathode ray tube (CRT), a touch screen monitor and/or a projector (beamer). The display device 18 can be fixedly located, e.g. at the working space, at the processing device 16, at the testing device 22 or at a distant location like a control center. Further, the display device 18 can a mobile display device, e.g. the display of a notebook computer, a tablet computer, a cell phone, a wearable display or a head mounted or heads up display.

With reference to FIG. 2 the hose connectors 120, 124 can be connected and/or locked into place by a twisting action 130, which also properly aligns the first part of the connector marker 100 and the second part of the connector marker 102. As a result the pictograph of connector marker 104 is completed and can be identified by the processing device 16.

In order to support the operator in setting up the component in the working space 12, the processing device 16 can analyze the image data obtained from the camera device 14, identify any marker contained in the image data. Since the completed connector marker 104 can be identified by the processing device a status information 32 can be displayed on the display device 18. Furthermore, based on the identified connector marker 104 additional information can be retrieved from a database correlated to identified markers and superimpose the representation of the additional information 34 with a part of the image data 36 in order to generate an augmented display image 38. The image data 36 and the representation of the additional information 34 can be displayed in real-time, whereby the identified marker 104 can be used for positioning the representation of the additional information 34 within the augmented display image 38. The representation of the additional information 34 can comprise texts and/or graphical elements, whereby the representation of the additional information 34 and the image of the correlated item, e.g. the connector 128 comprising the connector marker 104, can be positioned closely together within the displayed augmented image 38. Sometimes it may even be preferred that the additional information at least partly covers the correlated item shown in the augmented image 38.

The at least one camera device 14 can be positioned in the interior and/or exterior of the working space 12. In case one of the at least one camera device 14 is positioned inside the working space 12, the respective camera device 14 may be encapsulated fluidproof by a camera casing and/or a superhydrophobic coating in order to avoid a contamination of the camera device 14 with chemicals and/or microorganisms from within the working space 12. In case one of the at least one camera device 14 is positioned outside the working space 12, the respective camera device 14 may be capturing the images of the working space 12 through a transparent vertical wall, ceiling or working floor. In order to enable a determination of positions of various items relative to predetermined locations of the working space 12 the working floor, the ceiling and/or the at least one vertical wall may be provided with at least one fixed marker.

The camera device 14 may be a video camera or a still camera, whereby the camera device 14 may be positioned at a fixed position relative to the working space 12 or may be movable with respect to the working space 12, thus capturing images of the working space 12 from different angles of view. In case of a mobile camera device 14, the processing device 16 may control a camera positioning device, which is configured to transfer the camera device 14 from one angle of view to another angle of view.

The camera device 14 may be sensitive to visible light, infrared radiation and/or ultraviolet radiation of at least one wavelength. The camera device 14 may repeatedly capture images of the working space, whereby the image capturing frequency may be variable or constant, e.g. larger than approximately 1 Hz, preferably approximately 25 Hz. The image data captured by the camera device 14 may be transmitted to the processing device 16 via a cable connection 30 or via electromagnetic waves. The processing device 16 is configured to process the image data captured from the at least one camera device 14 in order to extract the image of any marker, e.g. the connector marker 104, contained in the captured image data. The extracted marker image(s) may be matched with a dataset from a local or remote database in order to identify the marker and retrieve additional information belonging to the identified marker from the database or from other data sources, which location is stored in the database. Based on the retrieved additional information and the captured image data the processing device 16 can compute status information of the testing setup.

The augmented reality system 10 shown in FIGS. 1 and 2 can be utilized in multiple ways to assist the operator in obtaining information and/or for performing tasks related to the testing device 22. The displaying of additional information about equipment, parts, consumables and/or items, e.g. the connector 128, located in the working space 12 and/or attached to the testing device 22 can be achieved by capturing the respective marker attached to or embedded in the physical item by the at least one sensing device 14, whereby a unique identification of the marker is matched with the database by the processing device 16. As an example, the connector marker 104 attached to the connector 128 is captured by the camera device 14, identified by the processing device 16 and additional information related to the connector 128, which may be contained in an internal database of the processing device 16, is retrieved and a representation of the additional information 34 is displayed on the display device 18. The additional information linked to the marker can be accessed by changing the orientation or angle of the physical item, e.g. the connector 128, or by changing the angle of view of the at least one camera device 14.

As an example, displaying additional information about an item located in the working space 12 or initiating a predetermined action of the system 10 or the testing device 22 can be triggered by a physical movement of the item that may change the properties of the marker or by occluding the marker of the item.

Since the augmented reality system shown in FIGS. 1 and 2 can capture and detect multiple markers by means of the camera device 14 the processing unit 16 can compare the distances, the orientation, and the relationship between the detected markers based on the captured images of the working space 12. The processing unit 16 may compare the determined distances with an local or remote database to confirm with the operator if a particular unit and/or setup is properly assembled and if corrections in the setup need to be made prior to use. This will allow the operator to have the setup of equipment located in the working space 12 checked by the augmented reality system 10. In case the setup is not assembled correctly, the processing unit may issue instructions to the display device 18 to show how to reach the correct setup prior to the use of the setup.

In case the assembly of the connector 104 and/or further components of the testing set-up is/are correct, information concerning the further proceedings may be displayed within the augmented display image 38. For example data sheets and testing parameters can be displayed on the display device 18. According to the data sheets and testing parameters the operator can perform the testing. The data sheets and/or testing parameters can be retrieved from a local database or from a remote database. Most recent data sheets and testing parameters for recent items or products can be provided by the manufacturer or sales representative of the respective items or products via a remote database.

With regard to the FIGS. 1 and 2, the status information and/or the retrieved additional information like the testing parameters can be used to control the testing device 22. Thus, the processing device 16 can be connected via a cable or a wireless connection to the testing device 22 for data exchange. Further, the processing device 16 and the testing device 22 may be arranged in one housing. The housing may further comprise a housing marker 29 in order to detect the presence and/or position of the testing device 22 in the working space 12. The testing device 22 may further comprise a fluid source 25, which may provide the hose 122, 126 with a fluid. The augmented display image 38 displayed to the operator by means of the display device 18 may comprise control elements for controlling the test procedure and/or for selecting predefined actions, such as retrieving information, start the testing and so on.

In case the setup is not assembled correctly, the processing unit 16 may block an activation of the integrity testing device 22 until a correct assembly is established or the operator overrides the blocking by entering an override instruction. The blocking of the activation may comprise that the testing device interrupts a fluid connection between the fluid source 25 and the hose 122, 126.

Figure 3:
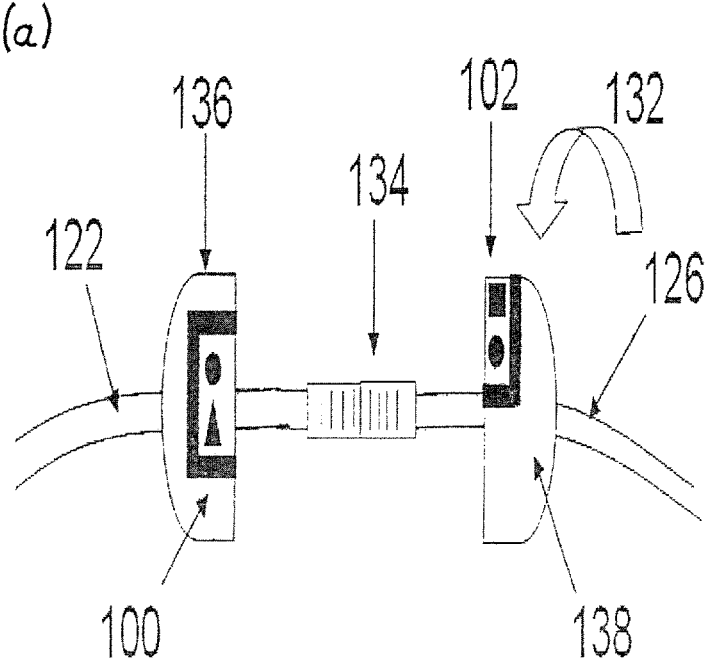
FIG. 3 shows two halves of a marker in a disconnected and a connected state.
Figure 3:
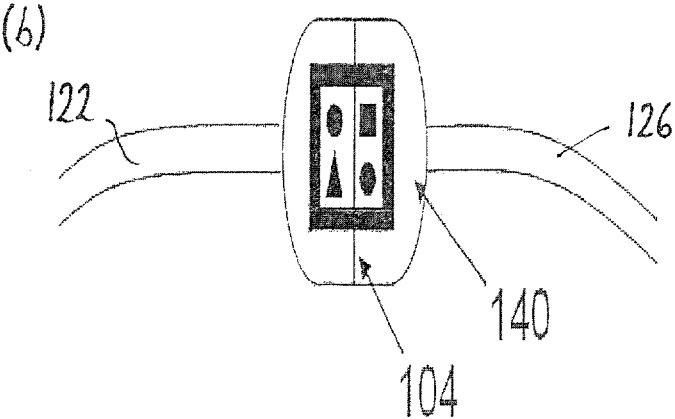

FIG. 3 shows in view (a) a front view of two hoses, namely a left hose 122 and a right hose 126, that are connected together with connectors 134. A left external collar 136 with a left half of a connector marker 100 is incomplete and is not recognized by the augmented reality system. A right external collar 138 with a right half of the connector marker 102 is partially obscured from view, is also incomplete, and is therefore not recognized by the augmented reality system. The external collars 136, 138 can be locked into place by a twisting action 132 which properly aligns the halves of the connector markers 100, 102. View (b) of FIG. 3 is a front view of the two external collars 136, 138 that are connected together. The connected external collars 140 have a properly aligned connector marker 104 that is recognized by the augmented reality system and registers with the system as a completed work event and the successful assembly of the two hoses 122, 126.

Figure 4:
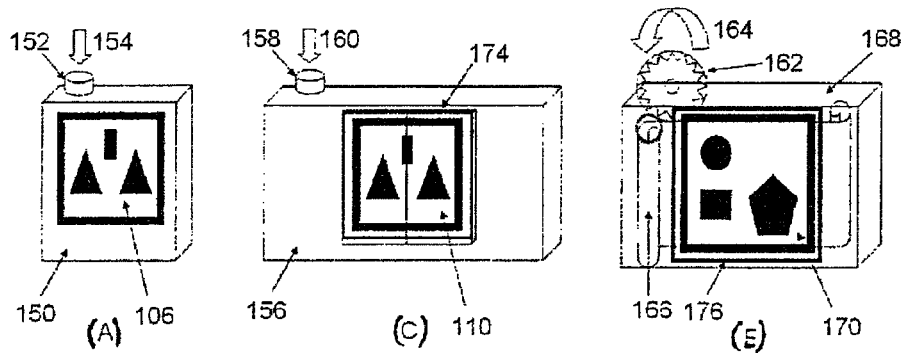
FIG. 4 shows embodiments of a variable marker that is manually changeable by an operator.
Figure 4:
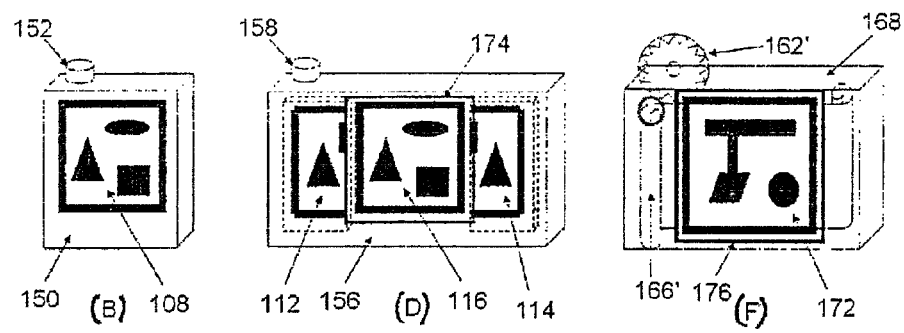

FIG. 4 shows embodiments of a variable marker that is manually changeable by an operator. View (A) of FIG. 4 is a front view of visual display 150, in particular an electronic visual display, that is displaying a visual variable marker 106. The operator may push a visual display button 152 with a pushing action 154 in order to denote that a work task has been completed. Accordingly, view (B) of FIG. 4 shows the visual display 150 after the visual display button 152 has been pushed by the operator and a new visual marker 108 is presented to the augmented reality system.

View (C) of FIG. 4 shows a front view of a visual display 156, in particular a mechanical or manual display, that is displaying a visual variable marker 110 through a window 174. The operator may push a manual display button 158, wherein the pushing action 160 denotes that a work task has been completed. Because of the pushing action 160 the variable marker 110 changes to a state as shown in view (D) of FIG. 4. As shown, an internal lever (not shown) that separates the variable marker 110 into a left half 112 and a right half 114, when the visual display button 158 is pushed by the operator. The left half 112 and the right half 114 slide to each side and another marker 116 is revealed underneath that is visible through the window 174 and is presented to the augmented reality system.

View (E) of FIG. 4 shows is a front view of a scrolling banner visual display 168, particularly a manual scrolling banner visual display, that has a visual variable marker 170 displayed through a window 176. The operator may wind the scroll wheel 162 with a winding action 164 in order to moves the visual display on the internal scroll 166 so that a new marker becomes visible through the window 176, as shown in view (F) of FIG. 4. After the operator has turned the scroll wheel to a secondary position 162' and the internal scroll banner has moved to a new position 166', the new visual variable marker 172 is presented through the window 176 to the augmented reality system.

Figure 5:
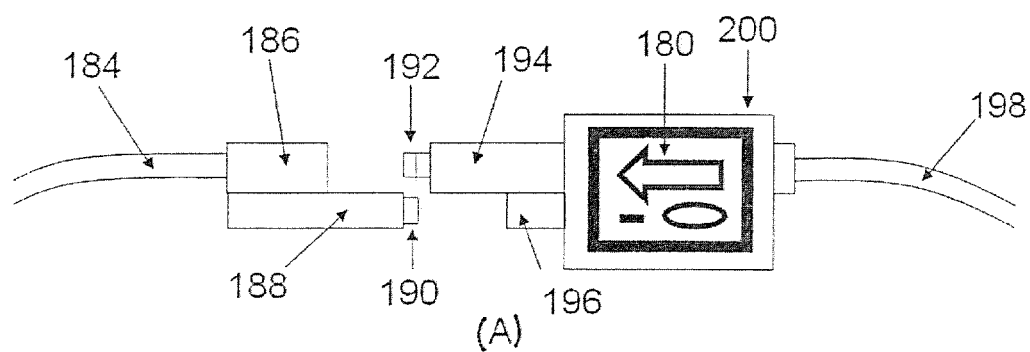
FIG. 5 shows an embodiment of a variable marker associated with a first connector.
Figure 5:
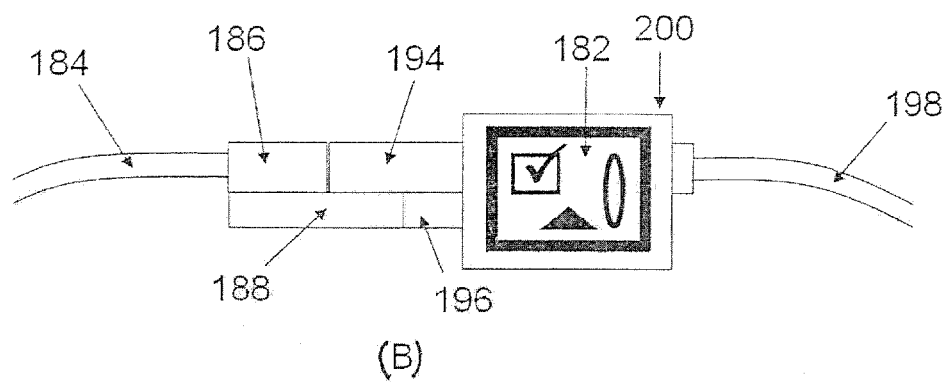

FIG. 5 shows an embodiment of a variable marker 180,182 associated with a first connector 194. View (A) of FIG. 5 shows a front view of a first tubing 184 which uses a first connector 186 to connect to a hose 198 through a second connector 194, which is complementary to the first connector 186. For example the first connector 194 can be a female connector 194 and the second connector 194 can be a male connector 194, which may comprise a male quick connector 192. A first adjacent connector 188 attached to the main first (female) connector 186 contains a male shaft 190 that connects with an second adjacent (female) connector 196 of the second connector 194. A visual variable display assembly 200 presents a first state of a variable marker 180 prior to the connection of the hose 198. View (B) shows a front view of the connected hose assembly where the first and second connectors 186, 194 are properly connected and the first and second adjacent associated connectors 188, 196 are properly connected. When the adjacent associated connectors 188, 196 are connected the male shaft 190 may push an internal mechanism on the second adjacent connector 196, causing a mechanical and/or electronic contact or button to transfer a mechanical and/or electronic signal to the variable display assembly 200 where it results in a change of the variable display to present a second state of the variable marker 182 which is presented to the augmented reality system.

Figure 6:
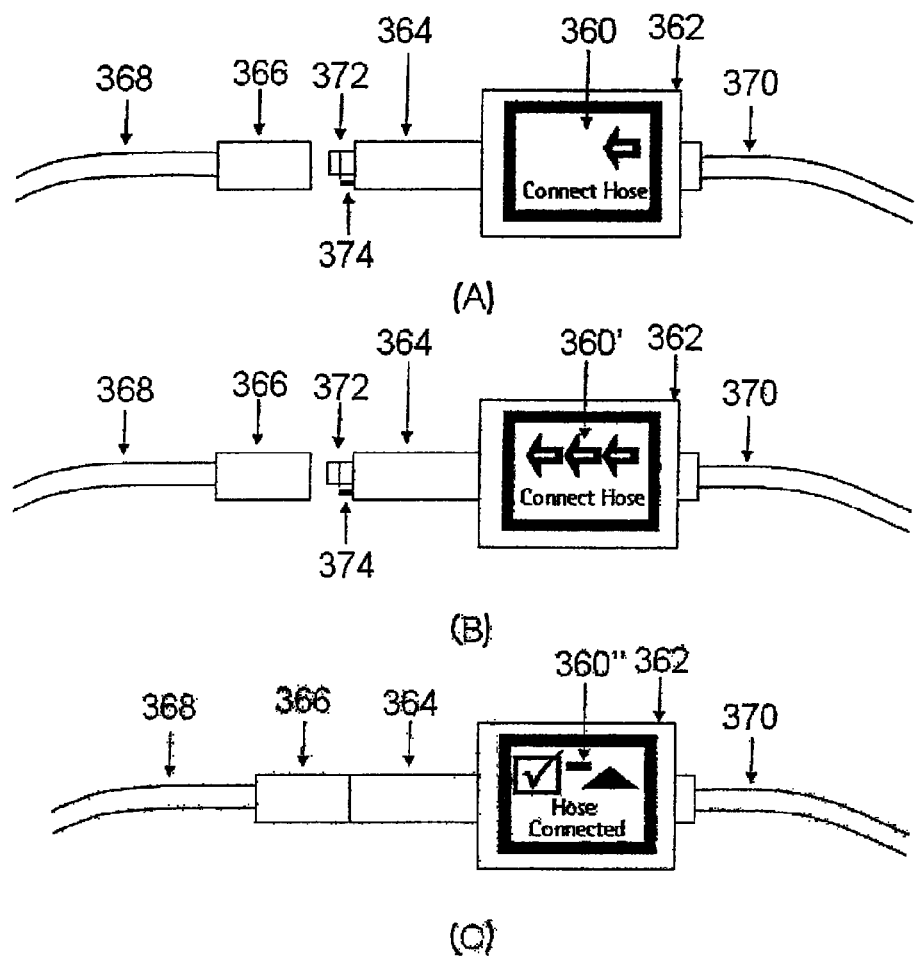
FIG. 6 shows an embodiment of a variable marker which can provide instructions to the operator for connecting at least two parts.

FIG. 6 shows an embodiment of a variable marker 360, 360', 360" which can provide instruction(s) to the operator for connecting at least two parts, exemplarily a first connector 366 and a second connector 364.

View (A) of FIG. 6 is a front view of a tubing 368 which uses the first connector 366 to connect to a hose 370 through the second connector 364, preferably with a male quick connect 372. The second connector 364 comprises an integrated associate connector 374 which sends a signal to the augmented reality display system when the hose 370 has been successfully connected. This signal can be a visual signal and/or an electromagnetic signal and/or an acoustic signal. An augmented reality display assembly 362 of the second connector 364 uses a dynamic screen to present an animated visual augmented reality display 360 that can instruct the operator through text, symbols, iconography, animation, video, audio, and/or other content the next step in the proper assembly of the connectors 366, 364.

View (B) of FIG. 6 is a front view of the hose assembly with the augmented reality display assembly 362 presenting another frame of the animated visual augmented reality display, i.e. another state of the variable marker 360', instructing the operator to connect the hose 370.

View (C) of FIG. 6 is a front view of the connected hose assembly where the hose connectors 364, 366 are properly connected. The integrated associate connector 374 may be depressed or in electrical contact with a complementary connector when the hose connectors 364, 366 are connected, causing a mechanical and/or electronic signal to the augmented reality display assembly 362 resulting in a change of the dynamic animated augmented reality display 362 to a new animated augmented reality display, i.e. a new state of the variable marker 360", which is presented to the augmented reality system and informs the system of a properly connected hose.

The dynamic animated augmented reality display 362 is an example of a variable marker, wherein the correct connection of the two connectors 364, 366 may result in the presentation of a new state of the marker which is displayed to the augmented reality system.

Figure 7:
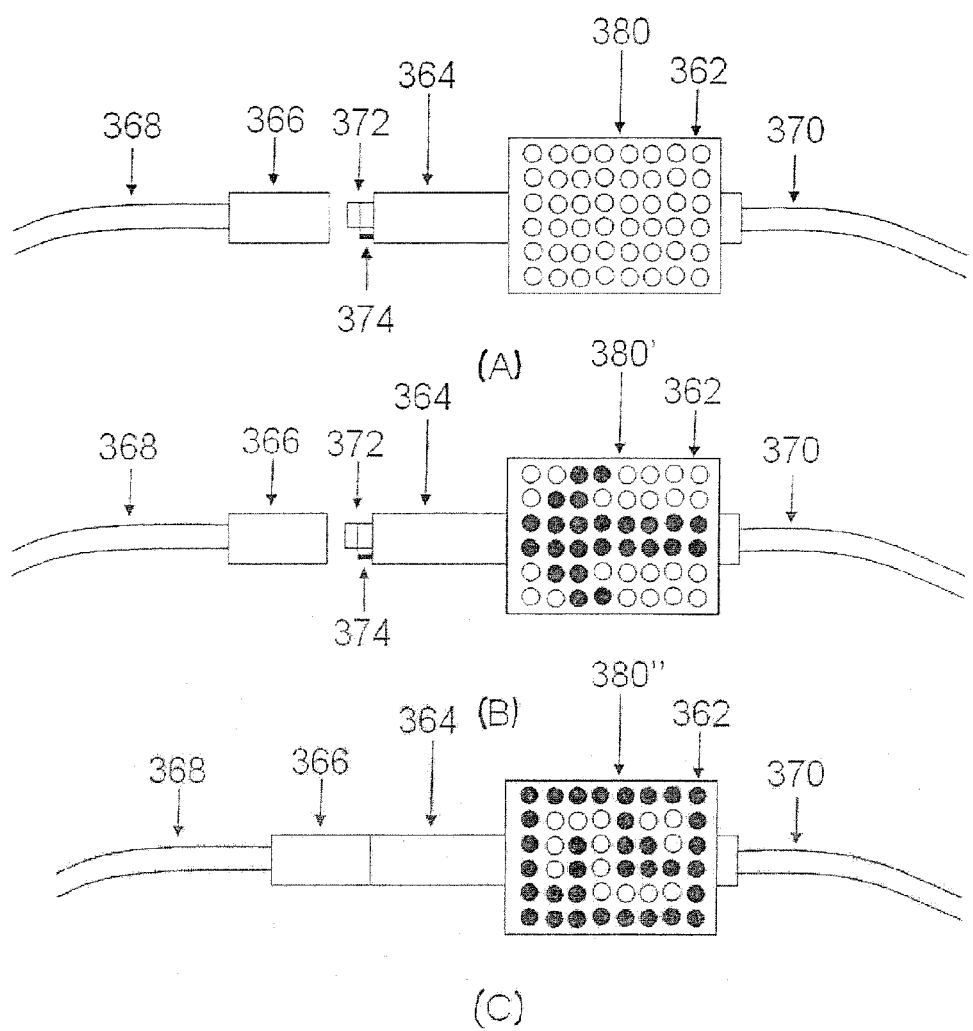
FIG. 7 shows an alternate embodiment of a variable marker using light emitting diodes (LED's) forming a display.

FIG. 7 shows an alternate embodiment of a variable marker 380, 380', 380" using light emitting diodes (LED's) forming a display 362 capable of instructing the operator to connect at least two parts, for example a tubing 368 and a hose 370.

View (A) of FIG. 7 is a front view of the tubing 368 which uses a first connector 366, exemplarily a female connector 366, to connect to the hose 370 through a second connector 364, exemplarily a male connector 364 which may comprise a male quick connect 372. The second connector 364 has an integrated associate connector 374 which sends a signal to the augmented reality display system when the hose 370 has been successfully connected to the tubing 368. The augmented reality display assembly 362 uses a dynamic LED screen to present a variable marker 380 that instructs the operator and/or provides information to the operator through text, symbols, iconography, animation, video, audio, and/or other content. The LED screen can be partially or completely composed of infrared LED's which can send information to the augmented reality system without observation by the operator by operating at a wavelength outside of the human visual range. The infrared LED's can provide information to the augmented reality system through text, symbols, iconography, or pulsating light patterns which can be viewed by a camera that can detect the presented infrared wavelength.

View (B) of FIG. 7 is a front view of the hose assembly with the augmented reality display assembly 362 presenting another frame of the animated visual augmented reality LED display, i.e. a new state of the variable marker 380', instructing the operator with an arrow to connect the hose 370.

View (C) of FIG. 7 is a front view of the connected hose assembly where the first and second connectors 364, 366 are properly connected and the integrated associate connector 374 is depressed. This action causes a mechanical and/or electronic contact or button to transfer a mechanical or electronic signal to the augmented reality display assembly 362 where it results in a change of the dynamic LED augmented reality display to a new LED augmented reality display, i.e. a new state of the variable marker 380" which is presented to the augmented reality system and informs the system of a proper connection of tubing 368 and hose 370.

Figure 8:
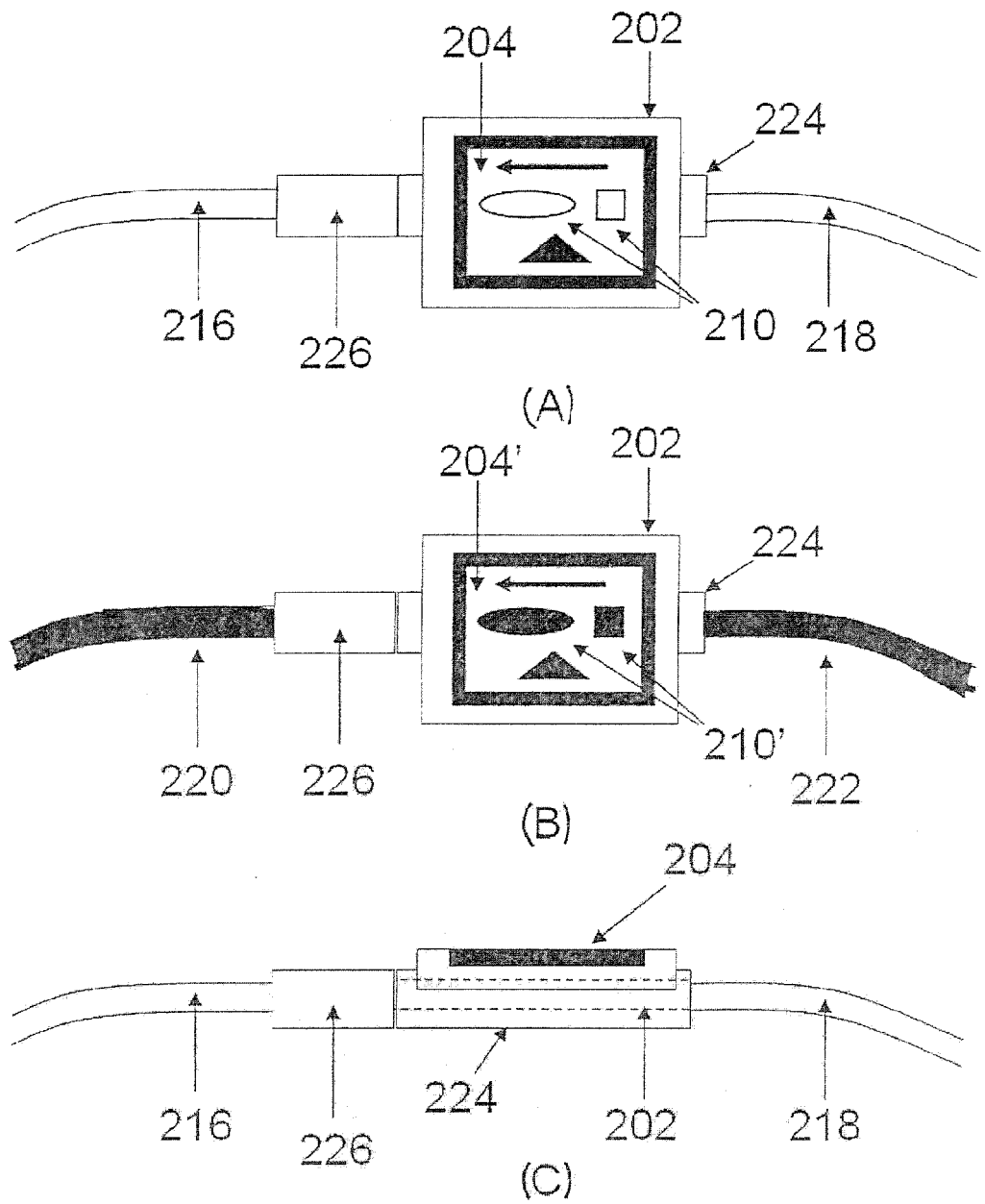
FIG. 8 shows another embodiment of a variable marker.

FIG. 8 shows another embodiment of a variable marker 204, 204' that alters the appearance and display to an augmented reality system based on the presence, non-presence and/or movement of a material adjacent to the augmented reality marker.

View (A) of FIG. 8 is a front view of a hose assembly with a first hose 216 and a first hose connector 226 connected to a second hose 218 via a second hose connector 224 having an augmented reality display assembly 202 capable of displaying a visual variable marker 204. The variable marker 204 comprises two shape elements 210 that are cut into the marker that exposes the clear tubing 218 below or behind the variable marker 204. In other words the clear tubing 218, and thus the fluid inside the tubing 218, can be observed through the cuts of the shape elements 210 of the variable marker 204.

View (B) of FIG. 8 is a front view of the hose assembly when a colored fluid is present in the clear tubing 218, e.g. when the colored fluid in moving through the hose 220, 222. The colored fluid is shown through the openings of the variable marker 204' and results in the visual presentation of the two shape elements filled with color 210'. This results in a new state or appearance of the variable marker 204' to be presented to the augmented reality system and documents the completion of the work step that fluid is flowing through or present in the tubing 218.

View (C) of FIG. 8 is a side view of the hose assembly that shows the augmented reality display assembly 202 with a cutaway view of the clear tubing 218 running underneath the augmented reality marker 204, 204'.

Figure 9:
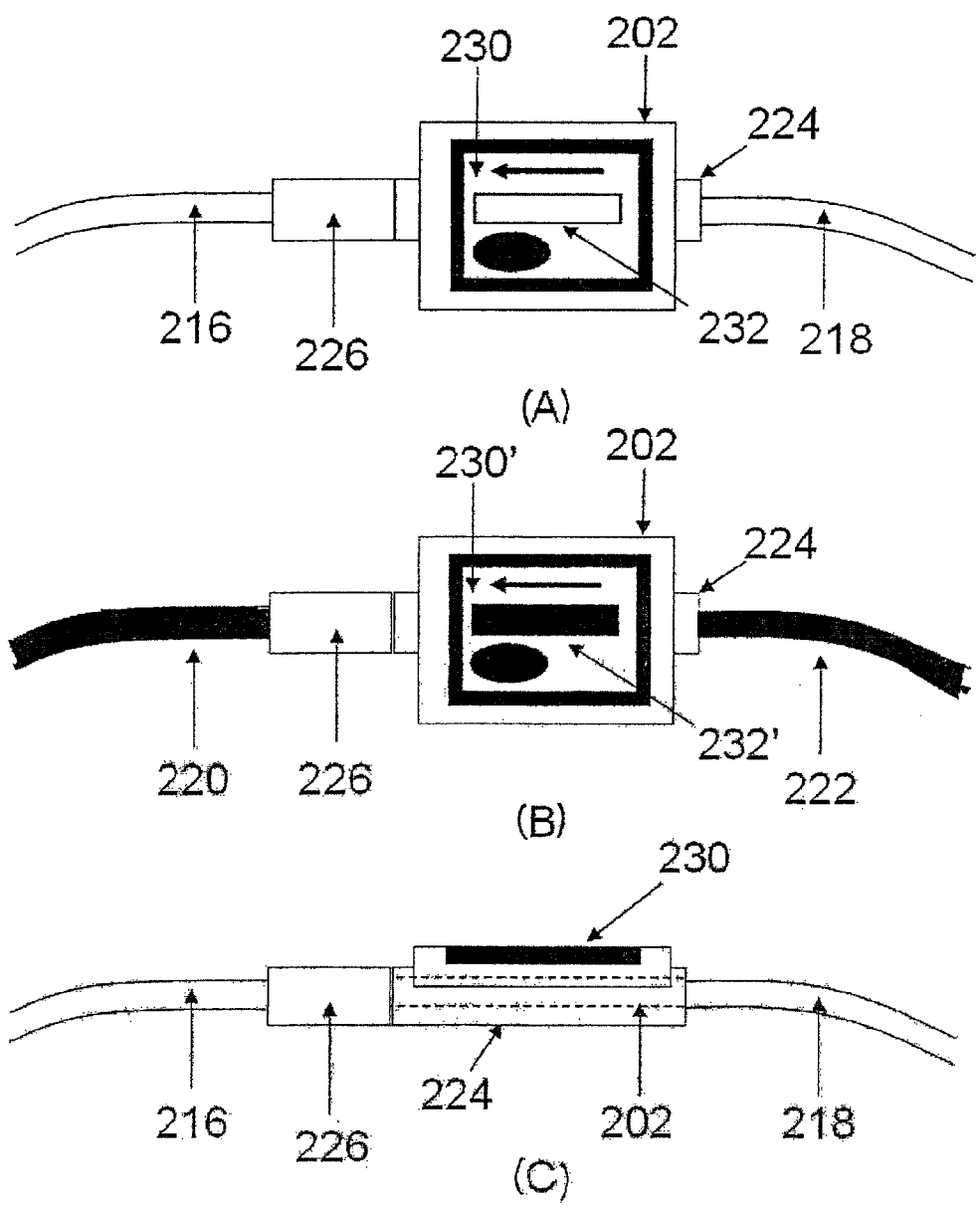
FIG. 9 shows another embodiment of a variable marker.

FIG. 9 shows another embodiment of a variable marker 230, 230' that alters the appearance and display to an augmented reality system based on the presence, non-presence and/or movement of a material adjacent to the augmented reality marker.

View (A) of FIG. 9 shows a front view of a hose assembly with a first hose 216 and a first hose connector 226 connected to a second hose 218 via a second hose connector 224 having an augmented reality display assembly 202 capable of displaying a visual variable marker 230. The augmented reality display assembly 202 may comprise a temperature sensitive device 232, for example a liquid crystal strip 232, that is embedded into the variable marker 230 that may sit atop of a tubing 218.

View (B) of FIG. 9 shows a front view of the hose assembly when a warm fluid is moving through the hose 220, 222. The warm fluid may have a temperature, which is greater than the room temperature, for example larger than 20 degrees Celsius. The heat from the fluid permeates through the tubing 218 and onto the temperature sensitive device 232', which may result in a change in color of the temperature sensitive device 232'. Consequently, the variable marker 230' alters its state resulting in a new appearance of the variable marker 230' that is presented to the augmented reality system and documents the completion of the work step that fluid is flowing through the tubing 218.

View (C) of FIG. 9 shows a side view of the hose assembly that shows the augmented reality display assembly 202 with a cutaway view of the tubing 218 running underneath the temperature sensitive device (not shown) of the variable marker 230. This embodiment of the dynamic augmented reality setup could also utilize shape memory polymers, cold hibernated elastic memory foams, chemical indicators, as well as pressure sensitive or other indicator tapes as a temperature sensitive device.

Figure 10:
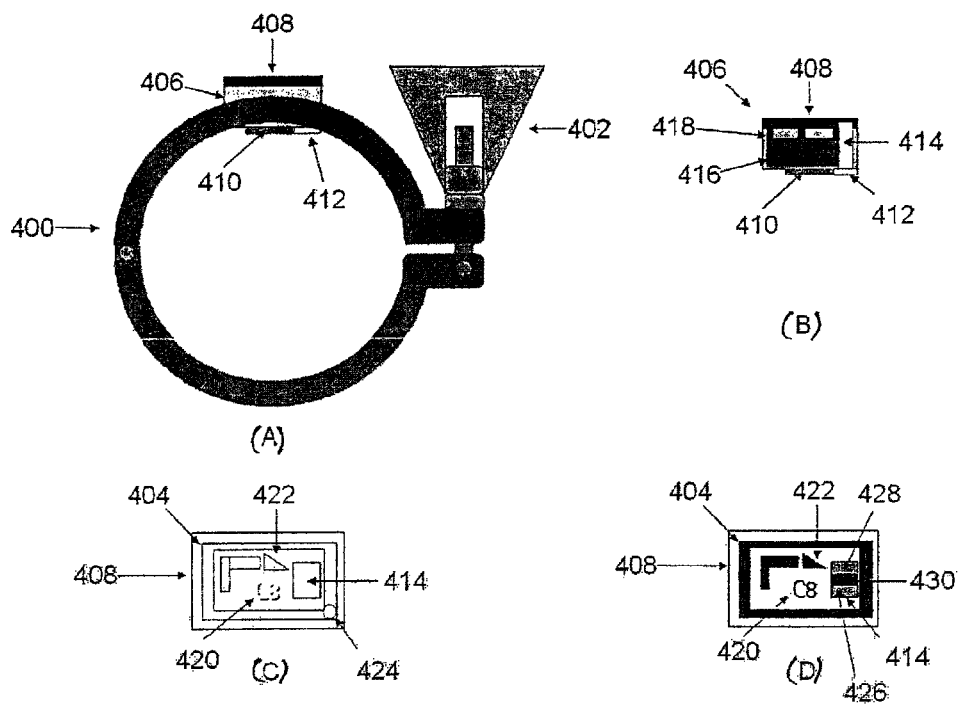
FIG. 10 shows an embodiment of a variable marker, which is pressure sensitive.

FIG. 10 shows an embodiment of a variable marker 408, which is pressure sensitive. The variable marker 408 can be mounted to a tri-clamp 400 as a preferred first set-up component. The variable marker 408 is liquid filled and presents an identifiable marker when the clamp 400 is closed. View (A) of FIG. 10 shows a side view of the tri-clamp 400, which is closed and tightened by a wing-nut latch 402 to fix a second set-up component such as a tubing. An augmented reality assembly 406 presents a variable marker 408 when a pressure plate 410 is depressed during the closure of the clamp around an assembly, like a sanitary assembly, comprising two connectors and a gasket. In other words the variable marker 408 is not presented or identifiable by a augmented reality system in case the clamp 400 is not closed properly. The embodiment depicted in FIG. 10 comprises a liquid dye filled augmented reality assembly 406 providing the variable marker 408. Alternatively, the augmented reality assembly 406 could also comprise a gel, sponge, or polymer base that is pressed against a transparent window to form a recognizable variable marker 408. Additionally an electronic and/or mechanical system can be utilized to present an variable marker 408 when the pressure plate 410 is depressed. A flexible transparent window 412 of the augmented reality assembly 406 can be utilized to confirm the presence of a gasket within the tri-clamp 400 and present it as part of the variable marker 408. Instead of the tri-clamp any other device can be used, which allows to apply pressure to the augmented reality assembly 406, like pressurized hoses, packers, pneumatic or hydraulic devices, pistons and so on.

View (B) of FIG. 10 shows a cutaway side view of the augmented reality assembly 406 that utilizes a flexible liquid reservoir 416 filled with a liquid dye which is compressed by the pressure plate 410 that squeezes the liquid dye through a tube assembly 418 into a closed augmented reality marker chamber 404 which presents the variable marker 408 when the clamp is closed around a tube or a hose or a sanitary assembly. The flexible transparent window 412 and viewing chamber 414 allow to visually control for the presence of the gasket.

View (C) of FIG. 10 shows a top view of an uncompressed augmented reality assembly 406 with a closed augmented reality marker chamber 404 which allows a dye to flow in through tubes connected to the flexible liquid reservoir when compressed and flow back into the reservoir through a drain 424 when the clamp is uncompressed. The variable marker 408 can contain a plurality of shapes and information which may include a clamp identifier 420 and/or an orientation identifier 422.

View (D) of FIG. 10 shows a top view of a compressed augmented reality assembly 406 with an augmented reality marker chamber 404 filled with dye from the flexible liquid reservoir including the clamp identifier 420 and an orientation identifier 422 which can now be read by the augmented reality system when the tri-clamp 400 is closed around a tube or a hose or a sanitary assembly. The transparent viewing chamber 414 can be used to confirm the presence of a gasket 430 as well as an upstream connector 428 and a downstream connector 426. For single use systems the augmented reality marker chamber 404 could comprise a membrane material that allows the dye to migrate to the surface and stain the membrane resulting in a permanent marker display after the clamp 400 has been closed. This membrane can be changed out after each use and be saved as a record of clamp closure.

Figure 11:
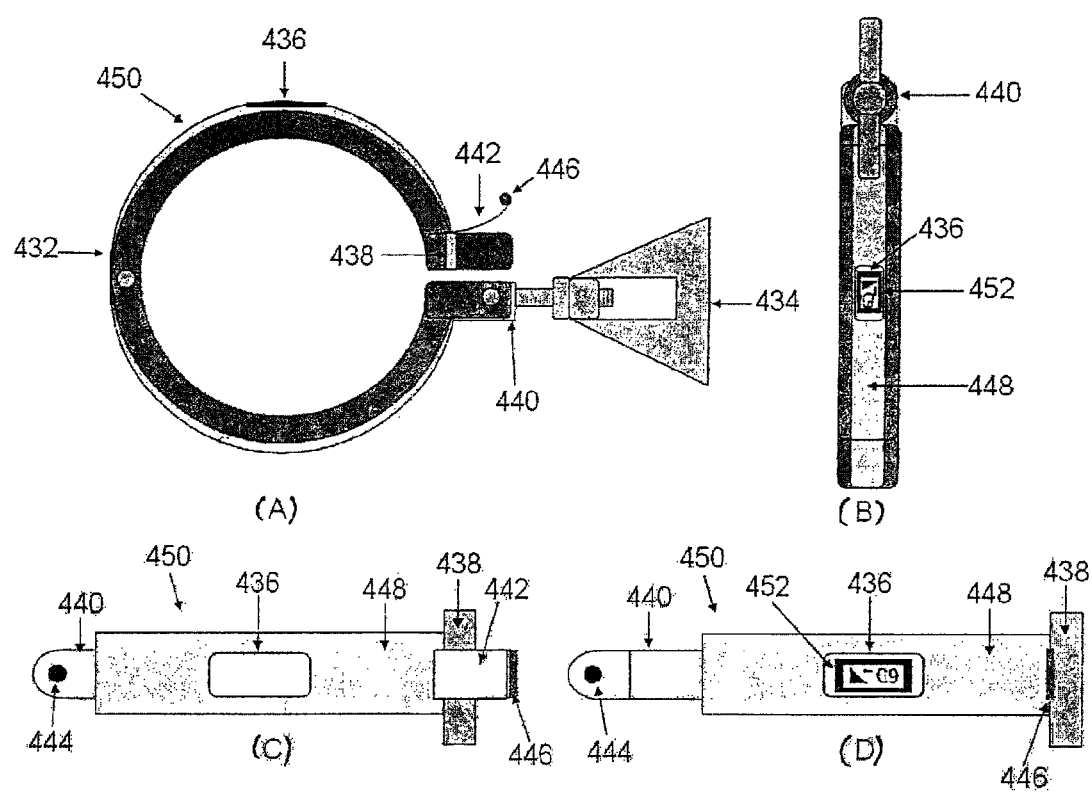
FIG. 11 shows another embodiment of a variable marker.

FIG. 11 shows an embodiment of a variable marker 452 indicating the closing state of a tri-clamp 432 as a preferred first set-up component. The embodiment of the tri-clamp shown in FIG. 11 comprises a removably attachable dynamic augmented reality marker sleeve assembly 450 which presents an variable marker through a transparent window 436 when the tri-clamp 432 is closed to fix a second set-up component such as a tubing.

View (A) of FIG. 11 shows a side view of the tri-clamp 432 covered externally by the removably attachable augmented reality marker sleeve assembly 450 which is attached to one side of the tri-clamp 432 by a clamp collar using an elastic or constricting clamp collar attachment device 438 and the bolt of the wing-nut latch 434 on the other side of the clamp. When the latch is closed to lock the tri-clamp 432 an internal ribbon 440 is pulled along with the latch 434 using the clamp latch attachment hole 444 (shown in view (C)) at one end of the ribbon 440 which causes the internal ribbon 440 to slide inside of the external sleeve 448 causing a pattern change of the variable marker 452 (shown in view (D)) that can be observed through a transparent display window 436. On the clamp collar side there can be excess of the internal ribbon 442 to allow for some slack in the ribbon to allow it slide through the external sleeve 448 as the latch bolt 434 is closed. A ribbon stopper 446 can prevent the ribbon 442 from moving all the way into the external sleeve 448 and can assist in resetting the augmented reality marker in the sleeve assembly 450 when the tri-clamp 432 is no longer in use.

View (B) of FIG. 11 is a top view of the closed tri-clamp 432 with the variable marker 452 visible through the transparent display window 436 located on the external sleeve (448).

View (C) of FIG. 11 is a top view of the removably attachable augmented reality marker sleeve assembly 450 in the opened clamp configuration with the variable marker not visible through the transparent display window 436 or not identifiable by the augmented reality system.

View (D) of FIG. 11 is a top view of the removably attachable augmented reality marker sleeve assembly 450 in the closed clamp configuration with the variable marker 452 visible through the transparent display window 436. A tri-clamp in the closed configuration with the augmented reality marker sleeve assembly 450 can present the variable marker 452 to the augmented reality system confirming that the tri-clamp 432 has been properly closed. The augmented reality marker sleeve assembly 450 can be removably attachable to the clamp so it can be re-used on different clamps of the same size. In alternate embodiments the augmented reality marker sleeve assembly 450 can be integrated directly into the tri-clamp 432 in an non removable manner. The internal ribbon 440 can comprise or consist of an elastic material which stretches as the clamp latch 434 is closed presenting the variable marker 452, or the augmented reality marker sleeve assembly 450 can present an electronic signal as a variable marker as in an active RFID/NFC tag signal when the clamp 432 is properly closed.

Figure 12:
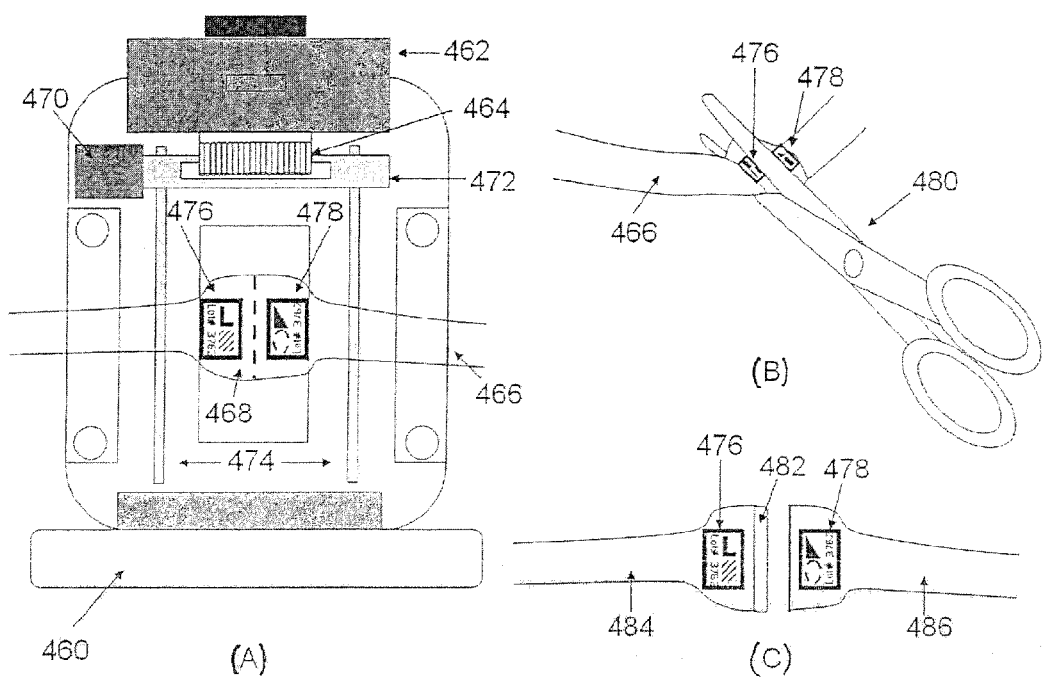
FIG. 12 shows a tube thermowelding unit.

FIG. 12 shows a tube thermowelding unit 460 with an integrated printer for printing lot specific markers onto a thermosealed tube 466 prior to cutting to serve as an indicator to an augmented reality system of a properly welded seal.

View (A) of FIG. 12 shows a top view of a tube thermowelding unit 460 which contains a thermowelding assembly 462 (shown in a raised configuration) and a heating element 464 which pushes down on and heats a thermoweldable tubing 466 until it forms a flat welded seal 468. The printer head 470 is positioned away from the heating element 464 during the welding operation. After the thermowelding assembly 462 is lifted and the weld has sufficiently cooled, the printer head 470 can move along a printer scaffold 472 that rides on top of two printer rails 474 to properly position the print head 470 over the flat welded seal 468. Two lot specific markers 476, 478 are printed including an upstream marker 478 and a downstream marker 476 as well as a cutting guideline.

View (B) of FIG. 12 shows a side view of the welded thermoplastic tubing 466 being cut by a sharp pair of scissors 480. This separates the sealed upstream and downstream tubing sections along with the upstream 478 and downstream 476 markers.

View (C) of FIG. 12 shows a top view of the separated tubing sections including the sealed upstream tube 486 and the sealed downstream tube 484. The thermowelded cut seal 482 is visible in between the upstream marker 478 and downstream marker 476. The markers 476, 478 can be recognized optically by an augmented reality system and documented as a properly welded seal provided that the markers 476, 478 are properly aligned in a predetermined way. Alternate embodiments of the printing system may be capable of printing markers onto the tubing of a thermowelder that performs sterile connections across at least two thermoweldable tubing pieces. Instead of integrating the printer into the thermoweldable device a portable handheld printer could also be used to print onto the flat welded seal of the thermowelded tube after the operation has been completed.

Figure 13:
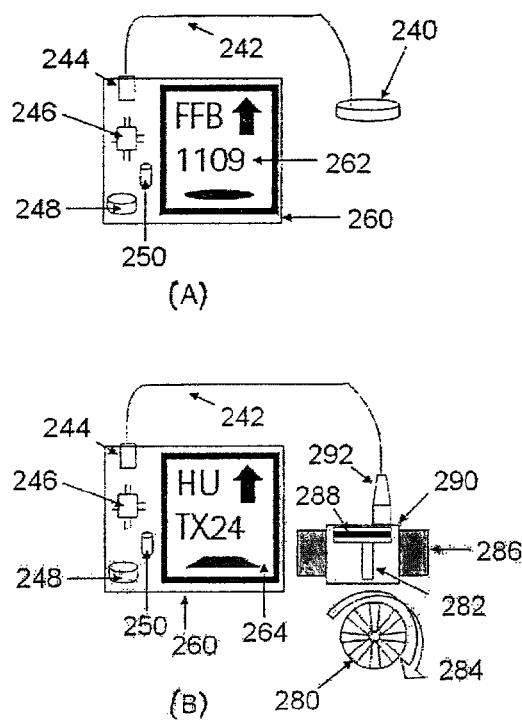
FIG. 13 shows further embodiments of a variable markers.
Figure 13:
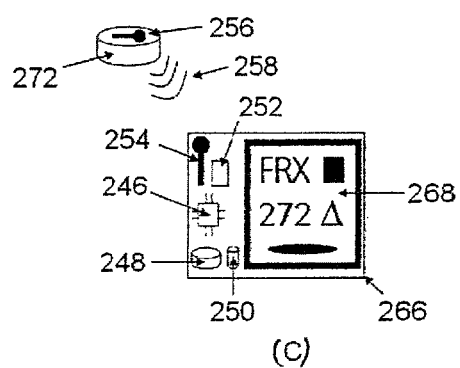
Figure 13:
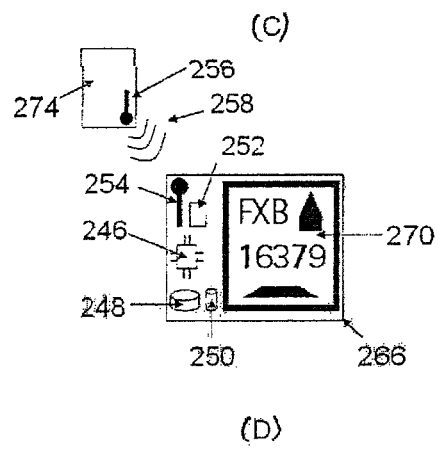

FIG. 13 shows several variable markers 262, 264, 268, 270 that alter their appearance and display to an augmented reality system based on a wired and/or wireless signal received from an electronic and/or mechanical device.

View (A) of FIG. 13 shows a front view of a wired dynamic augmented reality marker system 260 that contains a plurality of electronic sensing devices 240 that communicates through a wired connection 242 and is received by a communication device 244. The information is processed by a processor 246 and can be stored in or retrieve information from a memory storage device 250 and display a variable marker 262 to the augmented reality system depending on the outcome of the processed information. The wired dynamic augmented reality marker system 260 can be powered by a battery 248, a power cord, or a wireless power system such as inductive charging.

View (B) of FIG. 13 shows a front view of a wired dynamic augmented reality marker system 260 that contains a plurality of electronic/mechanical sensing devices which may comprise a flow sensor 290 that utilizes an internal moving impeller 280, 282 that rotates 284 according to the flow of fluid through a tube 286 to produce an electronic signal through an electronic sensing device 288. This sensing device 288 can communicate through a wired connection 292, 242 or a wireless connection (not shown) and is received by a communication device 244. The information is processed by a processor 246 and can be stored in or retrieve information from a memory storage device 250 and display a variable marker 264 to the augmented reality system depending on the outcome of the processed information. The wired dynamic augmented reality marker system 260 can be powered by a battery 248, a power cord, or a wireless power system such as inductive charging.

View (C) of FIG. 13 shows a front view of a wireless dynamic augmented reality marker system 266 that comprises one or more electronic sensing device(s) which include a wireless sensor 272 that utilizes an antenna 256 to communicate wirelessly 258 to a receiving antenna 254 and a communication device 252 within the wireless dynamic augmented reality marker system 266. The information is processed by a processor 246 and can be stored in or retrieve information from a memory storage device 250 and display a variable marker 268 to the augmented reality system. The wired dynamic augmented reality marker system 260 can be powered by a battery 248, a power cord, or a wireless power system such as inductive charging.

View (D) of FIG. 13 shows a front view of a wireless dynamic augmented reality marker system 266 which comprises an internal equipment wireless broadcasting device 274 that utilizes an antenna 256 to communicate wirelessly 258 to a receiving antenna 254 and communication device 252 within the wireless dynamic augmented reality marker system 266. The information is processed by a processor 246 and can be stored in or retrieve information from a memory storage device 250 and present a variable marker 270 can be displayed to the augmented reality system. The internal equipment wireless broadcasting device 274 can be used to transmit information from process equipment software for work steps that may not be available visually on the exterior of the process equipment and transmit that information wirelessly to the dynamic augmented reality system. The wired dynamic augmented reality marker system 260 can be powered by a battery 248, a power cord, or wireless power system such as inductive charging.

Figure 14:
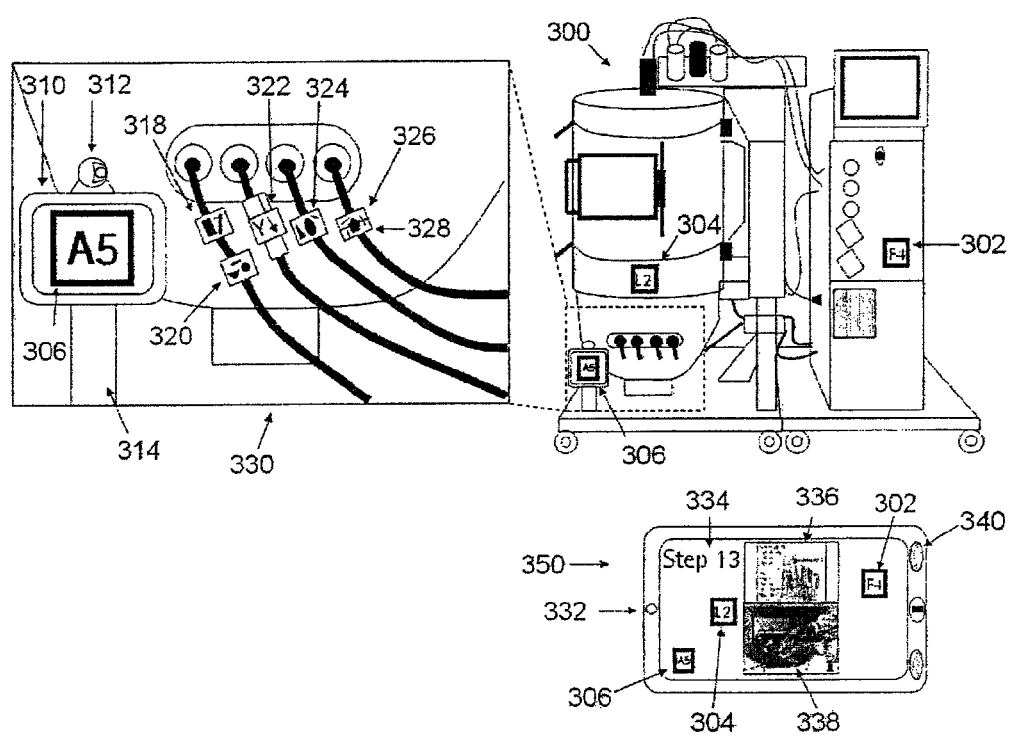
FIG. 14 shows a tiered augmented reality system.

FIG. 14 shows a tiered augmented reality system where a secondary, tertiary, etc. . . . , augmented reality system is capable of reading markers and/or variable markers and presenting the information to a primary augmented reality system through the use of a variable marker. A single-use disposable bioreactor system 300 utilizing an augmented reality system with visual variable markers 302, 304, 306 provides an operator using a mobile tablet device 350, which serves as a primary augmented reality system and is equipped with a visual camera detection system 332, with the steps required for proper assembly of the bioreactor system 300 through augmented reality displayed content. This augmented reality displayed content on the mobile tablet device 350 includes a plurality of text 334, image/slides 336, video 338, audio commands 340 or other content.

A detailed view of one area of the bioreactor 330 shows a secondary augmented reality system 310, on a stand 314 that uses a camera device 312 to detect visual markers 306 from the connected hoses to the bioreactor unit. These hoses contain a plurality of non-variable, permanent or variable visual markers including two markers 318, 320 on a connected hose where the distance between the two markers 318, 320 is used for assembly confirmation; one variable marker 322 that changes the appearance when the hose is connected, one variable marker 324 that changes the appearance when fluid moves through the tubing; and one appearance marker 326, 328 that is formed from two halves 326, 328 of the marker which is detected by the augmented reality system when fully assembled.

The secondary augmented reality system 310 reads the configurations of the plurality of augmented reality markers, processes the information, and displays the information as a coded visual augmented reality marker 306 on a dynamic visual display system. This is recognized by the primary augmented reality system mobile tablet device 350 as a series of completed work steps and provides the operator with pre-programmed content to complete the next series of steps in a multi-step process. The other variable markers 302, 304 can provide information from other regions of the bioreactor system 300 that is not visible from a front view (rear and sides of the unit) to an operator with a mobile tablet augmented reality system 350.

Figure 15:
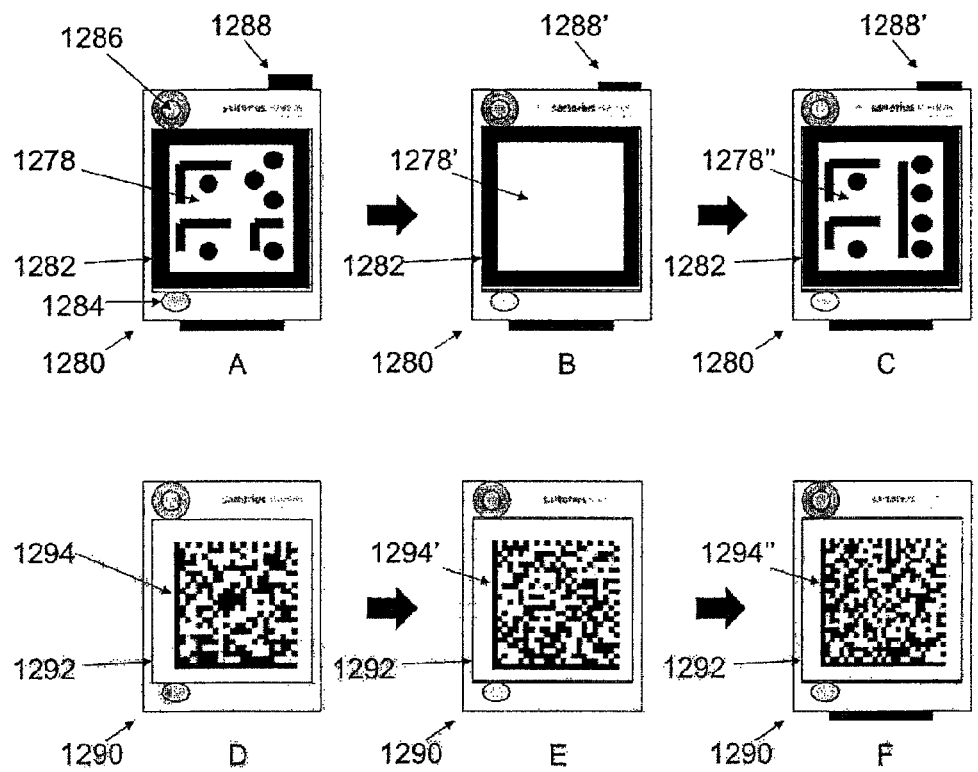
FIG. 15 shows an embodiment of a visual variable marker device with changeable presentations of the augmented reality marker presented to the augmented reality system.

FIG. 15 shows an embodiment of a visual variable marker device with changeable presentations of the augmented reality marker presented to the augmented reality system.

View 'A' of FIG. 15 is a front view of a visual variable marker device (1280) that contains at least one variable marker display device (1282) displaying an augmented reality marker (1278). The visual variable augmented reality device (1280) also features a camera (1286) for reading external augmented reality markers, a light sensor (1284) for adjusting the contrast of the visual display optimized for the lighting conditions, and a button (1288) for the operator to press.

View 'B' of FIG. 15 is a front view of a visual variable marker device (1280) with the button (1288') pressed after a work function has been completed. The variable marker display device (1282) provides a blank marker (1278') as a buffer prior to the changed marker display.

View 'C' of FIG. 15 is a front view of a visual variable marker device (1280) with the button (1288') pressed. The variable marker display device (1282) displays a new augmented reality marker (1278") that provides information to an external augmented reality system that the button has been depressed by the operator and the work function has been completed through the augmented reality marker displayed.

Views 'D', 'E', and 'F' of FIG. 15 are front views of a visual variable marker device (1280) that receives information from a testing device (not shown). It provides the information about the test parameters and the test results to an external augmented reality device. The variable marker display device (1282) provides successive displays of the augmented reality markers (1294, 1294', 1294") which are recognized and read in series by the external augmented reality system which can process the content of the markers with a processing device, save the information to a local and/or network drives, and display the information to the operator as an augmented display.

Figure 16:
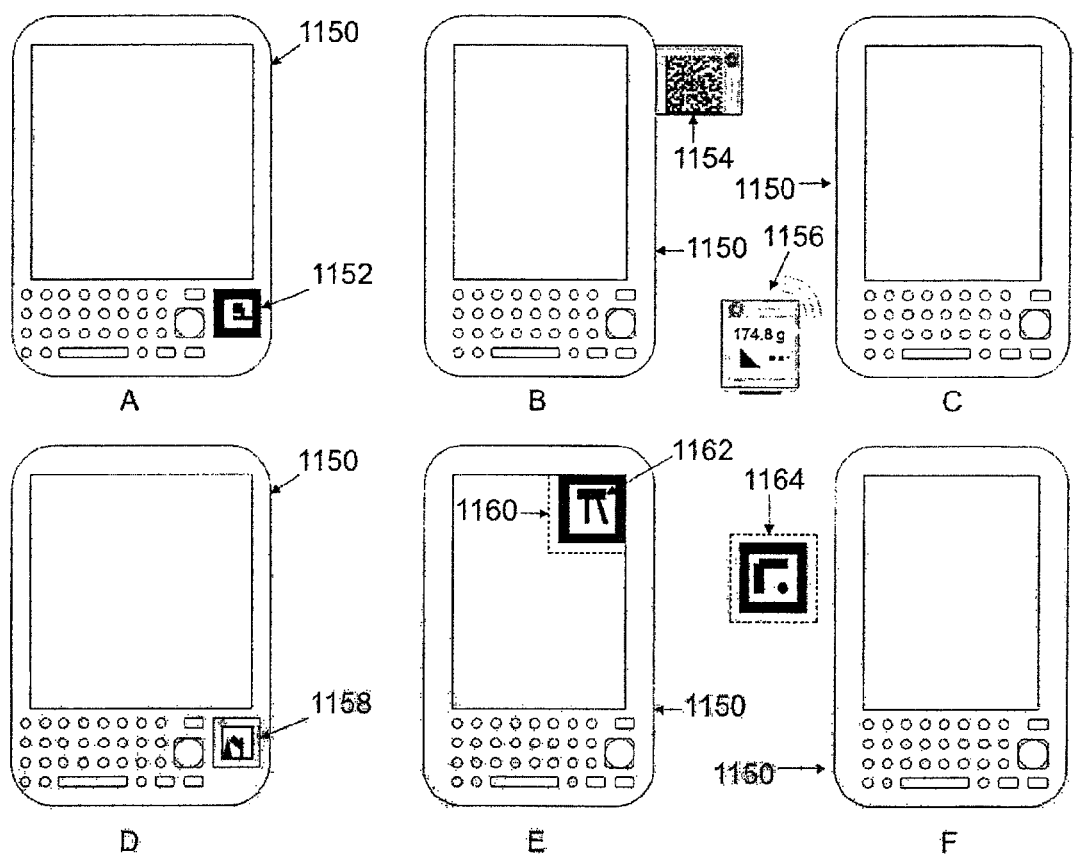
FIG. 16 illustrates several embodiments of methods variable marker devices and displays can be utilized with electronic display devices.

FIG. 16 shows several embodiments of variable marker devices and displays, which can be utilized with electronic display devices.

View 'A' of FIG. 16 is a front view of a mobile device for electronic documentation (1150) with an integrated variable augmented reality display (1152).

View 'B' of FIG. 16 is a front view of a mobile device for electronic documentation (1150) with a plugged-in variable augmented reality display (1154). The augmented reality display is plugged-in through a data/power port, preferably a USB connection.

View 'C' of FIG. 16 is a front view of a mobile device for electronic documentation (1150) with a wireless variable augmented reality display (1156). The augmented reality display can communicate with the mobile device for electronic documentation, an augmented reality device, and/or equipment, a preferably through a wireless, cellular, or radio signal.

View 'D' of FIG. 16 is a front view of a mobile device for electronic documentation (1150) with a removably and/or permanently attachable variable augmented reality display (1158) which can be affixed to a viewable location on the mobile device.

View 'E' of FIG. 16 is a front view of a mobile device for electronic documentation (1150) where a variable marker (1162) can be displayed as a computer program or computer program product operating on or within a window (1160) within the display of the mobile device for electronic documentation (1150).

View 'F' of FIG. 16 is a front view of a mobile device for electronic documentation (1150) where a virtual variable marker display (1164) can be viewed through an augmented reality system. Alternate embodiments of the variable marker devices can be utilized with paper documentation, electronic documentation, into process or laboratory equipment, a room or setup area, an augmented reality system, a mobile device, or a virtual display setup.

Figure 17:
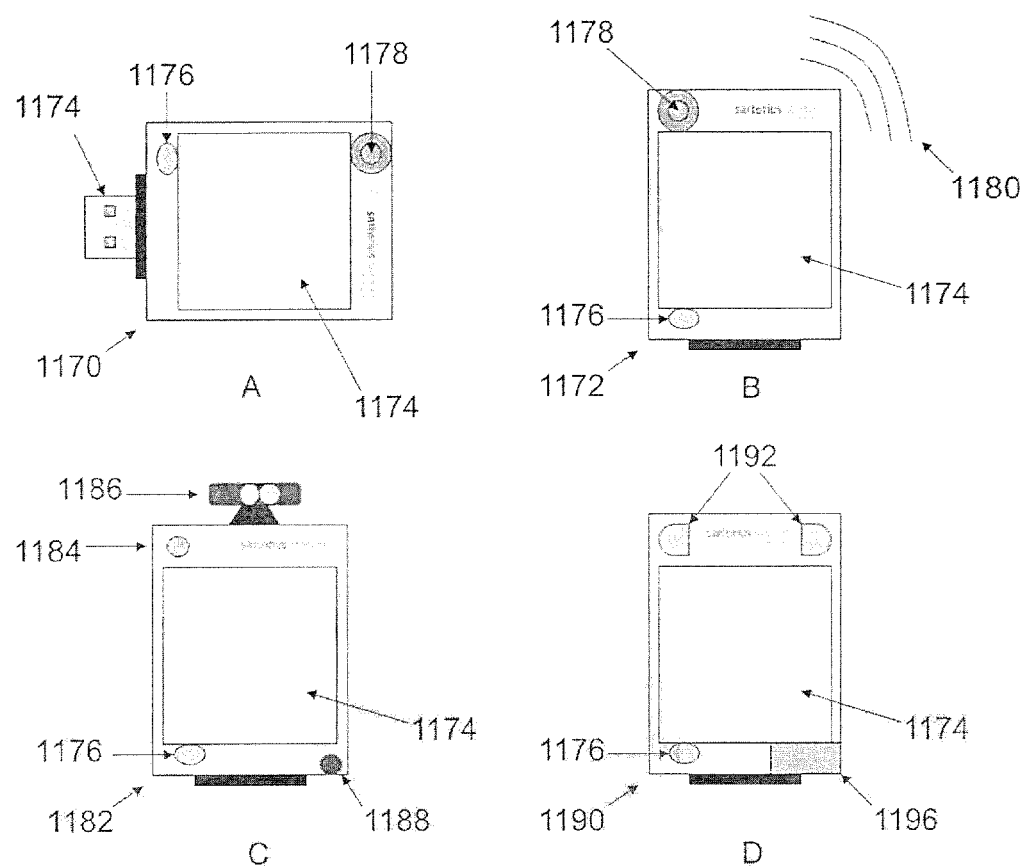
FIG. 17 illustrates alternate embodiments of variable marker devices and displays that are manually changeable by an operator, a computer product input, and/or at a pre-programmed interval.

FIG. 17 shows alternate embodiments of variable marker devices and displays that are manually changeable by an operator, a computer product input, and/or at a pre-programmed interval.

View 'A' of FIG. 17 is a front view of a variable marker device (1170) that is plugged into a device through the use of a data/power connection (1174), preferably a USB connection. The variable marker device (1170) communicates with the device it is plugged into through the data/power connection and processes information from that device and displays it as a coded marker on the variable marker display device (1174). The variable augmented reality display can automatically adjust the contrast of the display device (1174) utilizing a light sensor (1176) to provide the clearest display of the augmented reality marker to an external augmented reality system based on lighting conditions. The variable marker device (1170) can also contains several embodiments of sensing devices in which a user and/or other devices or augmented reality markers can communicate, interact and/or affect changes with the device. The camera sensing device (1178) can be utilized for user directed inputs, for the uploading and/or transfer of new augmented reality markers and/or programs into the variable marker device (1170) device memory and/or for two-way visual communication with an external device.

View 'B' of FIG. 17 is a front view of a variable marker device (1172) that uses a wireless communication method (1180), preferably a WiFi, cellular, and or radio connection, to communicate with an external device.

View 'C' of FIG. 17 is a front view of a variable marker device (1182) that uses a motion tracking sensor (1186) and a microphone array (1184) for a user to input information and interact with the augmented reality marker, the associated equipment, and the augmented reality system. The variable marker device (1182) can also send and receive information through an infrared communication port (1188).

View 'D' of FIG. 17 is a front view of a variable marker device (1190) that utilizes an eye tracking device (1192) for a user to input information and interact with the augmented reality marker, the associated equipment, and the augmented reality system. This is particularly useful for when a user is occupied with a complex task where both hands are required, such as working with a gloved isolator. The variable marker device (1190) can also send and receive information through a contactless communication port (1196) which can feature a near field communications device (NFC), an audio communications device, and/or a visual communication device.

Figure 18:
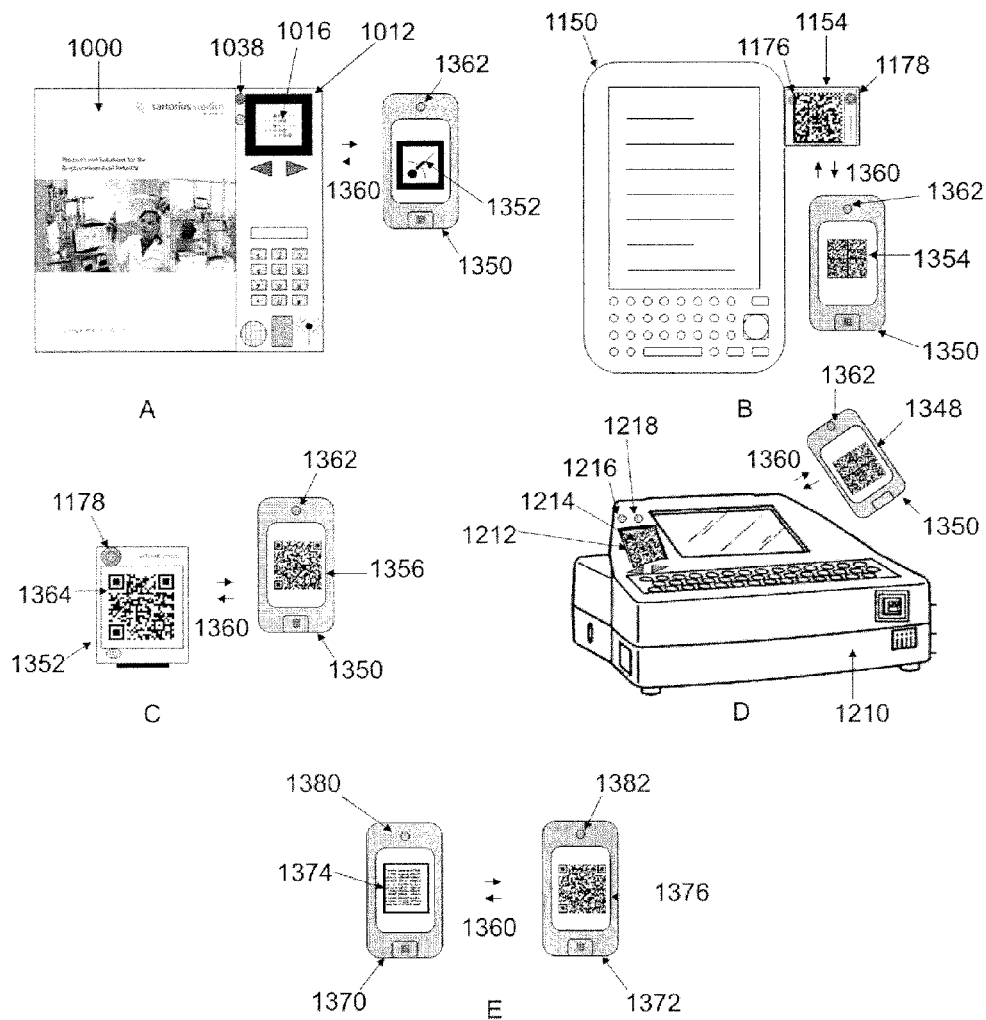
FIG. 18 illustrates several embodiments of a visual communication system between a variable marker device and a mobile device utilizing variable markers.

FIG. 18 shows several embodiments of a visual communication system between a variable marker device and a mobile device utilizing variable markers.

View 'A' of FIG. 18 is a front view of a product catalogue (1000) with a variable augmented reality device (1012). The device features a display device that displays augmented reality markers (1016) and a video camera device (1038). The variable marker device through the video camera device (1038) is able to view, process, and save external augmented reality markers viewed in series from an external source. This embodiment features a mobile device (1350) with a display screen displaying a variable marker (1352) and a video camera device (1362). The augmented reality markers displayed in series from the mobile device display (1352) are viewed by the video camera device on the variable augmented reality device (1012), processed, and saved in memory. This action can be used to save new augmented reality markers into the internal database. This action can also be used to input letters or numbers into a field, be utilized by a computer program product, or to link to a programmed action. The augmented reality markers can serve as a link to augmented content when viewed by an augmented reality device or can transmit visual data directly through text, bar coding, symbology, images, and shapes of the marker displayed. This visual data transmitted through the visual communication systems can be utilized by a computer program product. The variable marker device can also transmit visual information to the mobile device and/or external system. This two-way visual communication is denoted by the arrows (1360) between the two visual displays.

View 'B' of FIG. 18 is a front view of an electronic document displaying device (1150) which has a variable augmented reality device (1154) connected via data/power port, preferably a USB port. The variable marker device (1154) can visually communicate with an external mobile device (1350) through the use of data matrix barcodes (1176 & 1354), recognized by video cameras (1178 & 1362) which can transmit alphanumeric coding for the inputting of characters into a field, to be utilized by a computer program product, or linking to a programmed action. This two-way visual communication is denoted by the arrows (1360) between the two visual displays.

View 'C' of FIG. 18 is a front view of a wireless variable marker device (1352) that can visually communicate with an external mobile device (1350) through the use of QR codes (1364 & 1356), recognized by video cameras (1178 & 1362) which can transmit alphanumeric coding for the inputting of characters into a field, to be utilized by a computer program product, or linking to a programmed action. This two-way visual communication is denoted by the arrows (1360) between the two visual displays.

View 'D' of FIG. 18 is a front view of a variable marker device (1212) integrated into a process device (1210) that can visually communicate with an external mobile device (1350) through the use of data matrix codes (1214 & 1348), recognized by video cameras (1216 & 1362) which can transmit alphanumeric coding for the inputting of characters into a field, to be utilized by a computer program product, or linking to a programmed action. This two-way visual communication is denoted by the arrows (1360) between the two visual displays.

View 'E' of FIG. 18 is a front view of a mobile device (1370) displaying a variable marker that can visually communicate with an additional mobile device (1372) through the use of QR and Datamatrix barcodes (1374 & 1376), recognized by video cameras (1380 & 1382) which can transmit alphanumeric coding for the inputting of characters into a field, to be utilized by a computer program product, or linking to a programmed action. This two-way visual communication is denoted by the arrows (1360) between the two visual displays.

Figure 19:
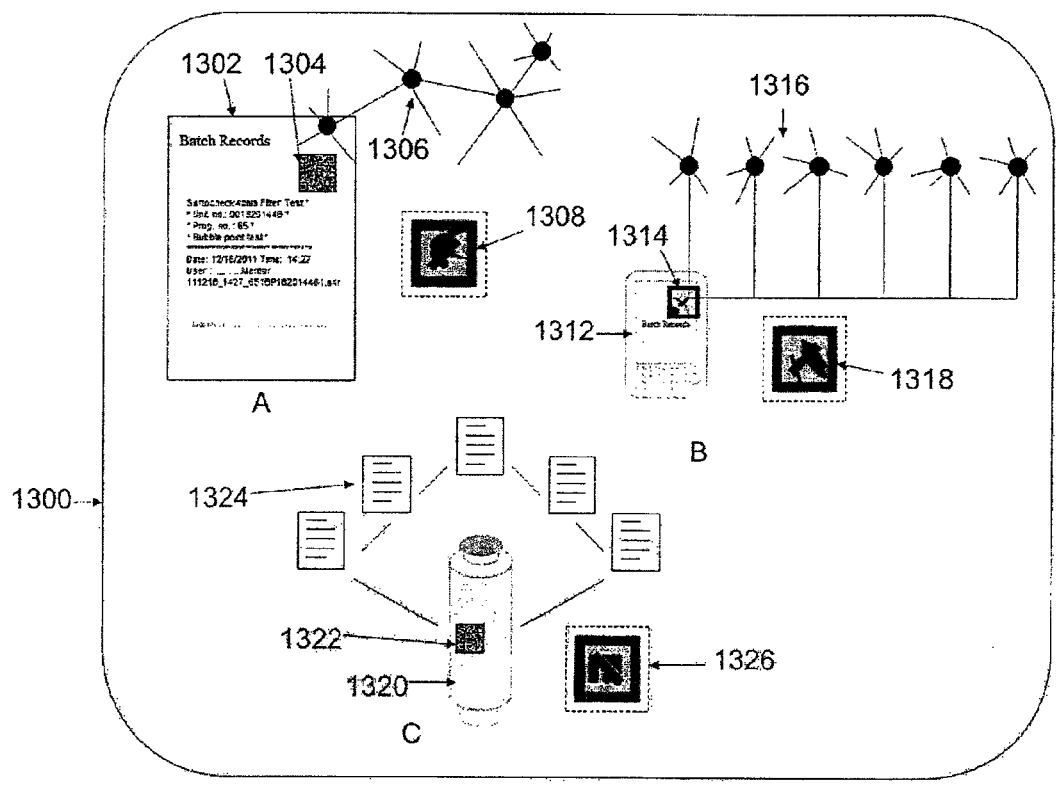
FIG. 19 illustrates several embodiments of linked document networks accessed through a static and a variable marker within an augmented reality system.

FIG. 19 shows several embodiments of linked document networks accessed through a static and a variable marker within an augmented reality system.

View 'A' of FIG. 19 is a front view of a paper batch record (1302) viewed with an augmented display (1300). The paper batch record (1302) is printed with a static QR code which is viewed as a recognized augmented reality marker (1304). A virtual variable marker (1308) when viewed together with a static augmented reality marker (1304) that provides an augmented image of a network of documents linked to the paper batch record (1302). In this embodiment the network is a mesh network (1306) linked by common nodes.

View 'B' of FIG. 19 is a front view of an electronic batch record (1312) on a mobile device viewed within an augmented display (1300). The electronic batch record (1312) has an augmented reality marker (1314) contained within it. A virtual variable marker (1318) when viewed together with a static augmented reality marker (1314) that provides an augmented image of a network of documents linked to the electronic batch record (1312). In this embodiment the network is an ordered network (1316) separated by dates with documentation linked to common nodes.

View 'C' of FIG. 19 is a front view of a filter capsule (1320) with a static data matrix code which is viewed as an augmented reality marker (1322) on a mobile device viewed within an augmented display (1300). A virtual variable marker (1326) when viewed together with a static augmented reality marker (1322) that provides an augmented image of a network of documents linked to the filter capsule (1320). In this embodiment the network is a circular network (1324) where the operator can scroll through a series of linked documents.

Figure 20:
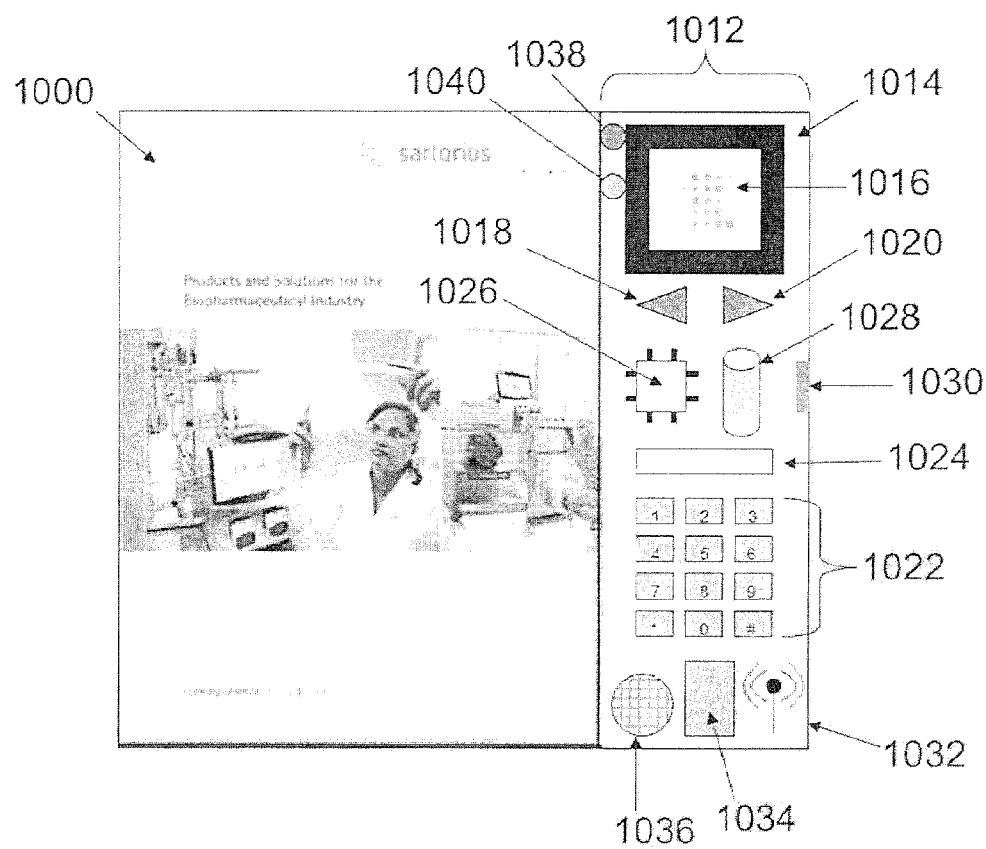
FIG. 20 illustrates an embodiment of a visual variable marker device attached to a product catalogue.

FIG. 20 shows an embodiment of a visual variable marker device attached to a product catalogue. A front view of a product catalogue (1000) with a permanently or removably attached augmented reality device (1012) that contains at least one variable augmented reality display device (1014) displaying an augmented reality marker (1016). The variable marker device (1012) can be powered by a battery, solar panel, power cord, or wireless power system (such as inductive charging). The variable marker display device (1014) uses a variable screen to present a visual augmented reality display (1016) that provides information to an augmented reality system and/or to the user through text, symbols, iconography, animation, video, audio, and/or other content. The variable marker display device (1014) is intended for use with an augmented reality system, preferably a mobile device, containing a sensing device, preferably a camera device. The variable augmented reality display can automatically adjust the contrast of the display device (1014) utilizing a light sensor (1040) to provide the clearest display of the augmented reality marker to an external augmented reality system based on lighting conditions. The variable marker (1016) can be changed using the left button (1018) or the right button (1020) on the device. These buttons allow the user to scroll through the augmented reality markers until the user reaches the augmented reality marker type that they require.

Alternatively the user can use the device buttons (1022) to enter in the numbers and/or letters onto visual input display (1024) to select the augmented reality marker and functionality that the user is searching for. The user inputs from the buttons are processed with the processing device (1026) and the augmented reality markers are accessed from the memory storage device (1028) and displayed on the variable marker display (1014).

The memory device in the augmented reality console can be updated with additional augmented reality markers or content through the use of a data transfer device (1030), preferably a USB data connection, or through a wireless communication device (1032), preferably a WiFi connection. The wireless communication device can be used for automatic/manual updates of augmented reality markers and/or provide information to about the markers viewed and the user inputs to a networked storage device. Additionally a contactless communication device (1034) could be used for the transfer of data and/or as a user input device including but not limited to a near field communication device, an RFID device, a camera device (1038), an infrared device, a motion tracking device, a microphone device, or other communication device. The selection of a variable marker (1016) can also be accompanied by audio directions or product specifications through the audio device (1036) based on the inputs of the operator or through a communication device (1030, 1032, 1034).

Figure 21:
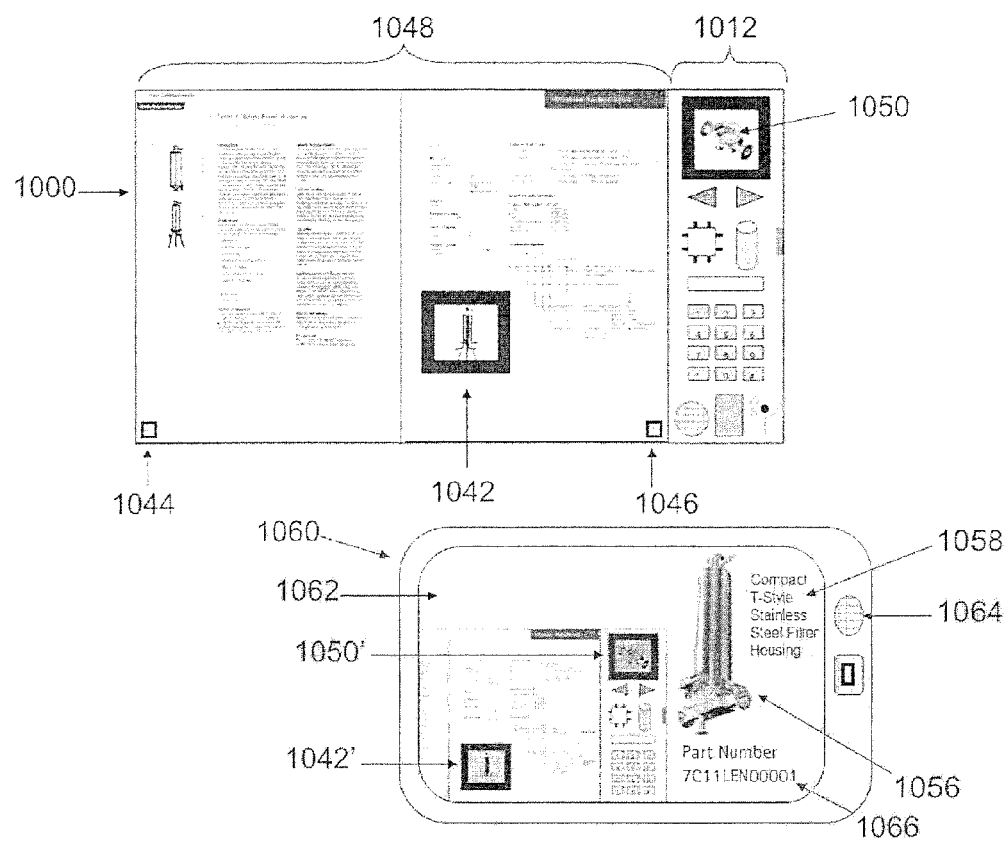
FIG. 21 illustrates an embodiment of a visual variable marker device attached to a product catalogue and visualized through a mobile augmented reality system.

FIG. 21 shows an embodiment of a visual variable marker device attached to a product catalogue and visualized through a mobile augmented reality system. A front view of a product catalogue (1000) opened to a page (1048) displaying a permanently or removably attached augmented reality device (1012) which is displaying a variable marker (1050). On the open page (1048) of the product catalogue there is a static augmented reality marker (1042) denoting a filter housing and two page augmented reality markers (1044 & 1046) denoting the page numbers of the product catalogue. The augmented reality markers are recognized by the augmented reality system on mobile device (1060). The static augmented reality marker (1042') is recognized in conjunction with the variable marker (1050') by the mobile augmented reality system (1060) and displayed on the display device (1062) as an augmented display. The combination of the augmented reality markers (static and variable) displays a 3 dimensional model of a filter housing (1056), the associated text (1058), the part number (1066), and an audio message from a speaker (1064) on the mobile augmented reality device (1060). The user inputs of the arrow buttons and/or the keypad buttons on the device changes the display of the variable marker (1050). This change in the display of the variable marker changes the display of the content visualized on the mobile augmented reality system and/or changes the configuration of the part displayed. In this embodiment the variable marker changes the configuration of the 3 dimensional model of the displayed filter housing base to include 1" inlet and outlet sanitary connectors with a ½" sanitary drain valve on the inlet side. The user can configure the filter housing through hundreds of configurations based on the requirements of the user by changing the variable marker from a user input.

Figure 22:
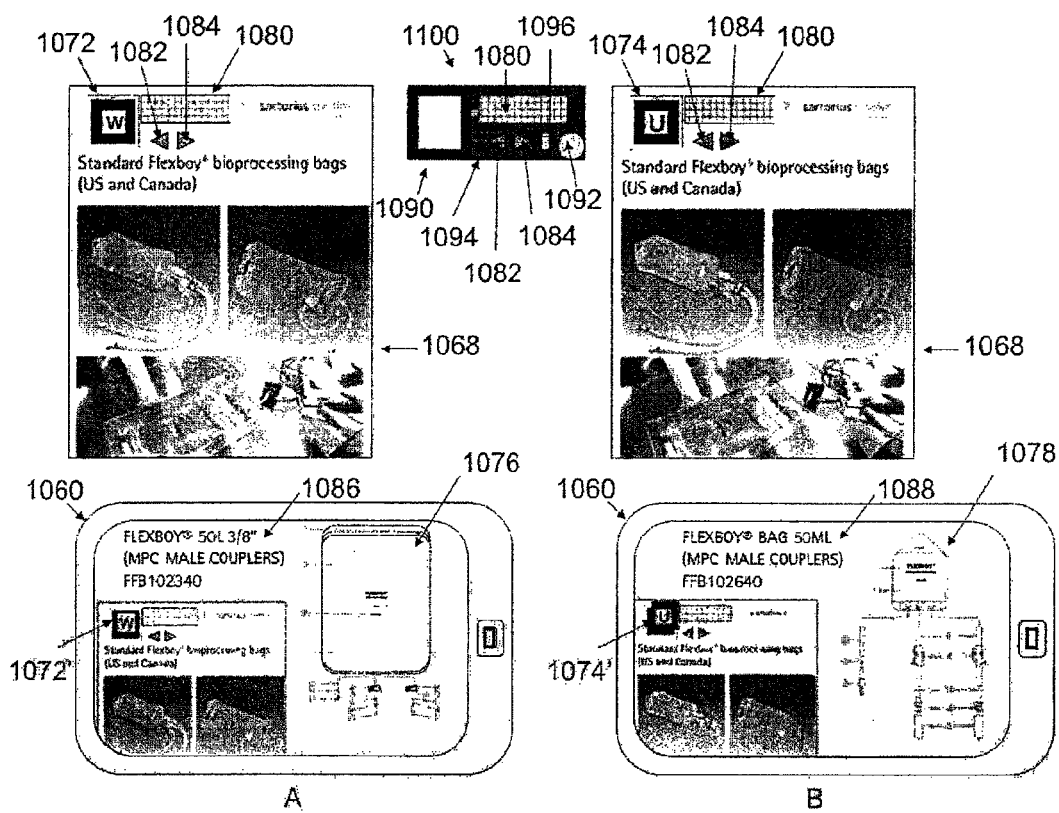
FIG. 22 illustrates an embodiment of a visual variable marker device embedded into a marketing advertisement and visualized through a mobile augmented reality system.

FIG. 22 shows an embodiment of a visual variable marker device embedded into a marketing advertisement and visualized through a mobile augmented reality system.

View 'A' of FIG. 22 is a front view of a marketing advertisement (1068) Flexboy® bioprocessing bags. A variable marker device (1100) is affixed between for two surfaces with only certain components visible to the viewer. The visible components include the variable marker display screen (1090) displaying an augmented reality marker (1072), the left button (1082), the right button (1084), and the solar cell (1080) for charging an internal battery (1092) during use. The components obscured from the viewer can include but is not limited to a circuit board (1094), and internal memory device (1096), an internal battery (1096), a processing device (not shown), wiring, and/or other power, communication, display, sensors, or associated devices. The augmented reality marker (1072') is recognized by the augmented reality system on a mobile device (1060). Content from a local and/or networked database associated with the displayed augmented reality marker (1072') is displayed on the mobile device (1060) display screen as an augmented image of a standard Flexboy® bioprocessing bag (1076) with the associated description and part number (1086).

View 'B' of FIG. 22 is a front view of a marketing advertisement (1068) Flexboy® bioprocessing bags after a button has been pressed which changed the augmented reality marker (1074) that is displayed on the variable augmented reality display screen (1090). The augmented reality marker (1074') is recognized by the augmented reality system on a mobile device (1060). Content from a local and/or networked database associated with the displayed augmented reality marker (1074') is displayed on the mobile device (1060) display screen as different augmented image of a configurable Flexboy® bioprocessing bag (1078) with the associated description and part number (1088). The viewer can add or subtract components on the mobile device to configure the Flexboy® bioprocessing bag (1078) to the viewers needs (not shown). This new configuration would alter the product description (1088) and provide the viewer with the new part number for ordering the configured product. The mobile device (1060) can link the viewer to a sales representative or customer service representative to process the order or a technical/application specialist to assist with any additional questions. The viewer can scroll through numerous augmented reality markers saved in the internal memory device, each of which can be associated with a different part number, document, or functionality for use by the viewer.

Figure 23:
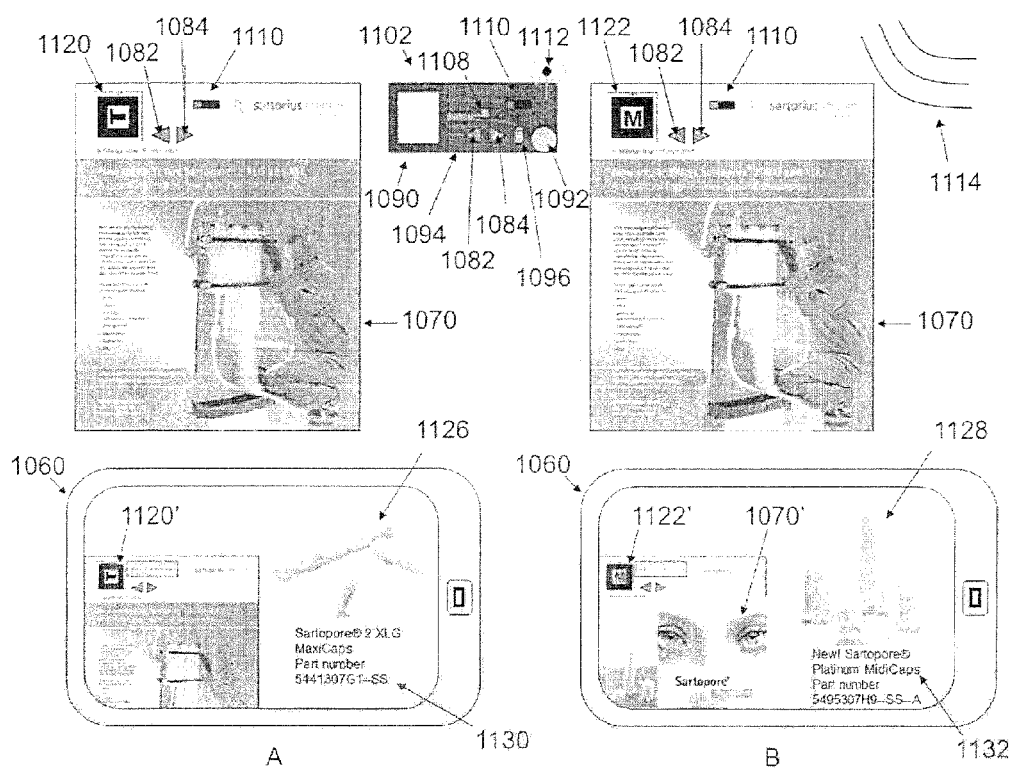
FIG. 23 illustrates an embodiment of a visual variable marker device with a communication device embedded into a marketing advertisement and visualized through a mobile augmented reality system.

FIG. 23 shows an embodiment of a visual variable marker device with a communication device embedded into a marketing advertisement and visualized through a mobile augmented reality system.

View 'A' of FIG. 23 is a front view of a marketing advertisement (1070) for sterile filters Sartopore® 2 XLG and XLI. A variable marker device (1102) is affixed between for two surfaces with only certain components visible to the viewer. The visible components include the variable marker display screen (1090) displaying an augmented reality marker (1120), the left button (1082), the right button (1084), and an on/off switch (1110). The components obscured from the viewer can include but is not limited to a circuit board (1094), and internal memory device (1096), an internal battery (1096), a processing device (1108), a communication device (1112), wiring, and/or other power, communication, display, sensors, or associated devices. The augmented reality marker (1120') is recognized by the augmented reality system on a mobile device (1060). Content from a local and/or networked database associated with the displayed augmented reality marker (1120') is displayed on the mobile device (1060) display screen as an augmented image of a Sartopore® 2 XLG MaxiCap® filter (1126) with the associated description and part number (1130).

View 'B' of FIG. 23 is a front view of a marketing advertisement (1070) for sterile filters Sartopore® 2 XLG and XLI after a button has been pressed which changed the augmented reality marker (1122) that is displayed on the variable augmented reality display screen (1090). The augmented reality marker (1122) was updated onto the variable marker device (1102) through communication device (1112) from an external signal (1114), preferably a wireless or cellular signal, and stored on the internal memory device (1096). The newly downloaded augmented reality marker (1122') is recognized by the augmented reality system on a mobile device (1060). Content from a local and/or networked database associated with the displayed augmented reality marker (1122') is displayed on the mobile device (1060) display screen as different augmented image of a new Sartopore® Platinum advertisement (1070') an augmented image of the MidiCap filters (1128) with the associated description and part number (1132). This can be used to continually update customers on new products and services as they become available. The variable marker device (1102) can be removably and/or permanently attached or affixed to magazines, product literature (including catalogues, Datasheets, Certificates, or Quality Documentation), calendars, clocks, pens, other marketing materials, gifts provided, or product packaging, products and equipment. The variable marker device (1102) can also display new augmented markers according to a pre-programmed time interval to notify the customer equipment is almost due for service and/or calibration. The mobile device (1060) can link the viewer to a service representative or customer service representative to process the order and schedule a return of a unit for calibration. Alternatively the variable augmented reality device can be used as a portal for augmented content including documentation, product information, product announcements, upcoming events, reminders, messaging, and interactive games.

Figure 24:
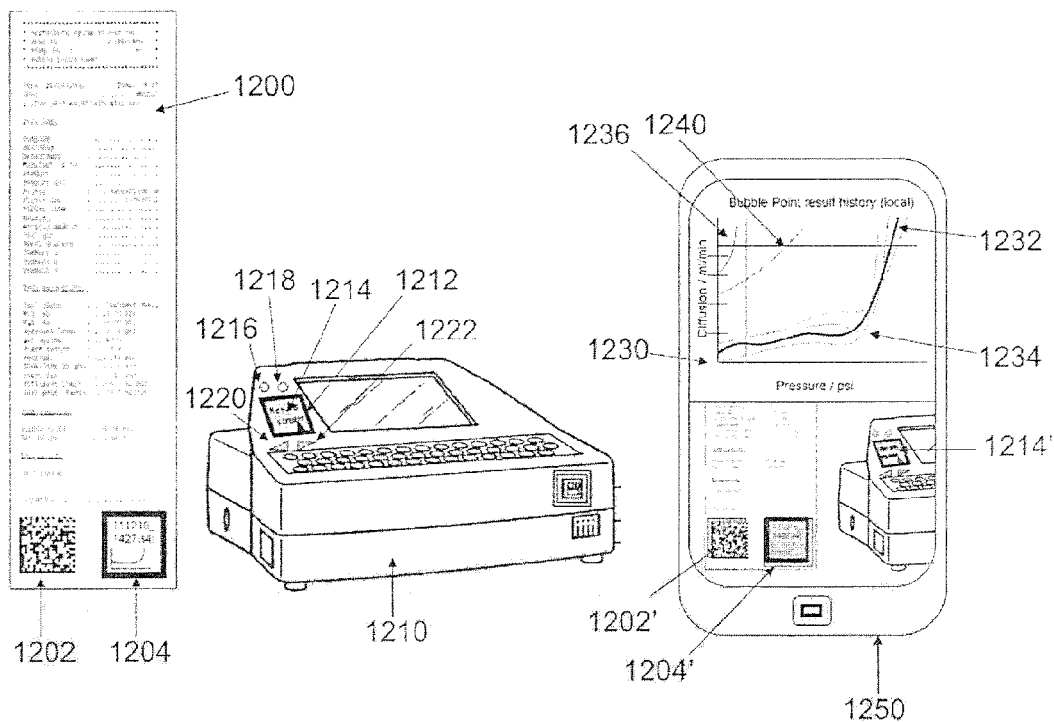
FIG. 24 illustrates embodiment of a variable marker display integrated into a process device that alters the appearance and display of content from a static augmented reality marker printed onto a test result within an augmented reality system.

FIG. 24 shows an embodiment of a variable marker display integrated into a process device that alters the appearance and display of content from a static augmented reality marker printed onto a test result within an augmented reality system. A front view of a printed test result (1200) features a data matrix code (1202) and an augmented reality marker (1204). In this embodiment an automated filter integrity testing process device (1210) contains a variable marker device (1212) which displays an augmented reality marker (1214). The user can manually change the augmented reality marker displayed on the variable marker device (1212) by pressing the left button (1220) or the right button (1222) to scroll through a list of available options. The variable marker device (1212) also features a camera (1216) for user input and a light sensor (1218) for auto adjustment of screen contrast. When the static augmented reality marker from the printed test results (1202 & 1204') and the variable marker (1214') from the process device are viewed serially or together by an augmented reality system, in this embodiment a mobile device (1250), content is displayed on the screen of the mobile device. This content on the mobile device can come from a local and/or networked database as well as from the augmented reality markers or associated communication devices. In this embodiment the variable marker (1214) from the process device is set to review all filter bubble point integrity testing results for this test program on this particular unit (local), and the static augmented reality marker on the test result printout (1204) provides the test program and results from the database to search. This content is displayed as a graph (1230) where the current test result is plotted on the graph (1232) along with previous passing results (234), marginally passing results (1240), and failing results (1236). The gives the operator the ability to compare the current results from the test printout (1200) to all previous results. In addition the operator can access additional databases to find out why a filter marginally passed (1240) or failed (1236) and the steps they could take to determine if the failures were false failures or true failures, including wetting steps, filter cleaning protocols, or technical/application support through the augmented reality device.

Figure 25:
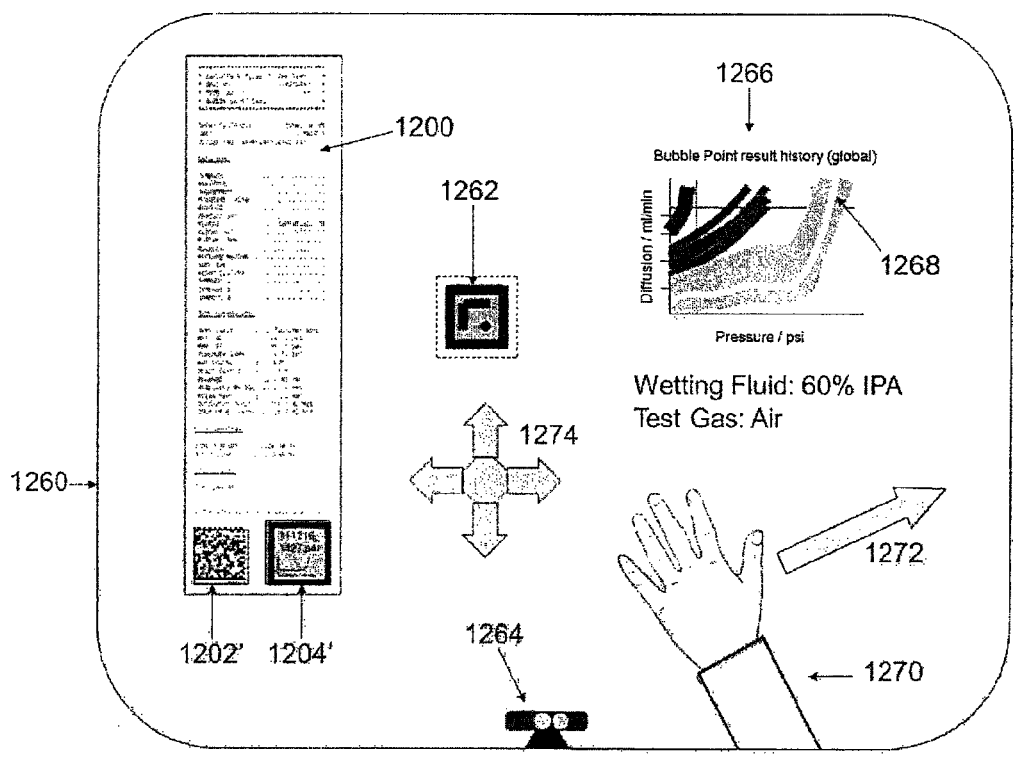
FIG. 25 illustrates an embodiment of a virtual variable marker display that alters the appearance and display of content from a static augmented reality marker printed onto a test result within an augmented reality system.

FIG. 25 shows an embodiment of a virtual variable marker display that alters the appearance and display of content from a static augmented reality marker printed onto a test result within an augmented reality system. A front view of an augmented display (1260) of printed test result (1200) featuring a recognized data matrix code (1202') and an augmented reality marker (1204'). In this embodiment a virtual variable marker (1262) from a computer program product is displayed and recognized on an augmented display (1260). In this embodiment an external motion sensing device (1264) is utilized to track the motions of the operator. The operator's hand (1270) can perform a motion (1272) to alter how the augmented content and displayed data is viewed on the augmented reality display device. In this embodiment the virtual variable marker (1262) is set to review all filter bubble point integrity testing results from a global database for this particular lot number. The testing results stored in a global database from exterior customers are made anonymous and can be compared to the printed test results (1200) from the operator. In this case the hand movements of the operator recognized by the motion sensing device (1264) allow the operator to view the individual testing results from a specific lot number as slices within a 3 dimensional graph (1266) and move forward and backwards through the dataset as the operator's hand moves forwards and backwards. This will allow the operator to view similar test results plotted out on the graph (1266) when compared to the plot of the test results from the test printout (1268) plotted on the graph. The operator can also use virtual directional marker (1274) viewed through the augmented reality display (1260) where the operator can change the virtual augmented reality marker display (1262) based on a hand and/or finger occluding one or more of the arrows of the virtual directional marker (1274). The hand and/or finger from the operator can be viewed by the operator through a camera device where it is displayed on the augmented display (1260) and occlude the virtual direction marker (1274) by covering it with a physical occluder, which in this embodiment is the operator's hand or finger.

Figure 26:
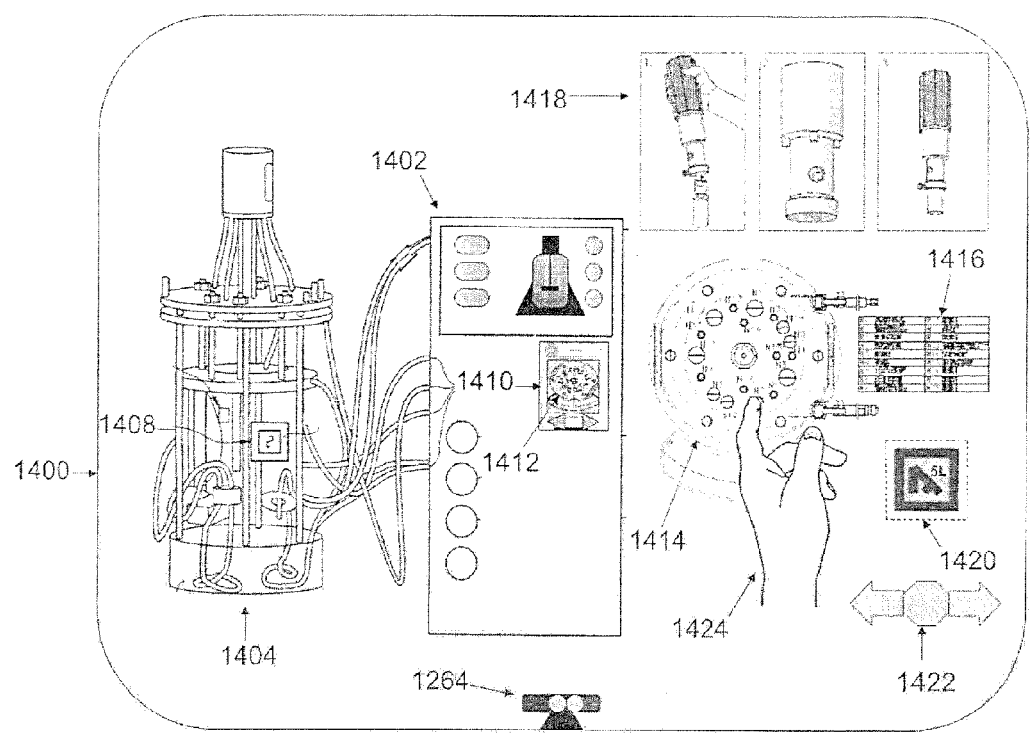
FIG. 26 illustrates an embodiment of a variable marker device attached to process device and a virtual variable marker utilized for the identification of spare parts.

FIG. 26 shows an embodiment of a variable marker device attached to process device and a virtual variable marker utilized for the identification of spare parts. A front view of an augmented display (1400) of a bioreactor vessel (1404) and a process device (1402) with a removably attached variable marker device (1410) featuring a recognized augmented reality marker (1412) selected for the display of spare parts. In this embodiment a virtual variable marker (1420) from a computer program product is displayed and recognized on an augmented display (1400). The combination of the variable marker (1412) on the process device and the variable virtual augmented reality marker (1420) provides a 3 dimensional model of the head plate for the bioreactor vessel (1404). In this embodiment an external motion sensing device (1264) is utilized to track the motions of the operator. The operator's hand (1420) can perform a motion to alter how the augmented content and displayed data is viewed on the augmented reality display device. In this case the hand movements of the operator recognized by the motion sensing device (1264) allow the operator to change the display of the virtual variable marker (1420) via a hand motion or by using an occluder with the virtual directional marker (1422). The hand and/or finger from the operator can be viewed by the operator through a camera device where it is displayed on the augmented display (1420) and occlude the virtual direction marker (1422) by covering it with a physical occluder. The operator can also occlude the augmented image of the 3 dimensional head plate using an occluder, preferably the operator's hand and/or finger, or a motion detected by the motion sensing device (1264) for the identification of spare parts which are listed as augmented text (1416) in the augmented reality system (1400). The occlusion of the 3 dimensional augmented image of spare parts can also link to additional content such as instructions (1418) for the assembly of selected spare parts identified by the occlusion of those parts.

Figure 27:
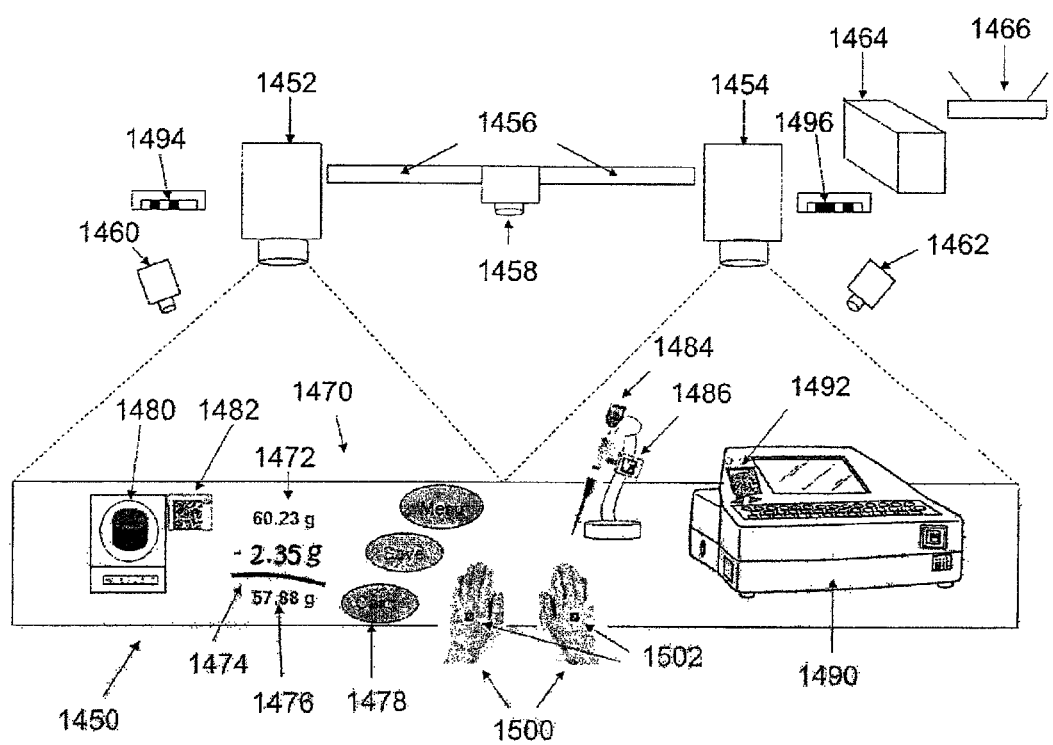
FIG. 27 illustrates an embodiment of a process/laboratory space that utilizes variable marker devices attached to process devices which visually communicates with a central processing system and displays the augmented information within the process/laboratory space.

FIG. 27 shows an embodiment of a process/laboratory space that utilizes variable marker devices attached to process devices which visually communicates with a central processing system and displays the augmented information within the process/laboratory space. A front view of a process/laboratory space (1450) which features an electronic balance (1480), an electronic pipette (1484), and an automated filter integrity testing device (1490). A centrally processed augmented reality and tracking system consisting of multiple augmented reality marker detecting cameras (1460, 1462), a central processing device (1464), a networking device (1466), multiple projectors (1452, 1454), variable marker devices (1494, 1496), and a tracking system consisting of an infrared light array (1456), an infrared camera (1458), and the operators gloves (1500) consisting of an infrared reflecting or illuminating element and/or static and/or variable markers (1502). The centrally processed augmented reality system can receive and/or transmit information via visual communication from process device augmented reality devices which can be plugged-in (1482), attached (1486), integrated (1492), or wirelessly connected (not shown) to process devices. In this embodiment an augmented reality marker device (1482) is plugged into an electronic balance (1480) and displays a visually coded marker which contains the measured value of the weight of the object on the electronic balance. This visual marker (1482) is detected by the augmented reality marker detecting camera (1460), processed in the central processing device (1464), and displayed on a process/laboratory space (1450) utilizing a projection system (1452, 1454). Alternate embodiments can consist of different display devices including but not limited to a rear or bottom projected displays, LCD or video panels, networked mobile devices, and or augmented reality glasses/heads up displays. The projected display (1470) displays the weight measurement from the electronic balance (1472) and an interactive menu (1478) on the process/laboratory space (1450). The operator can interact with the projected augmented display (1470) and select options on the projected menu (1478) through the infrared tracking system (1458), the augmented reality marker tracking system (1460, 1462), or an alternative tracking method. In this embodiment the operator selects the calculator function on the menu and draws on the process/laboratory space (1450) with their finger. The movement is detected by the tracking system (1458,1460,1462), communicated to the central processing device (1464), and projection displayed as a mathematical function (1474) on the surface of the process/laboratory space (1450). This mathematical function undergoes character recognition and the process system completes the mathematical function and displays the answer (1476) on the projected display. Alternate embodiments can feature different applications for the display, use, memory, and recall of recorded data and sets of information that can be displayed to the operator within the process/laboratory space. The centrally processed augmented reality system can receive visual data from the variable augmented reality devices (1482, 1486, 1492) and store the information locally, to a local network, or to an external network (cloud) through the networking device (1466). The centrally processed augmented reality system can also transmit visually coded information to the individual process devices through the variable marker devices (1494, 1496). This data transmitted to the individual process devices can include updates, results, programs, and any additional data useful to the equipment or operator within a process/laboratory environment.

Figure 28:
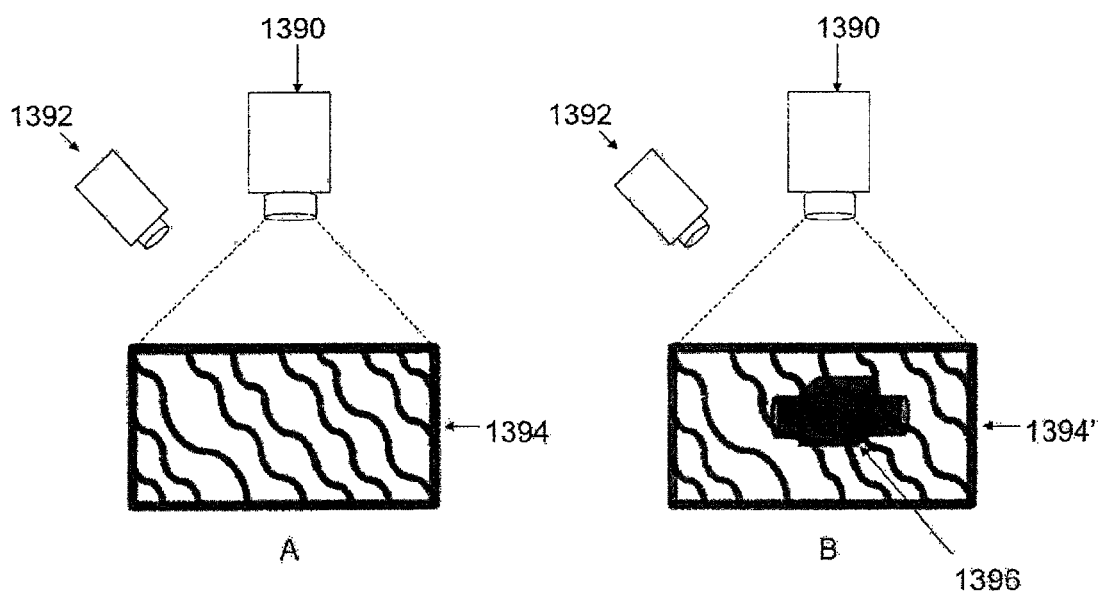
FIG. 28 illustrates an embodiment of a high speed projected augmented reality marker setup.

FIG. 28 shows an embodiment of a high speed projected augmented reality marker setup.

View 'A' of FIG. 28 is a front view of a high speed video projector (1390) which produces a high speed waveform video image which can serve as a variable marker (1394) and is monitored by a high speed digital video camera (1392). This setup would allow for high speed transfer of information as a visual communication method. The setup would also allow for the 3 dimensional surface imaging of objects within the projection field.

View 'B' of FIG. 28 is a front view of the same setup where a 3 dimensional object (1396) is placed within the variable marker projection field. The 3 dimensional object (1396) alters the contours of the waveforms within the variable marker and provides the information to a processing device (not shown) which can determine the surface shape of the 3 dimensional object based on changes observed from the expected waveform contours.

Figure 29:
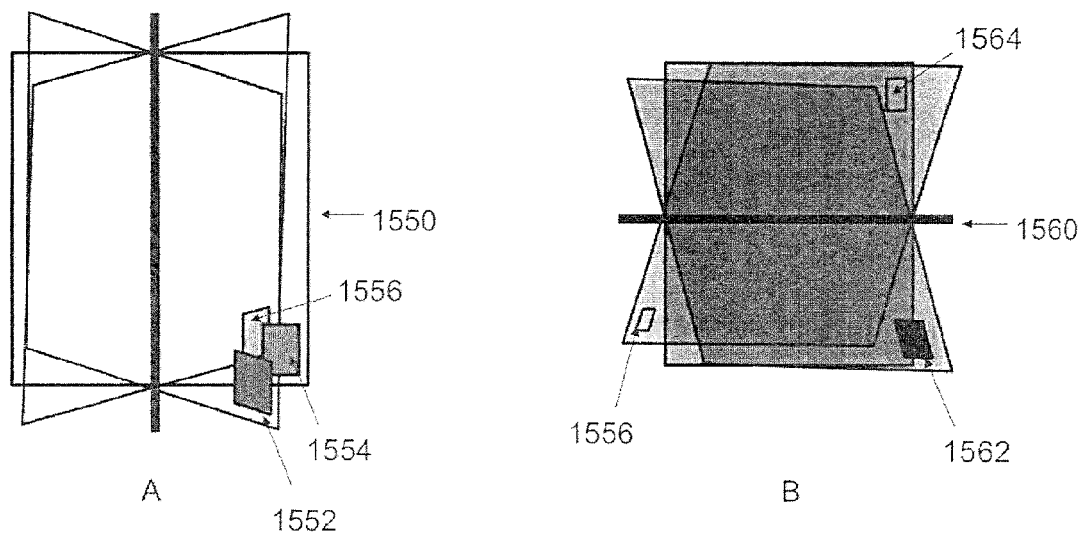
FIG. 29 illustrates an embodiment of a multidimensional virtual variable marker.

FIG. 29 shows an embodiment of a multidimensional virtual variable marker.

View 'A' of FIG. 29 is a front view of a multidimensional vertical augmented reality marker (1550) which contains several virtual augmented reality marker tags (1552, 1554, & 1556) which exist on each of the vertical dimensional planes. The virtual augmented reality marker tags (1552, 1554, & 1556) and the corresponding dimensional planes can exist simultaneously or as a virtual animation in which one plane exists for a defined period of time. The virtual augmented reality marker tags (1552, 1554, & 1556) can exist in differing locations or on the same location on each of the vertical dimensional planes as in this example with all tags presenting in the lower right hand corner of each plane.

View 'B' of FIG. 29 is a front view of a multidimensional horizontal augmented reality marker (1560) which contains several virtual augmented reality marker tags (1562, 1564, & 1566) which exist on each of the horizontal dimensional planes. The virtual augmented reality marker tags (1552, 1554, & 1556) and the corresponding dimensional planes can exist simultaneously or as a virtual animation in which one plane exists for a defined period of time. The virtual augmented reality marker tags (1552, 1554, & 1556) can exist in the same location or different locations on each of the horizontal dimensional planes as in this example where each tag presents in different corners of the horizontal planes. Both vertical and horizontal multidimensional virtual variable markers can exist in the same virtual space simultaneously. An infinite number of multidimensional planes and virtual augmented reality tags can exist within the same multidimensional augmented reality marker space.

The multidimensional augmented reality markers can exist in a virtual space tied to a real geospatial location (such as a GPS coordinate, a coordinate based off an originating location, or a coordinate based off the distance from a marker, a physical object, or a plurality of physical objects). A virtual variable marker can exist in multiple dimensions or angles simultaneously. The augmented reality camera views a particular location in space and has a multidimensional augmented reality marker overlaying the image at a selected geospatial location using augmented reality software. The augmented reality camera and software recognizes the clearest variable augmented reality tag on the multidimensional planes presented to the software system. This recognizes the exact angle that the camera is in relation to the multidimensional virtual variable marker. When the clearest augmented reality marker plane, tag, or angle is recognized by the augmented reality system it is displayed and all the other variants of the augmented reality marker dimensional planes can be discarded or ignored by the augmented reality software. This is applicable to determining the exact angle of content to display within a workspace area. This can determine the motion parallax and keystone correction based on the angle of the operator and the angle of the item in the workspace area in which to display the overlayed content.

Multidimensional virtual variable markers can be utilized to determine the position of real and/or virtual objects operating within a space. This can also be utilized for calibrating a positioning system (like GPS), recognizing landmarks, allowing the identification of the positioning of a mobile camera in relation to objects, or allow an operator to select virtual augmented reality marker objects occurring within an operating space.

Figure 30:
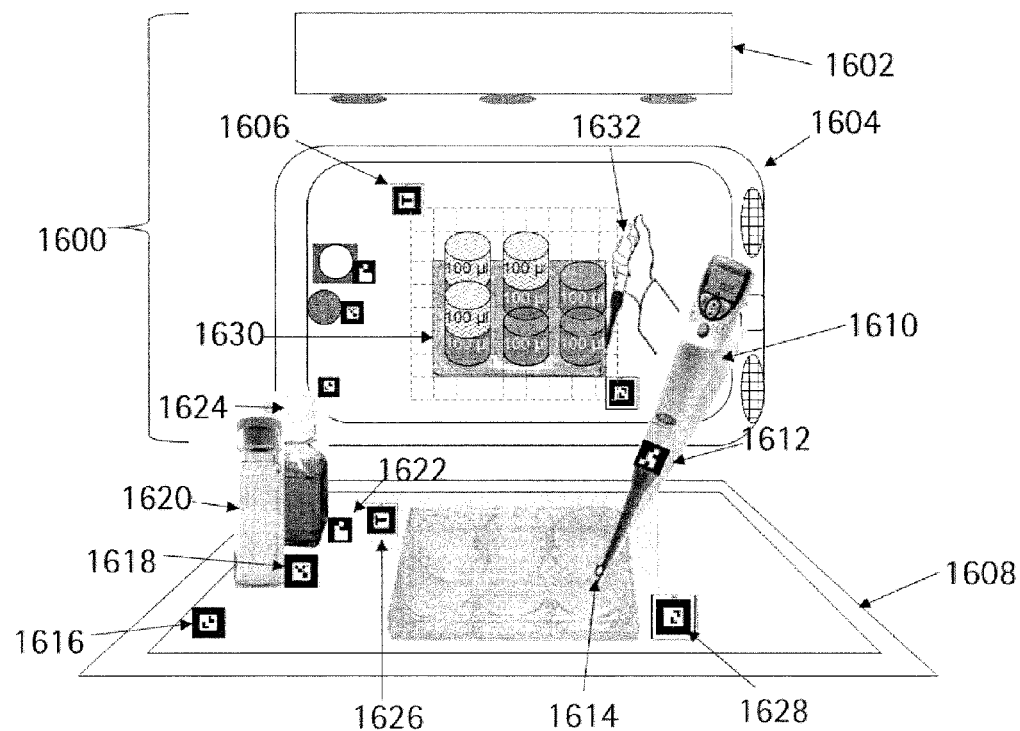
FIG. 30 shows alternate embodiments of an augmented reality system utilizing a variable marker to train and qualify that an operator can conduct a work task according to a defined protocol within a workspace.
Figure 30:
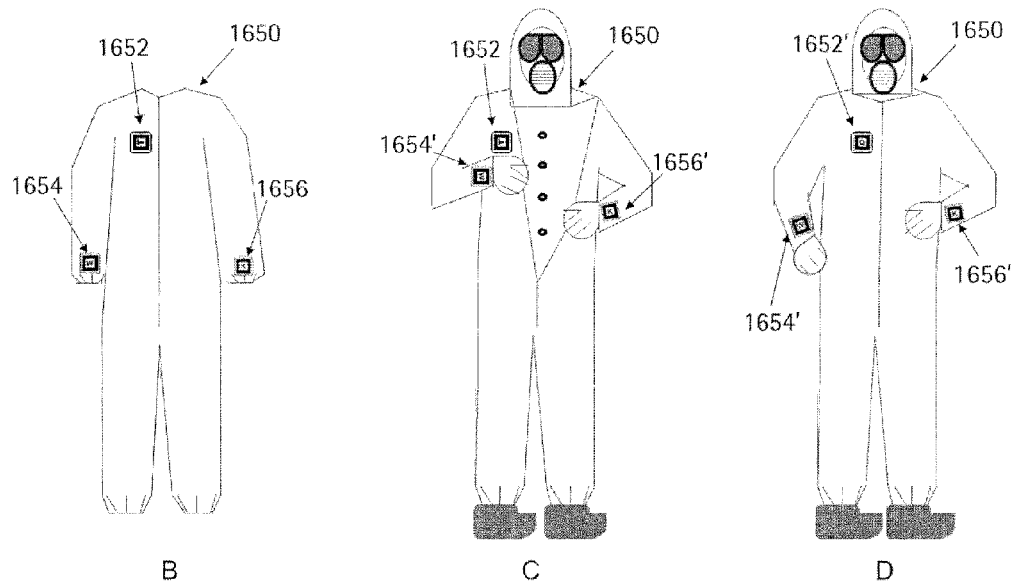

FIG. 30 shows alternate embodiments of an augmented reality system utilizing a variable marker to train and qualify that an operator can conduct a work task according to a defined protocol within a workspace.

View 'A' is a front view of an augmented reality system (1600) comprising a camera and lighting array sensing device (1602) with a wired/wireless connection to a display device (1604). The camera array images a workspace where a laminated protocol card (1608) with a coded protocol identifier (1616) contains several static markers to serve as coordinate markers (1626, 1628) which provides an augmented coordinate system (1606) and filling solution markers (1618, 1622) where the filling solutions are located which can be viewed as an augmented display on a display device (1604). An operator uses an electronic pipette (1610) to dispense fluid into a dispensing container, which in this embodiment is a multi-well plate. The augmented reality system (1600) can precisely track the movement of the pipette in 3 dimensional space through the use of an infrared light emitting diode (1614) and a variable marker (1612) located on the electronic pipette (1610). The variable marker (1612) on the electronic pipette (1610) can change the presentation to the augmented reality system (1600) when the fluid has been taken up and is dispensed. The augmented reality system can display an augmented display (1630) of the fluid type and the fluid volume required to be dispensed into each well of the multi-well plate in accordance with the defined protocol. The augmented reality system can record the movement of the infrared LED (1614) as well as the location and presentation of the variable marker (1612) as a 3 dimensional wireframe diagram and compare the movements of the markers with a reference diagram within a pre-programmed tolerance. As the variable marker (1612) changes its presentation to the augmented reality system (1600) the changes can be recorded on the wireframe diagram stored by the augmented reality system. The augmented reality system (1600) can also provide a superimposed video (1632) of the correct procedure being performed on the display (1604) so that the operator can follow the superimposed video (1632) to correctly complete the proper procedures and the sequence for the performance of a work task. The superimposed video (1632) can automatically speed up or slow down to mimic the speed and steps of the operator based on the variable marker tracking and presentation to the augmented reality system. The operator can be evaluated and graded within an operator defined system for performing or following the proper technique for a predetermined task within the margin of error by the software which tracks the movements and presentation of the variable markers. If the operator meets a certain proficiency level the augmented reality system can qualify that the operator meets the requirements for performing the work task. This qualification can be the initial qualification for the operator or pre-programmed periodic qualifications, such as part of an annual re-training and evaluation.

View 'B' is a front view of an aseptic gown (1650) containing variable markers (1652, 1654, and 1656). An augmented reality system (not shown) in an aseptic gowning area, preferably located in a FlexMoSys® flexible process suite, can track the movements and orientations of the variable markers on the aseptic gown (1650) presented to the augmented reality system during the aseptic gowning procedure.

View 'C' is a front view of an operator putting on an aseptic gown (1650) containing variable markers (1652, 1654', and 1656') following aseptic technique. In this embodiment the variable markers can change presentation when sprayed with isopropyl alcohol or other sanitizing agent (1654' and 1656').

View 'D' is a front view of an operator completed with putting on the aseptic gown (1650) containing variable markers (1652', 1654', and 1656'). The augmented reality system can evaluate and grade the operator based on the performance of the proper technique for a predetermined task within the margin of error by tracking the movements and presentation of the variable markers. If the operator met the proficiency level required the augmented reality system can qualify that the operator meets the requirements for performing the work task. If the operator did not meet the required aseptic technique during the qualification process then retraining is required until the operator meets the required proficiency level. If the operator did not perform the required aseptic technique during the aseptic gowning process then they can be locked out from entering the FlexMoSys® flexible process suite by the augmented reality system until the proper technique is followed.

Figure 31:
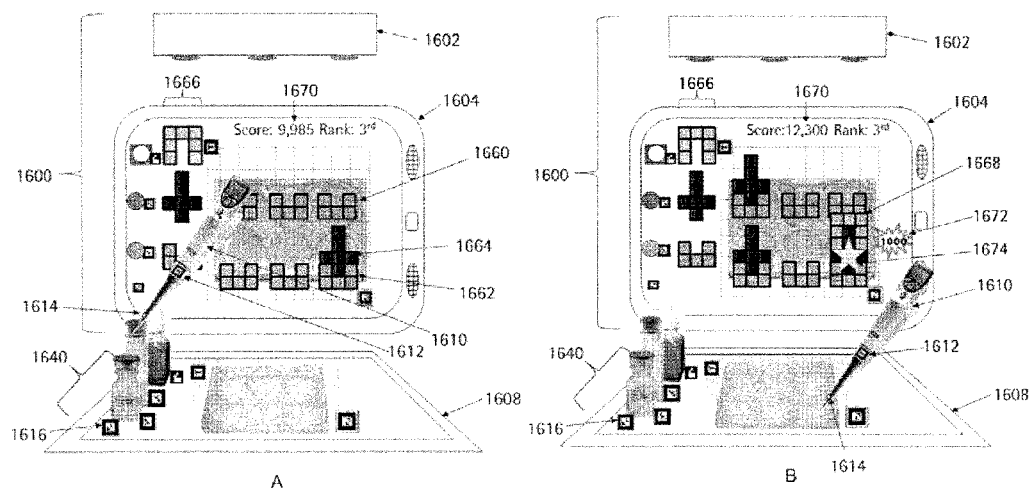
FIG. 31 shows alternate embodiments of the gamification of a work task according to a defined protocol within a workspace utilizing a variable marker with an augmented reality system.
Figure 31:
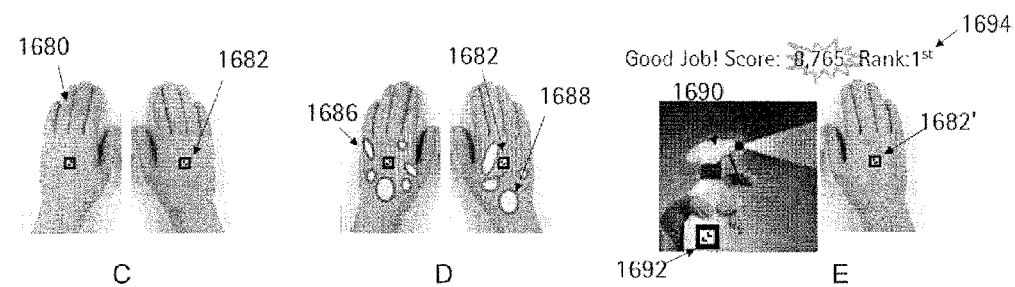

FIG. 31 shows alternate embodiments of the gamification of a work task according to a defined protocol within a workspace utilizing a variable marker with an augmented reality system.

View 'A' is a front view of an augmented reality system (1600) comprising of a camera and lighting array sensing device (1602) with a wired/wireless connection to a display device (1604). The camera array images a workspace containing a laminated protocol card (1608) with a coded protocol identifier (1616) and several static markers to serve as coordinate markers and filling solutions (1640) for a container, which in this embodiment is a multi-well plate. An operator uses an electronic pipette (1610) containing an infrared light emitting diode (1614) and a variable marker (1612) which can change the presentation of the marker when the fluid has been taken up and is dispensed by the pipette for the augmented reality system to precisely track the movement and use of the pipette within the workspace. An augmented reality game (1660) which can run as a software product on the augmented reality system can be displayed as an augmented display on the display device (1604).

The game can be expertly constructed to overlay the workspace and utilize the movements and presentation of the variable marker(s) on the device to serve as the controller for movements within the game. In this embodiment the operator is playing a block stacking game where each of the block designs needs to be assembled over each of the wells on the multi-well plate. The operator grabs the blocks on the augmented display by taking up fluid from each of the fluid containers within the workspace using the electronic pipette (1610) which changes the presentation of the variable marker (1612). The operator deposits and stacks the blocks over the wells on the multi-well plate by dispensing the fluid into the well which changes the presentation of the variable marker (1612). The selection of augmented blocks (1666) on the augmented display (1604) corresponds to the fluid type, the fluid volumes, and the fluid sequences required for conducting the test in accordance with the defined protocol. The blocks from fluid A (1662) are first dispensed into the wells to form the base, while the blocks from fluid B (1664) fit into the blocks from fluid A (1662) and forms the middle of the assembly. View 'B' is a front view of an augmented reality system (1600) in which an operator is engaged in an augmented reality game which is presented as an augmented display on a display device (1604) and overlays the performance of a work task. In this embodiment the blocks from fluid C (1668) fit over the blocks from fluid B (1664) and forms a completed assembly which is designated as complete with a star symbol (1674). Additional points (1672) can be provided for completing the assembly of the blocks in the augmented display which corresponds to the operation of completing the dispensing of all fluids into the correct well with the correct sequencing. The augmented game software can provide scoring (1670) based on desired parameters like speed, accuracy, and quantity completed. The software can also provide a rank based on the scoring from multiple users working within a defined group. The augmented reality game can provide enjoyment to the operator and allow the operator to maintain focus during long tasks of repetitive motions.

The augmented reality game during the performance of a work task can also prevent repetitive stress disorders by adding ergonomic movements to the operator's routine as part of the game.

View 'C' is a front view of an operator's gloves (1680) containing a variable marker (1682) which changes presentation to an augmented reality system (not shown) after exposure to isopropyl alcohol (IPA) or other sanitizing agent.

View 'D' is a front view of an operator's gloves visualized on an augmented display (not shown) with an augmented representation of organisms (1686 and 1688) linked to the variable marker (1682) and simulated growing of the augmented organisms on the operators gloves which appear over a defined time period.

View 'E' is a front view of an operator's gloves being sprayed with isopropyl alcohol from a spray bottle (1690) containing a static marker (1692). The isopropyl alcohol wets the variable marker (1682') and changes the marker presentation to the augmented reality system (not shown). The operator can be scored, ranked, and/or awarded points (1694) when in compliance with the time guidelines for sanitizing the gloves as per the operating procedure. The augmented game can be utilized to influence and improve operator behavior to help them maintain good hygiene practices with repeated sanitization of their gloves and maintain aseptic technique while operating with bioprocess items or equipment.

What is claimed is:

1. A communication method for transferring data via a variable marker to an augmented reality system comprising:
    capturing sensing data belonging to a working space by means of at least one sensing device of the augmented reality system, wherein the captured sensing data includes at least the variable marker displaying a first presentation;
    identifying the first presentation of the variable marker;
    displaying an n-th presentation on the variable marker;
    identifying the n-th presentation of the variable marker;
    processing the data contained in the first presentation of the variable marker and a second presentation of the variable marker,
    wherein n is equal to two.

2. The communication method of claim 1, comprising the additional iterative steps for all counting numbers from n equal to three as long as n is lower than N, wherein N is a natural number greater than two:
    (a) displaying a n-th presentation on the variable marker;
    (b) identifying the n-th presentation of the variable marker;
    (c) processing the data contained in the n-th presentation of the variable marker,
    (d) adding one to n.

3. The communication method of claim 2, wherein a change from an (n−1) presentation to the n-th presentation on the variable marker is trigged based on an input by an operator, a computer product input, and/or at a programmed interval.

4. The communication method of claim 3, wherein the input by an operator includes at least one of pushing a button, operating a lever, press a latch, turning a page, a hand gesture, a brain-computer interface, an interaction with a virtual augmented reality marker, the assembly of components, the insertion of a component, and a physical connection between components.

5. The communication method of claim 3, wherein the input by a computer product includes at least one of a software input, a hardware input, a sensing device input, a measuring device input, a processing device input, a computer program product input, an external device input, an input from an external marker or augmented reality system, and a combination of multiple inputs from multiple sources or multiple inputs from the same source.

6. The communication method of claim 3, wherein the programmed interval is at least one of pre-determined unit of time, sequences of events, a randomized interval of time or sequences, an operator changeable interval, and an interval determined by a programmed product based on the data received from a measured system.

7. The communication method of claim 1, further comprising outputting the information from the variable marker to an operator through an output device of the augmented reality system.

8. The communication method of claim 1, further comprising:
    deciding on a status of a positional and/or functional relationship of the first augmented reality marker presentation and the second augmented reality marker presentation with respect to each other;
    outputting an augmented representation of at least part of the captured sensing data and the decision of the status of the relationship.

9. The communication method of claim 1, further comprising outputting the information from the variable marker to an operator through an output device of the augmented reality system.

10. The communication method of claim 1, wherein data transmitted from the variable marker to the sensing device can represent at least text, audio, symbols, charts, graphs, slides, images, drawings, arrows, annotations, videos, animations, coordinates, measurement data, results, geospatial coordinates and local coordinates.

11. An assembling method for assembling a first set-up component to a second set-up component comprising the steps:
    capturing sensing data belonging to a working space by means of at least one sensing device of an augmented reality system, wherein
    the captured sensing data includes at least a part of the first set-up component and at least a part of the second set-up component and a variable marker associated with the first set-up component and/or the second set-up component, wherein the variable marker is in a first marker state displaying a first presentation and wherein the second set-up component is arrangeable to the first set-up component in an positional and/or functional relationship;

identifying the first presentation of the variable marker;

deciding on a status of the positional and/or functional relationship of the first set-up component and the second set-up component with respect to each other;

outputting an augmented representation of at least part of the captured sensing data and the decision of the status of the relationship.

12. The assembling method of claim 11, wherein the second set-up component comprises a variable marker, wherein the second set-up component is connectable to the first set-up component, wherein the variable marker is in the first marker state when the first set-up component and the second set-up component are disconnected and in a second marker state when the first set-up component and the second set-up component are connected and wherein the variable marker turns form the first marker state to the second marker state, when the first set-up component is connected to the second set-up component.

13. The assembling method of claim 11, comprising the additional iterative steps for all counting numbers from n equal to three as long as n is lower than N, wherein N is a natural number greater than two:
   (a) displaying a n-th presentation on the variable marker;
   (b) identifying the n-th presentation of the variable marker;
   (c) processing the data contained in the n-th presentation of the variable marker,
   (d) adding one to the counting index n.

14. The assembling method of claim 13, wherein additional information regarding at least one of the first set-up component and the second set-up component is transmitted by the variable marker.

15. A monitoring method for monitoring a physical property comprising the steps:
   providing an augmented reality system with a processing device, an output device and at least one sensing device, whereby the at least one sensing device is capable of capturing sensing data belonging to a working space;
   providing a set-up component comprising a variable marker at the working space, wherein the variable marker transmits information regarding the set-up component;
   capturing at least the variable marker with the sensing device, wherein the variable marker is identified by the processing device;
   outputting an augmented representation of at least part of the captured sensing data and the decision whether the variable marker is in first marker state or in the second marker state.

16. The monitoring method of claim 15, wherein the variable marker is in a first marker state when the physical property of the set-up component is in a first property state and wherein the variable marker is in a second marker state when the physical property is in a second property state and wherein the variable marker turns form the first marker state to the second marker state, when the physical property changes from the first property state to the second property state.

17. The monitoring method of claim 15, wherein the variable marker transmits additional information regarding the set-up component beneath the physical property of the set-up component.

18. The monitoring method of claim 15 comprising the steps:

outputting an augmented representation comprising at least part of the retrieved digital information.

19. The monitoring method of claim 15, wherein the at least one variable marker attached to an operator and/or a device is monitored and tracked by the at least one sensing device for the purposes of the qualification of a work task within a workspace.

20. A computer-readable storage medium for a computer-aided assembly of a measurement or production set-up and/or for automatically monitoring a measurement or production set-up, wherein the computer-readable storage medium comprises coding segments that when loaded and executed on a suitable system can execute the method of claim 15.

21. An augmented reality system for transmitting data comprising:
   at least one sensing device capable of capturing sensing data belonging to a working space;
   a processing device, which is in communicatively connected to the at least one sensing device, and which is capable of
      capturing sensing data belonging to a working space by means of at least one sensing device of an augmented reality system further comprising a processing device and an output device, wherein
      the captured sensing data includes at least a part a variable marker
   identifying the first presentation of the variable marker;
   displaying an n-th presentation on the variable marker;
   identifying the n-th presentation of the variable marker;
   processing the data contained in the first and second presentation of the variable marker,
   wherein n is equal to two.
   an output device configured for outputting an augmented representation of at least part of the captured sensing data as well as a representation of the processed data.

22. The augmented reality system of claim 21, wherein at least one sensing device is a camera.

23. The augmented reality system of claim 21, wherein the output device is a projector projecting the augmented representation onto the working space or onto a set-up component, whereby the augmented representation is adjusted and displayed in accordance with the spatial distribution of the component.

24. The augmented reality system of claim 21, wherein the variable marker can be provided by a variable marker display device as a plurality of a physical markers, as an electronic marker, as a digital marker, as a virtual marker or as a display.

25. The augmented reality system of claim 24, wherein the variable marker display device can comprise:
   a sensing device;
   a display device;
   a communication device; and
   a power device.

26. The augmented reality system of claim 25, wherein the sensing device comprises at least one of a camera, a high speed camera, a CCD device, a radio frequency identification device (RFID), a near field communication device (NFC), a microphone, a photodiode, an infrared sensing device, a motion tracking device, an eye tracking device, a light sensing device, and a light spectrum sensing device.

27. The augmented reality system of claim 25, wherein the display device comprises at least one of a digital display, an electronic ink display, liquid crystal display (LCD), light emitting diode (LED) display, an organic light emitting diode (OLED) display, a plasma display, a heads-up display (HUD), a wearable display, a projection display, an ultra-high speed projection display, a fluorescence display, a mechanical display, a haptic display, an audio display, and an ultrasound display.

28. The augmented reality system of claim 25, wherein the communication device comprises at least one of a wired connection, a universal serial bus (USB) connection, a serial connection, an RS-232 connection, an Ethernet connection, a telephone connection, a DSL connection, a fiber optic connection, a cable connection, a BNC connection, wired connection ports, a wireless communication device, a WiFi connection, a cellular connection, an active RFID connection, an NFC connection, a radio connection, and a visual connection.

29. The augmented reality system of claim 25, wherein the power device comprises at least one of a rechargeable battery, a battery, a powercord, a powered communication port (USB), a solar cell, a mechanical power source, an electromechanical power source, and a wireless power source.

30. The augmented reality system of claim 25, wherein the display device is operable to display an augmented superimposed video of a template operator performing a work task within the workspace.

31. The augmented reality system of claim 25, wherein the augmented reality system is operable to monitor the at least one variable marker attached to an operator and/or attached to a device, to track the at least one variable marker by the at least one sensing device, to display at least one variable marker on the display device, and interact with as a game program by an operator during the completion of a work task within the workspace.

* * * * *

UNITED STATES PATENT AND TRADEMARK OFFICE
CERTIFICATE OF CORRECTION

PATENT NO.        : 8,749,396 B2                                                                 Page 1 of 1
APPLICATION NO.   : 13/920333
DATED             : June 10, 2014
INVENTOR(S)       : Maggiore It is certified that error appears in the above-identified patent and that said Letters Patent is hereby corrected as shown below:

On the title page item (73) Assignee should read: Sartorius Stedim Biotech GmbH (DE)

Signed and Sealed this
Twelfth Day of May, 2015

Michelle K. Lee
*Director of the United States Patent and Trademark Office*